(12) United States Patent
Sung et al.

(10) Patent No.: US 10,402,625 B2
(45) Date of Patent: Sep. 3, 2019

(54) INTELLIGENT ELECTRONIC DEVICE AND METHOD OF OPERATING THE SAME

(71) Applicant: Samsung Electronics Co., Ltd., Suwon-si, Gyeonggi-do (KR)

(72) Inventors: Won-Kyu Sung, Seongnam-si (KR); Jangwoon Kim, Seoul (KR); Jaeho Baik, Yongin-si (KR); Wonho Shin, Suwon-si (KR); Byungchan Lee, Seongnam-si (KR); Joo-Hyung Lee, Seoul (KR); Woohyeok Jeong, Seoul (KR); Dong-Il Son, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 15/462,088

(22) Filed: Mar. 17, 2017

(65) Prior Publication Data
US 2017/0278480 A1    Sep. 28, 2017

(30) Foreign Application Priority Data

Mar. 24, 2016    (KR) ................. 10-2016-0035336

(51) Int. Cl.
*G06K 9/00*    (2006.01)
*G06F 3/16*    (2006.01)
(Continued)

(52) U.S. Cl.
CPC .......... *G06K 9/00255* (2013.01); *G06F 3/011* (2013.01); *G06F 3/012* (2013.01);
(Continued)

(58) Field of Classification Search
CPC .......... G06K 9/00255; G06K 9/00335; G09G 5/003; G09G 2380/16; G09G 2380/06;
(Continued)

(56) References Cited

U.S. PATENT DOCUMENTS

| 2002/0149613 A1 | 10/2002 | Gutta et al. |
| 2006/0007191 A1 | 1/2006 | Chi et al. |

(Continued)

FOREIGN PATENT DOCUMENTS

| CN | 104951077 A | 9/2015 |
| JP | 2015-64473 A | 4/2015 |

(Continued)

OTHER PUBLICATIONS

European Search Report dated Jan. 9, 2019, issued in European Application No. 17770538.1.

*Primary Examiner* — Liliana Cerullo
(74) *Attorney, Agent, or Firm* — Jefferson IP Law, LLP

(57) ABSTRACT

An electronic device and a method of operating the same are provided. The electronic device includes a base, a fixed head disposed on an upper portion of the base, a drive unit that is disposed in an inner space of the fixed head, a movable head that surrounds at least a portion of the fixed head and is arranged to be movable by being fixed to at least a portion of the drive unit, at least one sensor module that is disposed in at least a portion of the movable head, and at least one processor that detects an input by the sensor module and controls the drive unit to cause the movable head to move in a determined direction according to an input detection parameter. Other various embodiments may be made.

18 Claims, 53 Drawing Sheets

(51) Int. Cl.
*G09G 5/00* (2006.01)
*G06F 3/0488* (2013.01)
*G06F 3/01* (2006.01)
*G07F 17/32* (2006.01)

(52) U.S. Cl.
CPC ............ *G06F 3/013* (2013.01); *G06F 3/0488* (2013.01); *G06F 3/167* (2013.01); *G07F 17/3209* (2013.01); *G07F 17/3213* (2013.01); *G09G 5/003* (2013.01); *G06K 9/00335* (2013.01); *G09G 2340/0464* (2013.01); *G09G 2354/00* (2013.01); *G09G 2370/022* (2013.01); *G09G 2370/025* (2013.01); *G09G 2380/06* (2013.01); *G09G 2380/16* (2013.01)

(58) Field of Classification Search
CPC ....... G09G 2370/025; G09G 2370/022; G09G 2340/0464; G09G 2354/00; G06F 3/041; G06F 3/167; G06F 2354/00; G06F 3/0488; G06F 3/013; G06F 3/163
See application file for complete search history.

(56) References Cited

U.S. PATENT DOCUMENTS

| | | |
|---|---|---|
| 2006/0119572 A1 | 6/2006 | Lanier |
| 2007/0192910 A1* | 8/2007 | Vu ............................ B25J 5/007 |
| | | 700/245 |
| 2008/0179115 A1* | 7/2008 | Ohm ........................ B25J 5/005 |
| | | 180/9.21 |
| 2010/0295782 A1 | 11/2010 | Binder |
| 2014/0277735 A1 | 9/2014 | Breazeal |
| 2015/0314454 A1 | 11/2015 | Breazeal et al. |
| 2016/0221197 A1* | 8/2016 | Claffee ..................... F16H 25/20 |
| 2016/0379107 A1 | 12/2016 | Li et al. |

FOREIGN PATENT DOCUMENTS

| | | |
|---|---|---|
| KR | 20-0367764 Y1 | 11/2004 |
| KR | 10-2009-0006261 A | 1/2009 |
| KR | 10-2015-0065359 A | 6/2015 |
| WO | 2015/034542 A1 | 3/2015 |

* cited by examiner

Good evening
Mike!

FIG.19

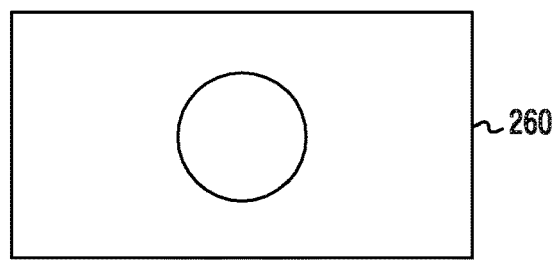
(a)
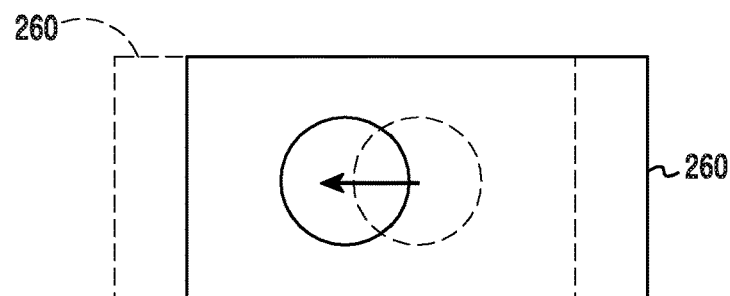
(b)
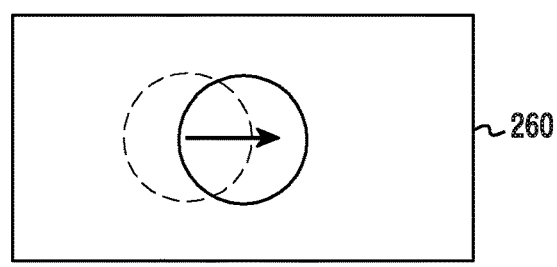
(c)
FIG.30A

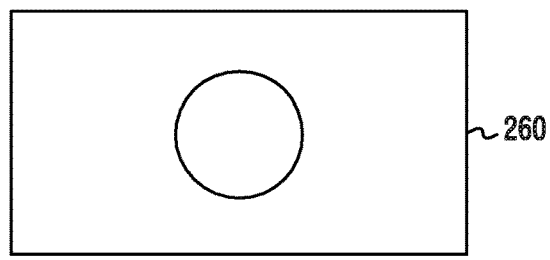
(a)
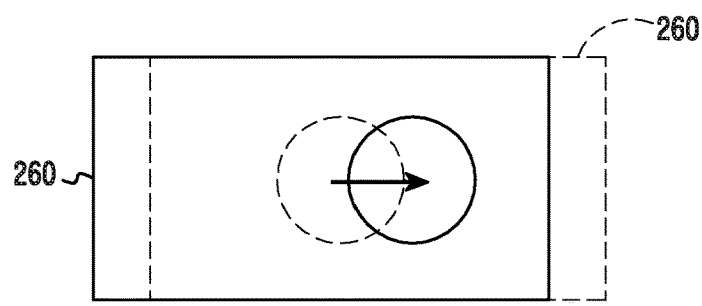
(b)
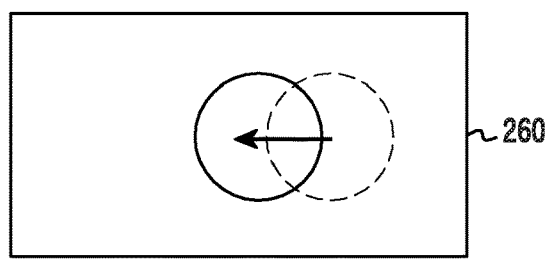
(c)
FIG.30B

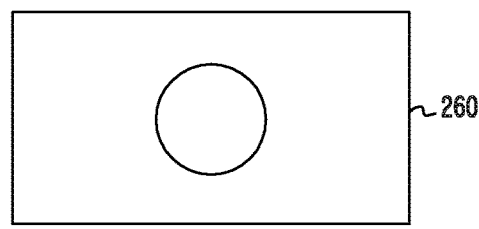
(a)
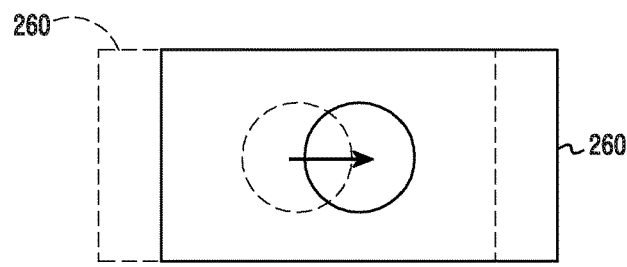
(b)
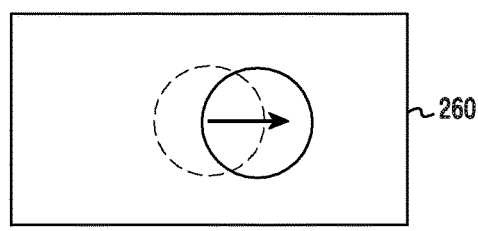
(c)
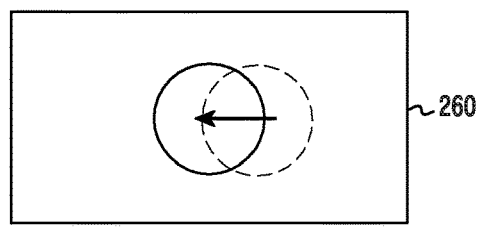
(d)
FIG.31A

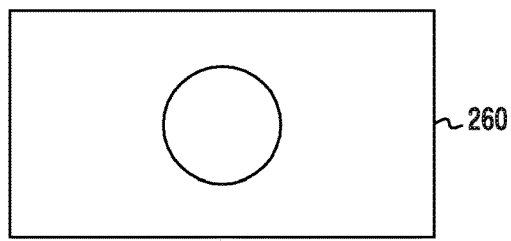
(a)
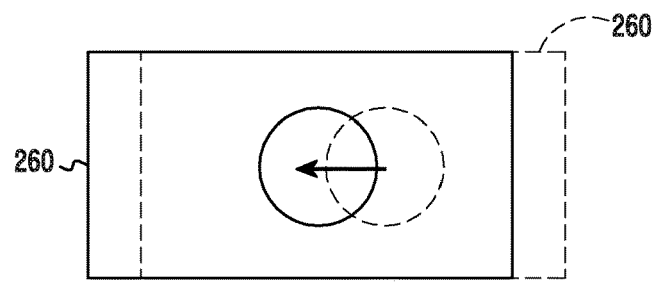
(b)
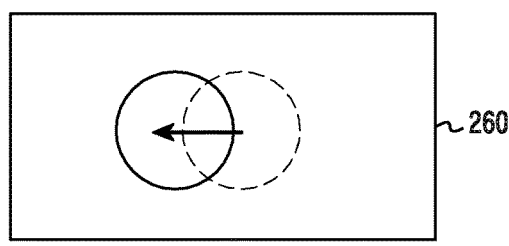
(c)
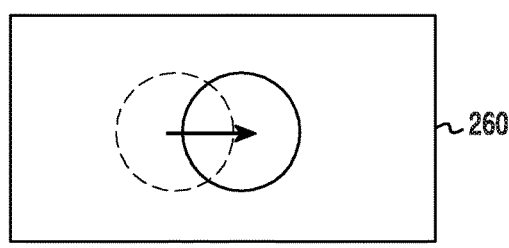
(d)
FIG.31B

INTELLIGENT ELECTRONIC DEVICE AND METHOD OF OPERATING THE SAME

CROSS-REFERENCE TO RELATED APPLICATION(S)

This application claims the benefit under 35 U.S.C. § 119(a) of a Korean patent application filed on Mar. 24, 2016 in the Korean Intellectual Property Office and assigned Serial number 10-2016-0035336, the entire disclosure of which is hereby incorporated by reference.

TECHNICAL FIELD

The present disclosure relates to an intelligent electronic device and a method of operating the same.

BACKGROUND

As electronic technologies have been developed, electronic devices having various functions have appeared. In the electronic devices, a physical operation by a user may cause interaction with the user. For example, the electronic devices may perform a corresponding function through the user's button input (e.g., a touch input) or the like. Accordingly, an electronic device that performs an improved interaction with the user, outside of a uniform operating mode would be advantageous.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device includes a display in at least a part thereof and a data input/output function may be performed through the display. From the viewpoint of the interaction between the electronic device and the user, according to a data output request of the user, such an electronic device may output corresponding data visually through the display, tactually through vibration, or acoustically through sound. Alternatively, at least two of the above-described output methods may be performed simultaneously.

However, such uniform data output methods of the electronic device may bore the user, and may degrade the preference for the electronic device.

Various embodiments of the present disclosure are capable of providing an intelligent electronic device and a method of operating the same.

In accordance with an aspect of the present disclosure, an electronic device and an operation method are provided. The electronic device includes a base, a fixed head disposed on an upper portion of the base, a drive unit that is disposed in an inner space of the fixed head, a movable head that surrounds at least a portion of the fixed head and is arranged to be movable by being fixed to at least a portion of the drive unit, at least one sensor module that is disposed in at least a portion of the movable head or the base, and at least one processor configured to detect an input by the sensor module, and control the drive unit to cause the movable head to move in a determined direction according to an input detection parameter.

In accordance with another aspect of the present disclosure, a method of operating an electronic device is provided. The method includes detecting a user based on a received acoustic speech, moving the display to face the user, and executing a function through the display.

In accordance with another aspect of the present disclosure, an electronic device including a display is provided. The electronic device includes a drive module that moves the display, and a processor functionally connected to the display and the drive module. The processor may be configured to detect a user based on a received acoustic speech, to move the display to face the user, and to execute a function through the display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 18A, 18B, 18C, 18D, 19, 20A, 20B, 21A, 21B, 22, 23, 24A, 24B, 24C, 25A, 25B, 26A, 26B, 26C, 26D, 27A, 27B, 27C, 28A, 28B, 29A, 29B, 30A, 30B, 30C, 30D, 30E, 30F, 31A, 31B, 31C, 31D, 31E, and 31F illustrate views each for explaining an operating method of an electronic device according to various embodiments of the present disclosure.

Throughout the drawings, like reference numerals will be understood to refer to like parts, components, and structures.

DETAILED DESCRIPTION

Figure 1:
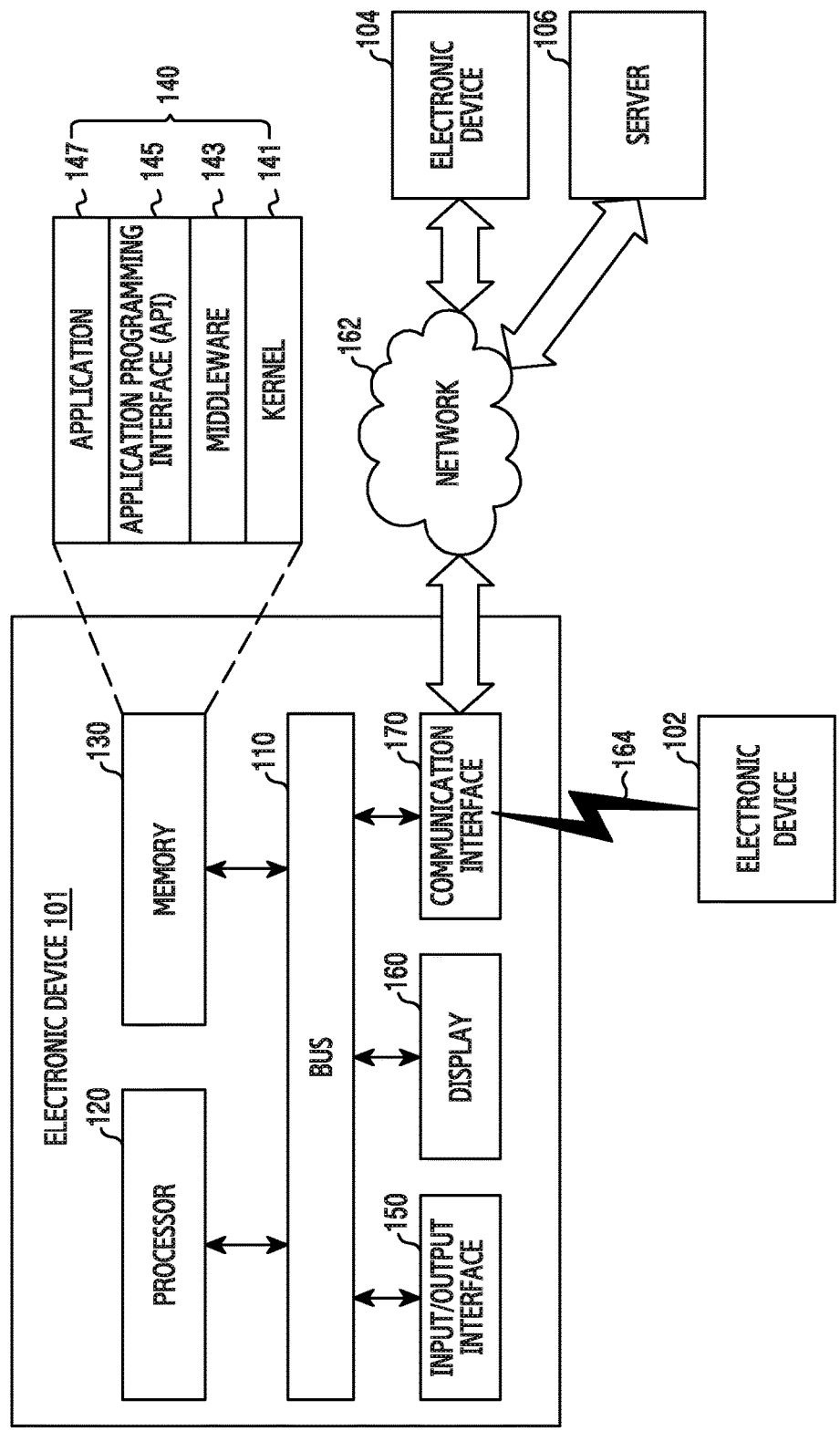
FIG. 1 illustrates a block diagram of a network environment system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular terms "a," "an," and "the" include plural referents unless the context clearly dictates otherwise. Thus, for example, reference to "a component surface" includes reference to one or more of such surfaces.

The embodiments used to describe the principles of the present disclosure are by way of illustration only and should not be construed in any way to limit the scope of the disclosure. Those skilled in the art will understand that the principles of the present disclosure may be implemented in any suitably arranged electronic device.

By the term "substantially" it is meant that the recited characteristic, parameter, or value need not be achieved exactly, but that variations such as tolerances, measurement errors, measurement accuracy limitations and other factors known to those of skill in the art, may occur in amounts that do not preclude the effect the characteristic was intended to provide.

The terms "include" and "may include" used herein are intended to indicate the presence of a corresponding function, operation, or constitutional element disclosed herein, and are not intended to limit the presence of one or more functions, operations, or constitutional elements. In addition, the terms "include" and "have" are intended to indicate that characteristics, numbers, operations, constitutional elements, and elements disclosed in the description or combinations thereof exist. However, additional possibilities of one or more other characteristics, numbers, operations, constitutional elements, elements or combinations thereof may exist.

As used herein, the expression "or" includes any and all combinations of words enumerated together. For example, "A or B" may include either A or B, or may include both A and B.

Although expressions used in embodiments of the present disclosure, such as "1st", "2nd", "first", "second" may be used to express various constituent elements of the embodiments of the present disclosure, these expressions are not intended to limit the corresponding constituent elements. The above expressions are not intended to limit an order or an importance of the corresponding constituent elements, and may be used to distinguish one constituent element from another constituent element. For example, a first user device and the second user device are both user devices, and indicate different user devices. Similarly, a first constituent element may be referred to as a second constituent element, and the second constituent element may be referred to as the first constituent element without departing from the scope of the present disclosure.

When an element is mentioned as being "connected" to or "accessing" another element, this may indicate that the element is directly connected to or accessing the other element, or there may be intervening elements present between the two elements. When an element is mentioned as being "directly connected" to or "directly accessing" another element, it is to be understood that there are no intervening elements present.

The term "module" as used herein may refer, for example, to a unit including one of hardware (e.g., electrical circuitry and/or mechanical elements), software, and firmware, or a combination thereof. The term "module" may be interchangeably used with terms, such as unit, logic, logical block, component, or circuit. A module as described herein may be a minimum unit of an integrally constituted component or may be a part thereof. The module may be a minimum unit for performing one or more functions or may be a part thereof. The module may be mechanically or electrically implemented. For example, the module as described herein includes at least one of processing circuitry an application-specific integrated circuit (ASIC) chip, field-programmable gate arrays (FPGAs), and a programmable-logic device, which are known or will be developed and which perform certain operations.

Unless otherwise defined, all terms, including technical and scientific terms, used herein have the same meaning as commonly understood by those of ordinary skill in the art to which embodiments of the present disclosure pertain. It will be further understood that terms, such as those defined in commonly used dictionaries, should be interpreted as having meanings that are consistent with their meaning in the context of the relevant art and the embodiments of the present disclosure, and should not be interpreted in an idealized or overly formal sense unless expressly so defined herein.

An electronic device as used herein may include an antenna capable of performing a communication function in at least one frequency band, and may be a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group phase 1 or phase 2 (MPEG-1 or MPEG-2) audio layer 3 (MP3) player, a mobile medical device, a camera, and a wearable device, such as a head-mounted-device (HMD) including electronic glasses, electronic clothes, an electronic bracelet, an electronic necklace, an electronic appcessory, an electronic tattoo, or a smart watch, or the like, for example, and without limitation.

The electronic device may be a smart home appliance having an antenna, such as a television (TV), a digital versatile disc (DVD) player, an audio player, a refrigerator, an air conditioner, a cleaner, an oven, a microwave oven, a washing machine, an air purifier, a set-top box, a TV box, such as Samsung HomeSync®, Apple TV®, or Google TV®, a game console, an electronic dictionary, an electronic key, a camcorder, and an electronic picture frame, or the like, but is not limited thereto.

The electronic device including the antenna may be one of various medical devices, such as magnetic resonance angiography (MRA), magnetic resonance imaging (MRI), computed tomography (CT), imaging equipment, and an ultrasonic instrument, a navigation device, a global positioning system (GPS) receiver, an event data recorder (EDR), a flight data recorder (FDR), a car infotainment device, electronic equipment for a ship, such as a vessel navigation device, and a gyro compass, avionics, a security device, a car head unit, an industrial or domestic robot, an automated teller machine (ATM), and a point of sale (POS) device, or the like, but is not limited thereto.

The electronic device may be part of at least one of an item of furniture or a building/structure including an antenna. The electronic device may be an electronic board, an electronic signature input device, a projector, or any of various measurement machines for such utilities as water supply, electricity, gas, and a propagation measurement machine, or the like, but is not limited thereto.

The electronic device may be one or more combinations of the aforementioned various devices. In addition, the electronic device may be a flexible device. Moreover, the electronic device is not limited to the aforementioned devices.

Hereinafter, an electronic device according to example embodiments of the present disclosure will be described with reference to the accompanying drawings. The term 'user' used in the embodiments may refer to a person who uses the electronic device or a device which uses the electronic device, such as an artificial intelligence (AI) electronic device. In the following description, the term annular member is used for convenience and to aid in understanding. However, it will be understood that the term annular member refers, for example, to an annulus, e.g., a substantially ring-like structure, ring shape structure, a ring structure, or the like.

FIG. 1 is a diagram illustrating an example network environment including an electronic device according to various embodiments of the present disclosure.

Referring to FIG. 1, a network environment 162 includes an electronic device 101. The electronic device 101 includes a bus 110, a processor 120, a memory 130, an input/output interface (e.g., including input/output circuitry) 150, a display 160, and a communication interface (e.g., including communication circuitry) 170. In embodiments of the present disclosure, the electronic device 101 may omit at least one of the components or further include another component.

The bus 110 includes a circuit for connecting the components and delivering communications such as a control message therebetween.

The processor 120 includes one or more of a central processing unit (CPU), an application processor (AP), and a communication processor (CP). The processor 120 processes an operation or data on control of and/or communication with another component of the electronic device 101.

The processor 120, which is connected to the long term evolution (LTE) network, determines whether a call is connected over the circuit switched (CS) service network using caller identification information, such as a caller phone number of the CS service network, such as the 2nd generation (2G) or 3rd generation (3G) network. For example, the processor 120 receives incoming call information, such as a CS notification message or a paging request message of the CS service network over the LTE network, such as circuit-switched fallback (CSFB). The processor 120 being connected to the LTE network receives incoming call information, such as a paging request message over the CS service network, such as single radio LTE (SRLTE).

When receiving the incoming CS notification message or a paging request message of the CS service network over the LTE network, the processor 120 obtains caller identification information from the incoming call information. The processor 120 displays the caller identification information on the display 160. The processor 120 determines whether to connect the call based on input information corresponding to the caller identification information displayed on the display 160. For example, when detecting input information corresponding to an incoming call rejection, through the input/output interface 150, the processor 120 restricts the voice call connection and maintains the LTE network connection. For example, when detecting input information corresponding to an incoming call acceptance, through the input/output interface 150, the processor 120 connects the voice call by connecting to the CS service network.

When receiving the incoming CS notification message or a paging request message of the CS service network over the LTE network, the processor 120 obtains caller identification information from the incoming call information. The processor 120 determines whether to connect the call by comparing the caller identification information with a reception control list. For example, when the caller identification information is included in a first reception control list, such as a blacklist, the processor 120 restricts the voice call connection and maintains the connection to the LTE network. When the caller identification information is not included in the blacklist, the processor 120 connects the voice call by connecting to the CS service network. When the caller identification information is included in a second reception control list, such as a white list, the processor 120 connects the voice call by connecting to the CS service network.

When receiving the incoming call information, such as a paging request message of the CS service network over the LTE network, the processor 120 sends an incoming call response message, such as a paging response message, to the CS service network. The processor 120 suspends the LTE service and receives the caller identification information, such as a circuit-switched call (CC) setup message, from the CS service network. The processor 120 determines whether to connect the call by comparing the caller identification information with the reception control list. For example, when the caller identification information is included in the blacklist, the processor 120 restricts the voice call connection and resumes the LTE network connection. When the caller identification information is not included in the blacklist, the processor 120 connects the voice call by connecting to the CS service network. For example, when the caller identification information is included in the white list, the processor 120 connects the voice call by connecting to the CS service network.

The memory 130 can include volatile and/or nonvolatile memory. The memory 130 stores commands or data, such as the reception control list relating to at least another component of the electronic device 101. The memory 130 may store software and/or a program 140. The program 140 may include a kernel 141, middleware 143, an application programming interface (API) 145, and/or application programs (or "applications") 147. At least some of the kernel 141, the middleware 143, and the API 145 may be referred to as an operating system (OS).

The kernel 141 controls or manages system resources, such as the bus 110, the processor 120, or the memory 130 used for performing an operation or function implemented by the other programs, such as the middleware 143, the API 145, or the applications 147. Furthermore, the kernel 141 provides an interface through which the middleware 143, the API 145, or the applications 147 connects the individual elements of the electronic device 101 to control or manage the system resources.

The middleware 143 functions as an intermediary for allowing the API 145 or the applications 147 to communicate with the kernel 141 to exchange data.

In addition, the middleware 143 processes one or more task requests received from the applications 147 according to priorities thereof. For example, the middleware 143 assigns priorities for using the system resources of the electronic device 101, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function, such as an instruction for file control, window control, image processing, or text control.

The input/output interface 150 may include various circuitry that are configured and arranged to function as an interface that transfers instructions or data input from a user or another external device to the other element(s) of the electronic device 101. Furthermore, the input/output interface 150 outputs the instructions or data received from the other element(s) of the electronic device 101 to the user or an external electronic device.

The display 160 may include a liquid crystal display (LCD), a light emitting diode (LED) display, an organic LED (OLED) display, a micro electro mechanical system (MEMS) display, an electronic paper display, etc. The display 160 displays various types of content, such as text, images, videos, icons, or symbols for the user. The display 160 may include a touch screen and receive, for example, a touch, a gesture, proximity, a hovering input, etc., using an electronic pen or the user's body part. The display 160 may display a web page.

The communication interface 170 may including various communication circuitry that can establish a communication between the electronic device 101 and an external electronic device, such as a first external electronic device 102, a second external electronic device 104, or a server 106. For example, the communication interface 170 includes various communication circuitry that can communicate with the first external electronic device 102, the second external electronic device 104, or the server 106 in connection to the network 162 through wireless communication or wired communication or via a short-range communication 164. For example, the wireless communication can conform to a cellular communication protocol including at least one of LTE, LTE-advanced (LTE-A), code division multiple access (CDMA), wideband CDMA (WCDMA), universal mobile telecommunication system (UMTS), wireless broadband (WiBro), and global system for mobile communications (GSM).

The wired communication can include at least one of universal serial bus (USB), high definition multimedia interface (HDMI), recommended standard 232 (RS-232), and plain old telephone service (POTS).

The network 162 can include at least one of telecommunications networks, for example, a computer network such as local area network (LAN) or wide area network (WAN), the Internet, and a telephone network.

The electronic device 101 provides the LTE service in the single radio environment by use of at least one module functionally or physically separated from the processor 120.

Each of the first and second external electronic devices 102 and 104 may be a type of device that is the same as or different from the electronic device 101. According to an embodiment of the present disclosure, the server 106 may include a group of one or more servers. All or some of the operations to be executed by the electronic device 101 may be executed by another electronic device or a plurality of other electronic devices, such as the first external electronic device 102 and the second external electronic device 104 or the server 106. In the case where the electronic device 101 may perform a certain function or service automatically or by request, the electronic device 101 may request some functions that are associated therewith from the other electronic devices instead of or in addition to executing the function or service by itself. The first external electronic device 102 and the second external electronic device 104 or the server 106 may execute the requested functions or additional functions, and may transmit the results to the electronic device 101. The electronic device 101 may provide the requested functions or services by processing the received results. For this purpose, for example, a cloud computing technique, a distributed computing technique, or a client-server computing technique may be used.

Figure 2:
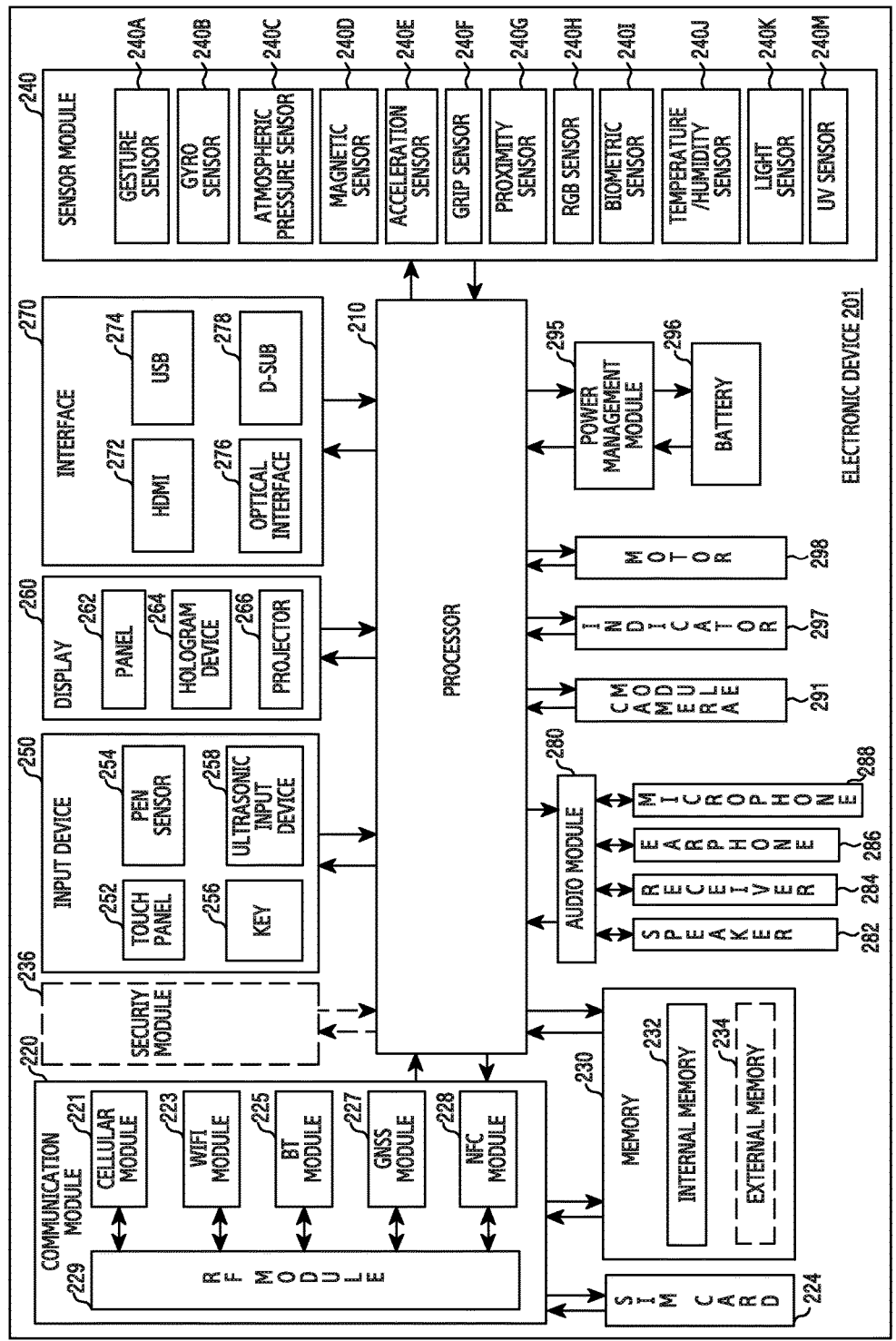
FIG. 2 illustrates a block diagram of an electronic device according to various embodiments of the present disclosure.

FIG. 2 is a diagram illustrating an example configuration of an electronic device according to various embodiments of the present disclosure.

Referring to FIG. 2, an electronic device 201 may include all or some of the components described with reference to the electronic device 101 of FIG. 1. The electronic device 201 includes at least one processor (AP) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The AP 210 controls a plurality of hardware or software elements connected to the AP 210 by driving an OS or an application program. The AP 210 processes a variety of data, including multimedia data, performs arithmetic operations, may be implemented with a system on chip (SoC) and may further include a graphical processing unit (GPU).

The communication module 220 may include various communication circuitry that performs data transmission/reception in communication between the second external electronic device 104 or the server 106 which may be connected with the electronic device 201 through the network 162. The communication module 220 includes various communication circuitry, such as, for example, and without limitation, at least one of a cellular module 221, a Wi-Fi module 223, a Bluetooth® (BT) module 225, a global navigation satellite system (GNSS) or GPS module 227, a near field communication (NFC) module 228, and a radio frequency (RF) module 229.

The cellular module 221 provides a voice call, a video call, a text service, or an Internet service, such as through a communication network including LTE, LTE-A, CDMA, WCDMA, UMTS, WiBro, and GSM, for example. In addition, the cellular module 221 identifies and authenticates the electronic device 201 within the communication network by using the SIM card 224. The cellular module 221 may perform at least some of functions that can be provided by the AP 210. For example, the cellular module 221 may perform at least some of multimedia control functions.

The cellular module 221 includes a CP. Further, the cellular module 221 may be implemented, for example, with a SoC. Although elements, such as the cellular module 221, the memory 230, and the power management module 295 are illustrated as separate elements with respect to the AP 210 in FIG. 2, the AP 210 may also be implemented such that at least one part, such as the cellular module 221 of the aforementioned elements is included in the AP 210.

The AP 210 or the cellular module 221 loads an instruction or data, which is received from each non-volatile memory connected thereto or at least one of different elements, to a volatile memory and processes the instruction or data. In addition, the AP 210 or the cellular module 221 stores data, which is received from at least one of different elements or generated by at least one of different elements, into the non-volatile memory.

Each of the Wi-Fi module 223, the BT module 225, the GNSS module 227, and the NFC module 228 includes a processor for processing data transmitted/received through a corresponding module. Although the cellular module 221, the Wi-Fi module 223, the BT module 225, the GNSS module 227, and the NFC module 228 are illustrated in FIG. 2 as separate blocks, at least two of the cellular module 221, the Wi-Fi module 223, the BT module 225, the GNSS module 227, and the NFC module 228 may be included in one integrated chip (IC) or IC package. For example, at least some of processors corresponding to the cellular module 221, the Wi-Fi module 223, the BT module 225, the GNSS module 227, and the NFC module 228, such as a communication processor corresponding to the cellular module 221 and a Wi-Fi processor corresponding to the Wi-Fi module 223, may be implemented with an SoC.

The RF module 229 transmits/receives data, such as an RF signal, and may include a transceiver, a power amp module (PAM), a frequency filter, or a low noise amplifier (LNA), for example. In addition, the RF module 229 may further include a component for transmitting/receiving a radio wave on a free space in wireless communication, for example, a conductor, or a conducting wire. The cellular module 221, the Wi-Fi module 223, the BT module 225, the GNSS module 227, and the NFC module 228 may share one RF module 229, and at least one of these modules may transmit/receive an RF signal via a separate RF module.

The SIM card 224 may be inserted into a slot formed at a specific location of the electronic device 201. The SIM card 224 includes unique identification information, such as an integrated circuit card identifier (ICCID) or subscriber information, such as an international mobile subscriber identity (IMSI).

The memory 230 includes an internal memory 232 or an external memory 234.

The internal memory 232 may include at least one of a volatile memory, such as a dynamic random access memory (DRAM), a static RAM (SRAM), or a synchronous dynamic RAM (SDRAM) or a non-volatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory. The internal memory 232 may be a solid state drive (SSD).

The external memory 234 may include a flash drive, a compact flash (CF), secure digital (SD), micro-SD, mini-SD, extreme digital (xD), and a memory stick, and may be operatively coupled to the electronic device 201 via various interfaces.

The electronic device 201 may further include a storage unit (or a storage medium), such as a hard drive.

The sensor module 240 measures a physical quantity or detects an operation state of the electronic device 201, and converts the measured or detected information into an electrical signal. The sensor module 240 includes, for example, at least one of a gesture sensor 240A, a gyro sensor 240B, a barometric pressure sensor, atmospheric sensor or air sensor 240C, a magnetic sensor 240D, an acceleration sensor 240E, a grip sensor 240F, a proximity sensor 240G a color sensor 240H, such as a red, green, blue (RGB) sensor, a biometric sensor 240I, a temperature/humidity sensor 240J, an illumination/illuminance (e.g., light) sensor 240K and an ultraviolet (UV) sensor 240M.

Additionally or alternatively, the sensor module 240 may include, for example, an E-node sensor, an electromyography (EMG) sensor, an electroencephalogram (EEG) sensor, an electrocardiogram (ECG) sensor, and a fingerprint sensor.

The sensor module 240 may further include a control circuit for controlling at least one or more sensors included therein.

The input device 250 may include various input circuitry, such as, for example, and without limitation, a touch panel 252, a (digital) pen sensor 254, a key 256, or an ultrasonic input unit 258.

The touch panel 252 recognizes a touch input by using at least one of an electrostatic type configuration, a pressure-sensitive type configuration, and an ultrasonic type configuration. The touch panel 252 may further include a control circuit. In the instance where the touch panel is of the electrostatic type, both physical contact recognition and proximity recognition are possible. The touch panel 252 may further include a tactile layer, which provides the user with a tactile reaction.

The (digital) pen sensor 254 may include a recognition sheet which is a part of the touch panel or is separated from the touch panel. The key 256 may include a physical button, an optical key, or a keypad. The ultrasonic input device 258 may detect ultrasonic waves generated by an input tool through a microphone 288, and may confirm data corresponding to the detected ultrasonic waves.

The (digital) pen sensor 254 may be implemented by using the same or similar method of receiving a touch input of the user or by using an additional sheet for recognition.

The key 256 may be a physical button, an optical key, a keypad, or a touch key.

The ultrasonic input unit 258 is a device by which the electronic device 201 detects a reflected sound wave through the microphone 288 and is capable of radio recognition. For example, an ultrasonic signal, which may be generated by using a pen, may be reflected off an object and detected by the microphone 288.

The electronic device 201 may use the communication module 220 to receive a user input from an external device, such as a computer or a server connected thereto.

The display 260 includes a panel 262, a hologram 264, or a projector 266.

The panel 262 may be a liquid crystal display (LCD) or an active-matrix organic light-emitting diode (AM-OLED), or the like, but is not limited thereto. The panel 262 may be implemented in a flexible, transparent, or wearable manner, and may be constructed as one module with the touch panel 252.

The hologram device 264 uses an interference of light and displays a stereoscopic image in the air.

The projector 266 displays an image by projecting a light beam onto a screen. The screen may be located inside or outside the electronic device 201.

The display 260 may further include a control circuit for controlling the panel 262, the hologram device 264, or the projector 266.

The interface 270 may include various interface circuitry, such as, for example, and without limitation, a HDMI 272, a USB 274, an optical communication interface 276, or a D-subminiature (D-sub) 278. The interface 270 may be included, for example, in the communication interface 160 of FIG. 1, and may include a mobile high-definition link (MHL), SD/multi-media card (MMC) or infrared data association (IrDA).

The audio module 280 bilaterally converts a sound and an electric signal. At least some elements of the audio module 280 may be included in the input/output interface 150 of FIG. 1. The audio module 280 converts sound information which is input or output through a speaker 282, a receiver 284, an earphone 286, or the microphone 288, for example.

The speaker 282 may output a signal of an audible frequency band and a signal of an ultrasonic frequency band. Reflected waves of an ultrasonic signal emitted from the speaker 282 and a signal of an external audible frequency band may be received.

The camera module 291 is a device for image and video capturing, and may include one or more image sensors, such as a front sensor or a rear sensor, a lens, an image signal processor (ISP), or a flash, such as a light emitting diode (LED) or a xenon lamp. In certain instances, it may prove advantageous to include two or more camera modules.

The power management module 295 manages power of the electronic device 201. The power management module 295 may include a power management integrated circuit (PMIC), a charger IC, or a battery gauge.

The PMIC may be placed inside an IC or SoC semiconductor. Charging is classified into wired charging and wireless charging. The charger IC charges a battery, prevents an over-voltage or over-current flow from a charger, and includes a charger IC for at least one of the wired and the wireless charging.

The wireless charging may be classified, for example, into a magnetic resonance type, a magnetic induction type, and an electromagnetic type. An additional circuit for the wireless charging, such as a coil loop, a resonant circuit, or a rectifier may be added.

The battery gauge may measure a residual quantity of the battery 296 and a voltage, current, and temperature during charging. The battery 296 stores or generates electricity and supplies power to the electronic device 201 by using the stored or generated electricity. The battery 296 may include a rechargeable battery or a solar battery.

The indicator 297 indicates a specific state, such as a booting, a message, or a charging state of the electronic device 201 or a part thereof, such as the AP 210.

The motor 298 converts an electric signal into a mechanical vibration.

The electronic device 201 includes a processing unit, such as a graphic processing unit (GPU), for supporting mobile TV which processes media data according to a protocol of, for example, digital multimedia broadcasting (DMB), digital video broadcasting (DVB), or media flow.

Each of the aforementioned elements of the electronic device 201 may include one or more components, and names thereof may vary depending on a type of the electronic device 201. The electronic device 201 may include at least one of the aforementioned elements. Some of the elements may be omitted, or additional other elements may be further included. In addition, some of the elements of the electronic device 201 may be combined and constructed as one entity, so as to equally perform functions of corresponding elements before combination.

At least some parts of a device, such as modules or functions thereof, or operations, may be implemented with an instruction stored in a computer-readable storage media for example. The instruction may be executed by the processor 210, to perform a function corresponding to the instruction. The computer-readable storage media may be the memory 230. At least some parts of the programming module may be executed by the processor 210. At least some parts of the programming module may include modules, programs, routines, and a set of instructions for performing one or more functions.

The electronic device 201 optionally includes a security module 236 for protecting the integrity of data stored in the memory 230 or transmitted to or from the electronic device 201 via the communication module 220.

Figure 3A:
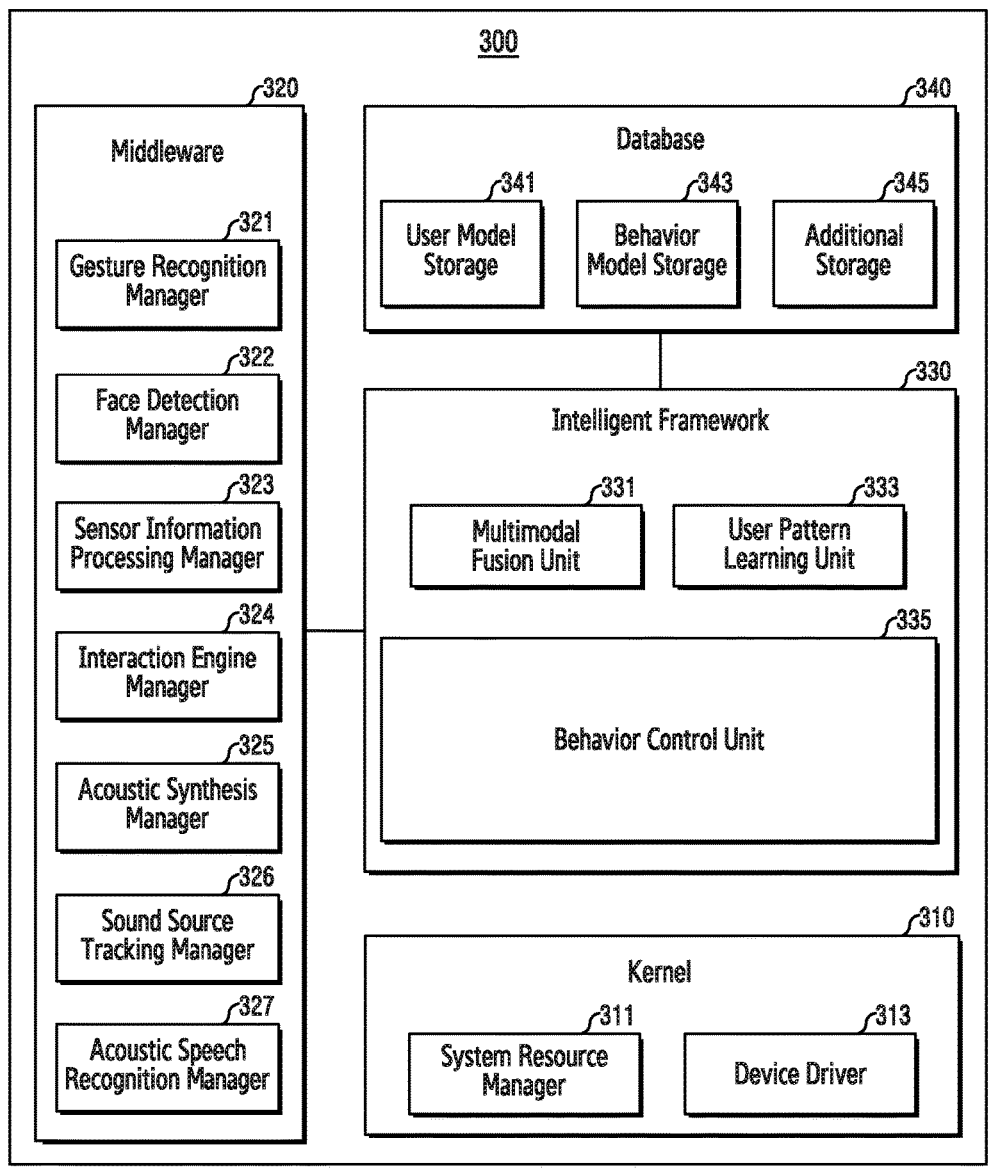
FIG. 3A illustrates a block diagram of a program module according to various embodiments of the present disclosure.

FIG. 3A illustrates a block diagram of a program module according to various embodiments of the present disclosure.

Referring to FIG. 3A, a program module 300 (e.g., the program 140) may include an OS that controls resources associated with an electronic device (e.g., the electronic device 101) and/or various applications (e.g., the application program 147) that are driven on the operating system. The operating system may be, for example, Android, iOS, Windows, Symbian, Tizen, or Bada.

The program module 300 may include a kernel 310, a middleware 320, an intelligent framework 330, and a database 340. At least a part of the program module 300 may be preloaded on the electronic device, or may be downloaded from an external electronic device (e.g., the first external electronic device 102 or the second external electronic 104, or the server 106).

The kernel 310 (e.g., the kernel 141) may include at least one of a system resource manager 311 and a device driver 313. The system resource manager 311 may perform at least one of a control, allocation, and recovery of a system resource. According to an embodiment, the system resource manager 311 may include at least one of a process management unit, a memory management unit, and a file system management unit. The device driver 313 may include at least one of, for example, a display driver, a camera driver, a Bluetooth driver, a common memory driver, a USB driver, a keypad driver, a Wi-Fi driver, an audio driver, and an inter-process communication (IPC) driver.

The middleware 320 (e.g., the middleware 143) may provide various functions. According to an embodiment, the middleware 320 may include a gesture recognition manager 321, a face detection manager 322, a sensor information processing manager 323, an interaction engine manager 324, an acoustic synthesis manager 325, a sound source tracking manager 326, and an acoustic speech recognition manager 327.

The intelligent framework 330 may include at least one of a multimodal fusion unit 331, a user pattern learning unit 333, and a behavior control unit 335. The multimodal fusion unit 331 may collect or manage various kinds of information processed by the middleware 320. The user pattern learning unit 333 may extract or learn meaningful information, such as a user's life pattern and a user's preference, using the information of the multimodal fusion unit 331. The behavior control unit 335 may control the behavior of the electronic device 101. According to an embodiment, the behavior control unit 335 may express information to be fed back to the user from the electronic device 101 in at least one of a mechanical action, graphics, or sound of the electronic device 101.

The database 340 may include at least one of a user model storage 341, a behavior model storage 343, or an additional storage 345. The user model storage 341 may store learned information for each user. The behavior model storage 343 may store various behavioral models of the electronic device 101. The additional storage 345 may store other information. According to an embodiment, the database 340 may be stored in an external device or may be shared via a network.

According to various embodiments, at least a portion of the program module 300 may be implemented by software, firmware, hardware, or a combination of two or more thereof. At least a portion of the program module 300 may be implemented (e.g., executed) by, for example, a processor (e.g., the processor 210). At least a portion of the program module 300 may include, for example, a module, a program, a routine, a set of instructions, or a process for performing one or more functions.

Figure 3B:
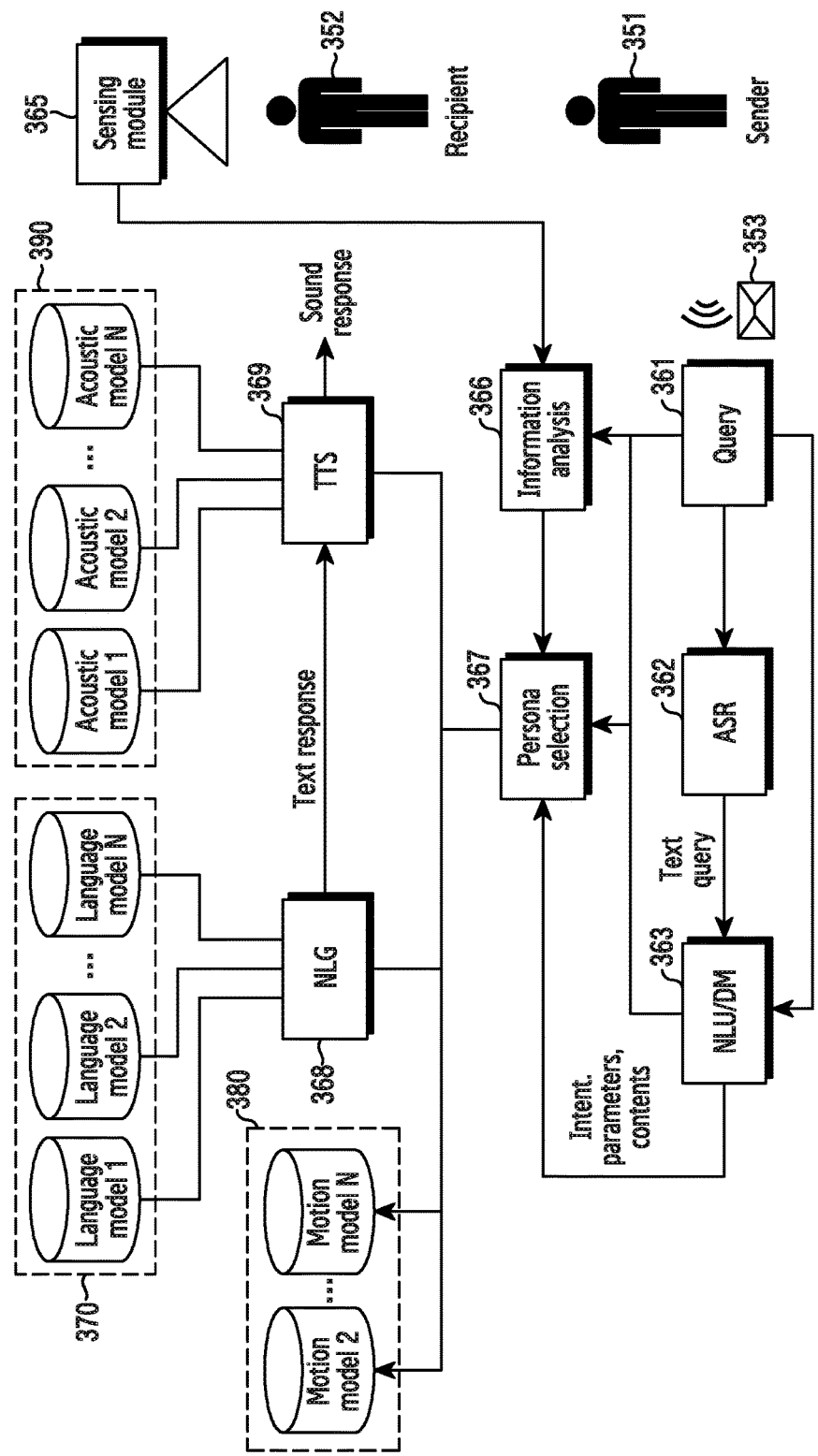
FIG. 3B illustrates a view for explaining an acoustic speech recognition technique according to various embodiments of the present disclosure.

FIG. 3B illustrates a view for explaining an acoustic speech recognition technique according to various embodiments of the present disclosure.

Referring to FIG. 3B, the electronic device 101 may receive a message 353 for the user, i.e., the recipient 352, from a sender 351. The electronic device 101 may query 361 a message 353 using an acoustic speech to perform acoustic speech recognition (ASR) 362. Alternatively, the electronic device 101 may query 361 metadata of the message 353 to perform an information analysis 366. In particular, the electronic device 101 may perform the information analysis 366 via a sensing module 365 so as to determine the recipient 352 based on the collected information. In addition, the electronic device 101 may use the information for the recipient 352 for persona selection 367.

The electronic device 101 may acquire a text as a result of performing the ASR 362, and may perform a natural language understanding/dialog management (NLU/DM) 363 using the text as a query. Here, the electronic device 101 may recognize the text as a sentence through the natural language understanding and dialog management. The electronic device 101 may use at least one of an intent, a parameter, and a content, which are obtained through the NLU/DM 363, for the persona selection 367. The electronic device 101 may use the query 361 of the message 353 itself for the persona selection 367.

The electronic device 101 may select one language model among one or more language models 370 via a natural language generator (NLG) 368 based on the determined persona. For example, the electronic device 101 may determine at least one text generation variable. The electronic device 101 may select one behavior model among one or more behavior models 380 via the NLG 368 based on the determined persona. For example, the electronic device 101 may determine at least one behavior variable. The electronic device 101 may select one acoustic model among one or more acoustic models 390 via the NLG 368 based on the determined persona. For example, the electronic device 101 may determine at least one acoustic speech generation variable to output a text-converted message via the NLG 368. The electronic device 101 may output a sound response in accordance with the selected acoustic model 390. The electronic device 101 may perform a text-to-speech (TTS) 369 to output a sound response.

In accordance with the foregoing, the electronic device 101 may change factors for the NLG 368 and the TTS 369 according to a relationship of one or more entities or a content to be transmitted so as to provide a dynamic result to an interacting user.

In the process of the attribute determination 367, the electronic device 101 may use not only the content of a message to be transmitted, but also a sensor of vision or sound, connectivity, personal profile data, and the like for identifying at least one user and environments. In the case of the language model 370, another language model 370 may be determined according to the electronic device 101. For example, when a relationship of the electronic device 101 is set as a friend by presetting or learning, a language model 370 can be selected to construct a word and sentence indicating affinity. When a message to be delivered to the user is an urgent message, an acoustic model 390 having fast and distinct tone features is selected so that the message may be subjected to a language conversion. In another embodiment, the electronic device 101 may modulate a high frequency band sound into an acoustic model of a low frequency band sound so as to output an audible sound based on information that is vulnerable to hearing by the recipient 352.

Figure 4A:
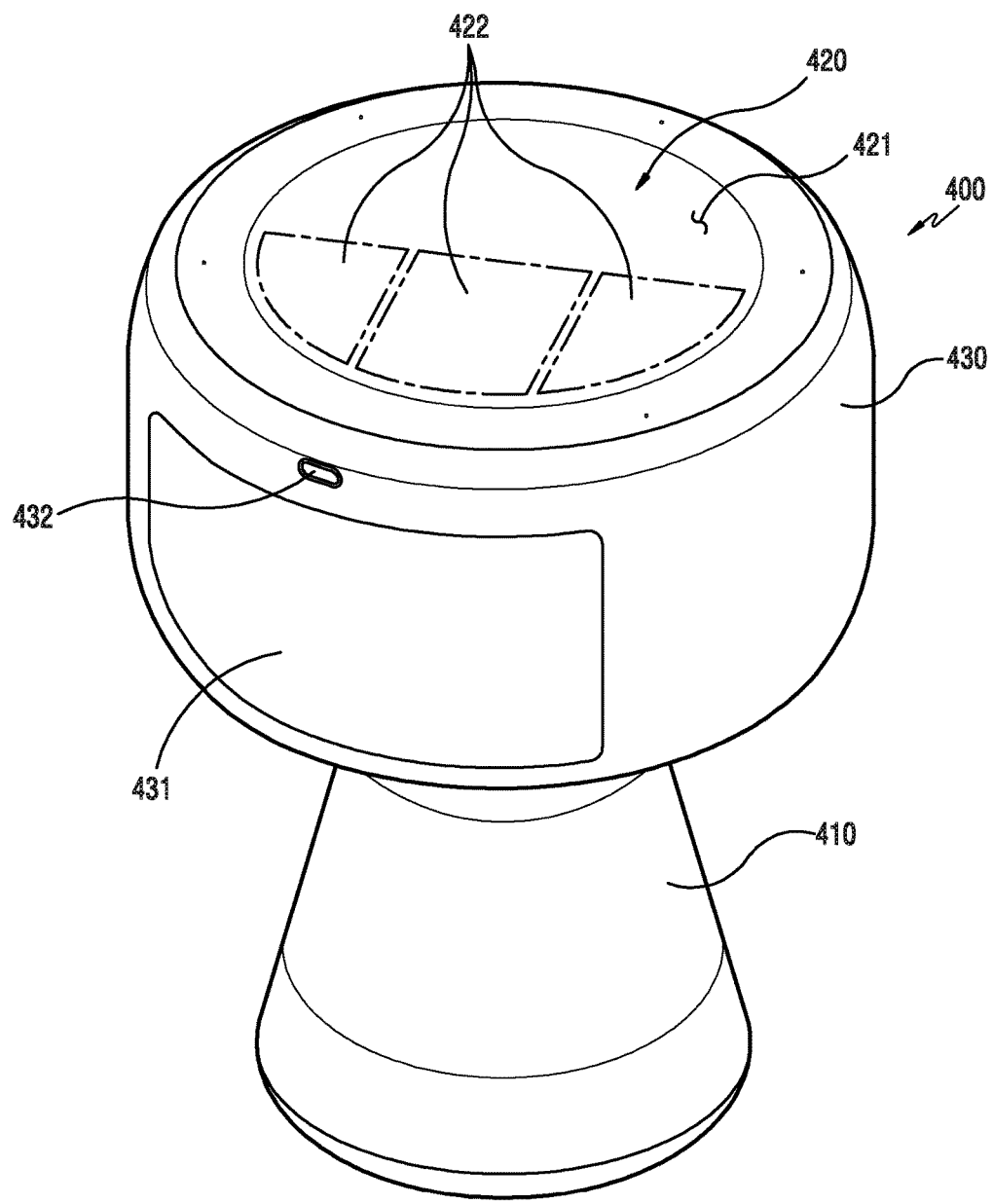
FIG. 4A illustrates a perspective view of an intelligent electronic device according to various embodiments of the present disclosure.

FIG. 4A illustrates a perspective view of an intelligent electronic device according to various embodiments of the present disclosure.

Figure 4B:
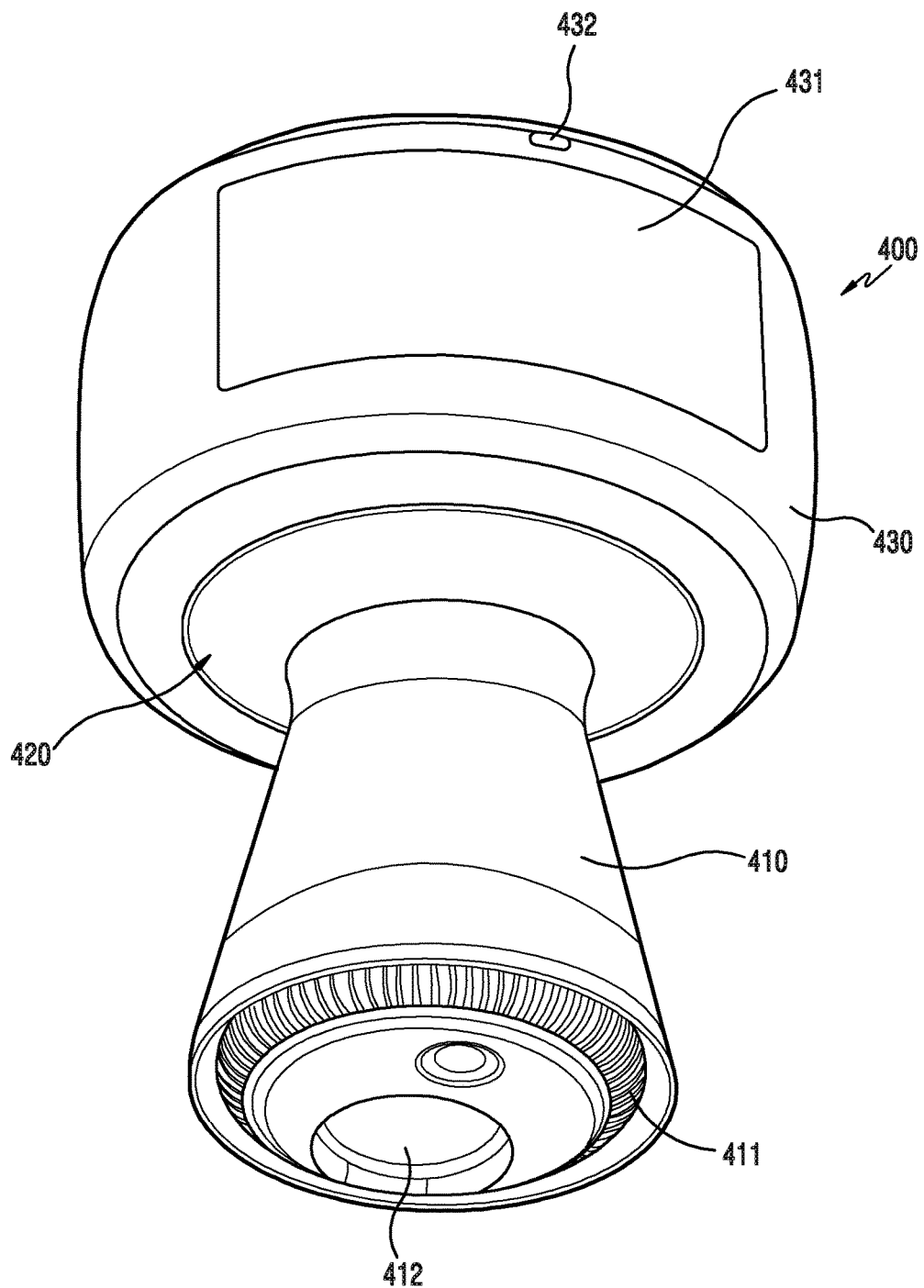
FIG. 4B illustrates a bottom side perspective view of an intelligent electronic device according to various embodiments of the present disclosure.

FIG. 4B illustrates a bottom side perspective view of an intelligent electronic device according to various embodiments of the present disclosure.

Figure 4C:
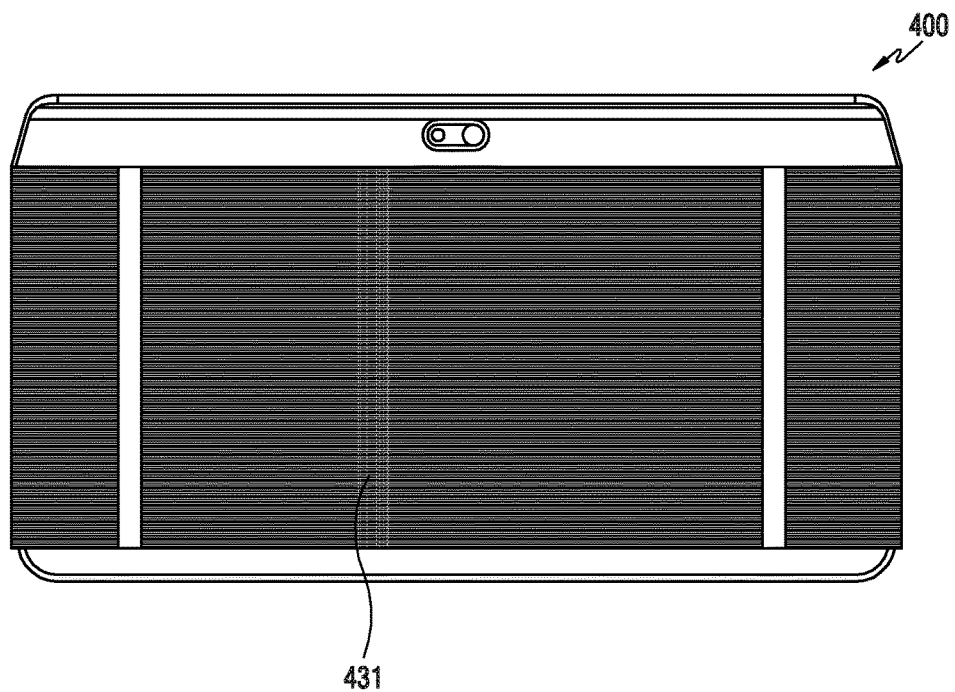
FIG. 4C is a view illustrating a display of the intelligent electronic device according to various embodiments of the present disclosure.

FIG. 4C is a view illustrating a display of an intelligent electronic device according to various embodiments of the present disclosure.

Referring to FIGS. 4A and 4B, an intelligent electronic device 400 may include a base 410, a fixed head 420 secured to the top of the base 410, and a movable head 430 disposed to surround at least a part of the fixed head 420 and installed to be movable in at least two directions with respect to the fixed head 420. According to an embodiment, the base 410 and the fixed head 420 are separately illustrated and described, but are not limited thereto. For example, the base 410 and the fixed head 420 may be integrally formed in a range where the movement of the movable head 430 is not restricted. According to an embodiment, the upper and lower ends of the fixed head 420 are formed in a shape obtained by cutting the upper and lower ends of a spherical shape, so that the movable head 430 enclosing the fixed head 420 is movable.

According to various embodiments, the bottom of the base 410 may include a plurality of speaker holes 411 for outputting an audio generated from a built-in speaker device. According to an embodiment, the bottom of the base 410 may include a cable receiving space 412 for receiving a data cable and/or a power cable when the intelligent electronic device 400 is implemented in a wired connection type. However, without being limited thereto, the intelligent electronic device 400 may be equipped with a wireless charging coil member for wireless charging.

According to various embodiments, the fixed head 420 may be fixed to the top of the base 410. According to an embodiment, the top surface 421 of the fixed head 420 may include at least one input device 422. According to an embodiment, the input device 422 may include at least one physical key button. According to an embodiment, the input device 422 may include at least one touch type key pad. According to various embodiments, the movable head 430 may be moved in various directions to be interactive with the user by an input manipulation of the input device 422.

According to various embodiments, the movable head 430 may be disposed to surround at least a part of the fixed head 420, and may be arranged to be movable in various directions with respect to the fixed head 420. According to an embodiment, the movable head 430 may self-rotate with reference to the fixed head 420, or may be moved to be tilted at an angle in various directions. According to an embodiment, the movable head 430 may be configured to be moved by receiving an input operation of the above-mentioned input device, by detecting an external object (e.g., an object, a pupil of a person, an image, etc.), or based on a user's gesture or sound input.

According to various embodiments, the movable head 430 may include a display 431 that is disposed in least a portion thereof. According to an embodiment, the display 431 may include a touch screen device that includes a touch sensor. According to an embodiment, the surface of the movable head 430, in which the display 431 is disposed, may include a window. According to an embodiment, in this case, as shown in FIG. 4C, a gradation painting may be performed that differentiates the painting of a window area positioned near the display 431 and the painting of the window area positioned away from the display 431. According to an embodiment, a gradation processing may be performed from the outside to the inside such that the colors of some portions of the left and right areas are transparent in black, with reference to the active area of the display 431.

According to various embodiments, the movable head 430 may include at least one sensor module 432. According to an embodiment, the at least one sensor module 432 may include at least one of an image sensor (e.g., an image pickup element, a camera module, an infrared sensor, or an ultrasonic sensor) that detects a movement of an external object; a sound detecting sensor (e.g., a microphone) that detects external sound; a temperature sensing sensor that detects an external temperature; an odor sensor that senses an external odor; and an atmospheric pressure sensor. According to an embodiment, the electronic device (e.g., a processor of the electronic device, etc.) can move the movable head in a corresponding direction using sensing parameters detected by the at least one sensor module.

Although not illustrated, according to various embodiments, the intelligent electronic device 400 may include an output device (e.g., a vibrator or a haptic member) capable of interacting with the user.

According to various embodiments, the at least one sensor module may be disposed in at least a portion of the base 410. In this case, the sensor module may be activated when the sensor module is positioned in a direction where the sensor module is capable of covering the moving direction of the movable head 430.

Figure 5A:
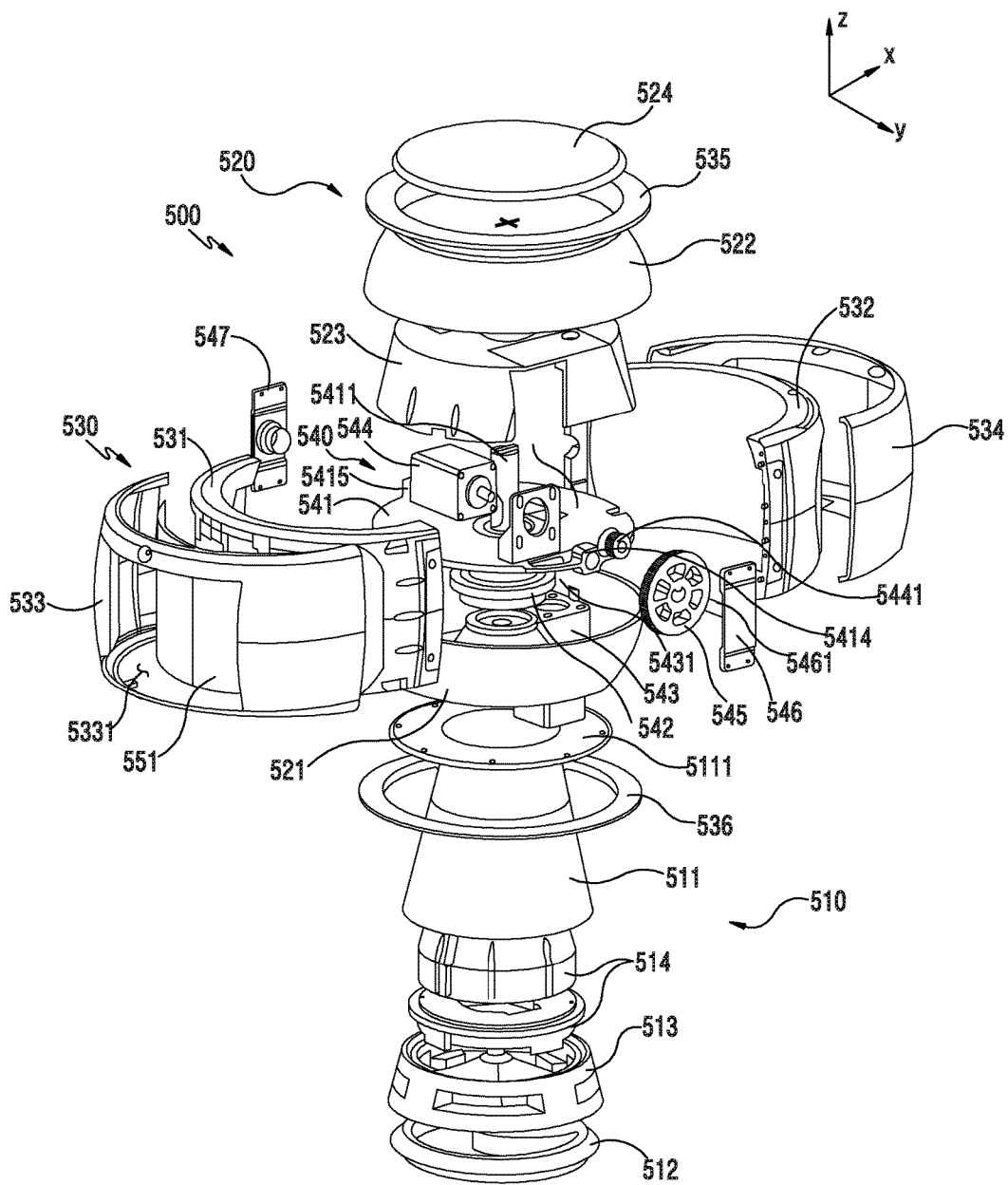
FIG. 5A illustrates an exploded perspective view of an intelligent electronic device according to various embodiments of the present disclosure.

FIG. 5A is an exploded perspective view of an intelligent electronic device according to various embodiments of the present disclosure.

Figure 5B:
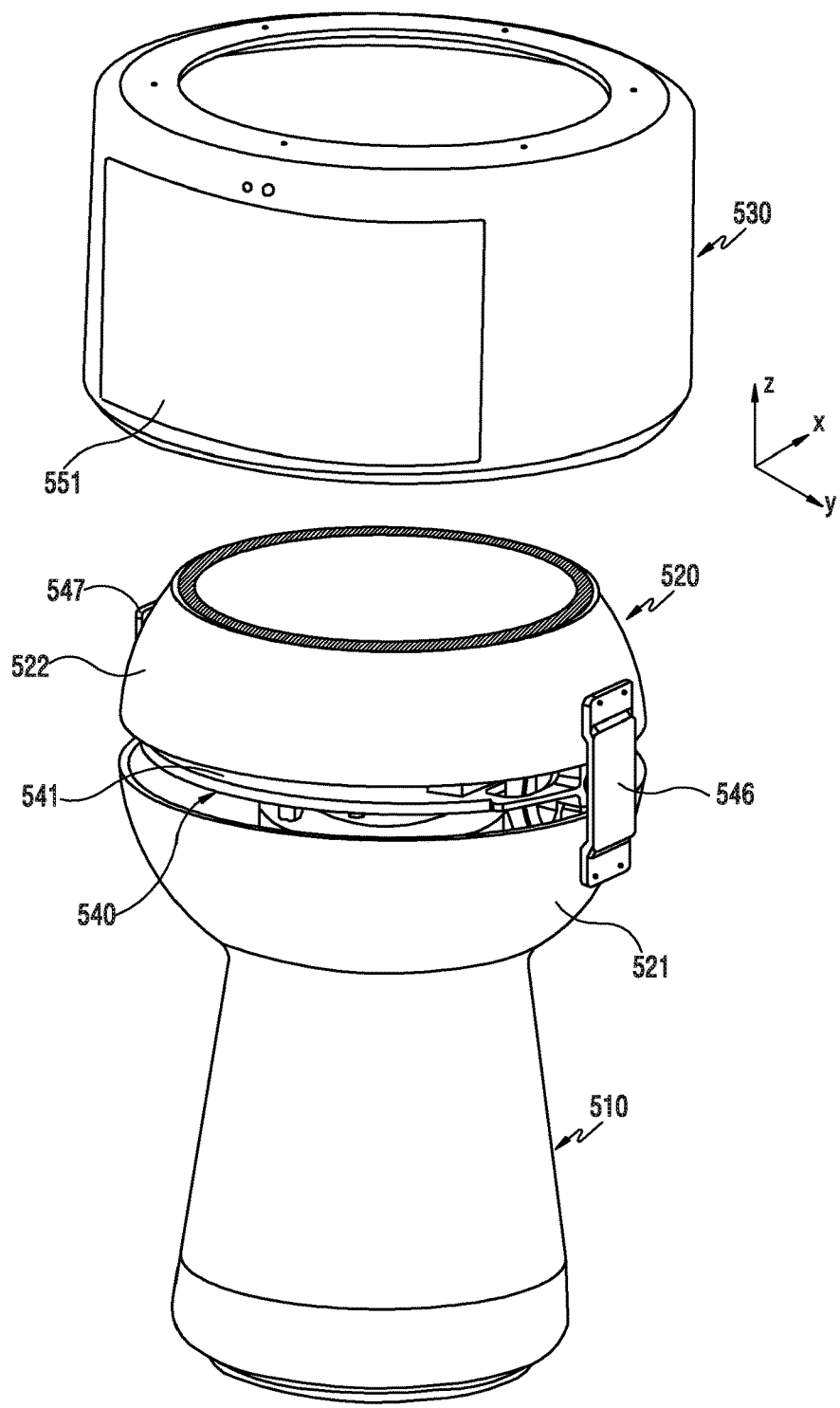
FIG. 5B is a view illustrating a state in which a movable head is separated from a fixed head according to various embodiments of the present disclosure.

FIG. 5B is a view illustrating a state in which a movable head is separated from a fixed head according to various embodiments of the present disclosure. The intelligent electronic device of FIGS. 5A and 5B may be another embodiment of an intelligent electronic device that is similar to or different from the intelligent electronic device 400 of FIG. 4A.

Referring to FIGS. 5A and 5B, an intelligent electronic device 500 may include a base 510, a fixed head 520 fixed to the top of the base 510, a movable head 530 disposed to be movable in such a manner that the movable head 530 surrounds at least a portion of the fixed head 520, and a drive unit 540 configured to move the movable head 530 in various directions within the fixed head 520. According to an embodiment, the drive unit 540 may include a lower drive unit that allows the movable head 530 to rotate about the z-axis and an upper drive unit that allows the movable head 530 to rotate about the y-axis.

According to various embodiments, the base 510 may include a stand housing 511 having a length and including an internal space, and may also include a bottom plate 512, a bracket accommodation housing 513, and a speaker bracket 514, which are sequentially housed in the internal space of the stand housing 511 in a downward direction of the stand housing 511. According to an embodiment, the speaker bracket 514 may accommodate a speaker device, and sound may be emitted through a speaker hole disposed at the bottom of the base 510. According to an embodiment, the bracket accommodation housing 513 and the bottom plate 512 may include an accommodation space that accommodates data cable and/or power cable housed from the bottom thereof. According to an embodiment, the bottom plate 512, the bracket accommodation housing 513, and the speaker bracket 514 may be fixed to the inner space of the stand housing 511 by a mechanical assembly structure or a separate fastening member (e.g., a screw). According to an embodiment, the upper portion of the stand housing 511 may include a fixed head support plate 5111 having a diameter larger than that of the stand housing 511 and integrally formed with the stand housing 511. A lower housing 521 of the fixed head 520, which will be described later, may be fixed to the fixed head support plate 5111.

According to various embodiments, the fixed head 520 may be disposed in a manner in which the lower housing 521 and an upper housing 522 are coupled to each other. According to an embodiment, an inner housing 523 may be disposed in the inner space of the lower housing 521 and the upper housing 522, and the drive unit 540 may be disposed on the inner space formed by the inner housing 523 and the lower housing 521. However, without being limited to this, the drive unit 540 may be disposed on the inner space that is formed as the lower housing 521 and the upper housing 522 are coupled to each other. According to an embodiment, the upper housing 522 and the lower housing 521 may be fixedly coupled to the upper and lower ends of a shaft 5411, respectively, in which the shaft 5411 is arranged through the rotary plate 541. According to an embodiment, the lower housing 521 and the upper housing 522 may be coupled to each other by a structural coupling or a separate fastening member (e.g., a screw). According to an embodiment, at least some the components (e.g., the rotation plate 541, a first fixing piece 546, and a second fixing piece 547) of the drive unit 540 may be exposed or protrude through a gap (e.g., a movable recess) formed after the lower housing 521 and the upper housing 522 are coupled to each other, and at least a portion of the movable head 530 may be fixed to the some exposed or protruding components of the drive unit 540 such that the movable head 530 is movable (e.g., rotatable by a predetermined angle using the z-axis and/or the y-axis as a rotation axis) on the fixed head 520.

According to an embodiment, an upper panel 524 may be disposed in the upper portion of the upper housing 522. According to an embodiment, the upper panel 524 may be exposed on the top of the intelligent electronic device 500. According to an embodiment, the above-mentioned input device 422 (see FIGS. 4A, 4B, and 4C) may be disposed on the top of the upper panel 524. Without being limited thereto, however, at least a portion of the upper panel 524 may be used as an additional display. In this case, the display may include a touch screen device including a touch sensor.

According to various embodiments, the movable member 530 may include a first bracket 531 and a second bracket 532 that are movably disposed in a manner of enclosing the fixed head 520. According to an embodiment, the first bracket 531 and the second bracket 532 are partially fixed to a pair of fixing pieces 546 and 547 that are drawn out through the drive unit 540 disposed in the fixed head 520. According to an embodiment, the inner surfaces of the first bracket 531 and the second bracket 532 are disposed to be spaced apart from the outer surface of the fixed head 520, and may be fixed to the pair of fixing pieces 546 and 547, respectively, which are movable by the drive unit 540.

According to various embodiments, a first window 533 may be disposed in a manner of enclosing the outer circumferential surface of the first bracket 531. According to an embodiment, a second window 534 may be disposed in a manner of enclosing the outer circumferential surface of the second bracket 532. According to an embodiment, an opening 5331 is formed in the first window 533 so that a display module 551 disposed on the first bracket 531 can be exposed to the outside of the first window 533. According to an embodiment, a transparent color window may be applied to a portion corresponding to the display module 551 exposed in the first window 533. According to an embodiment, the first and second windows 531 and 532 may be formed of an acrylic or glass material to include a transparent window in an area corresponding to the display module 551.

According to various embodiments, the drive unit 540 may include a rotation plate 541 rotatably disposed within the fixed head 520, a lower drive unit disposed below the rotation plate 541, and an upper drive unit disposed above rotation plate 541. According to an embodiment, the lower drive unit may move the movable head 530 to be rotatable about the z-axis. The upper drive unit may move the movable head 530 to be rotatable about the y-axis.

According to various embodiments, the rotation plate 541 may be rotatably fixed inside the fixed head 520. According to an embodiment, the rotation plate 541 may be disposed in such a manner that the lower end of the rotation plate 541 is fixed to the lower housing 521, and the shaft 5411 whose upper end is fixed to the upper housing 522 is passed therethrough. According to various embodiments, the rotation plate 541 may be installed to be rotatable on the shaft 5411. According to an embodiment, the rotation plate 541 may be formed a synthetic resin material or a metallic material. According to an embodiment, the rotation plate 541 may include the first fixing piece 546 and the second fixing piece 547. According to an embodiment, the first and second brackets 531 and 532 of the movable head 530 are fixed to the first fixing piece 546 and the second fixing piece 547 so that, when the rotation plate 541 rotates, the movable head 530 is also rotated together with the rotation plate 541.

According to various embodiments, the lower drive unit of the drive unit 540 may include a first drive motor 543 disposed in the lower housing 521 of the fixed head 520, and a first gear 542 disposed coaxially with the shaft 5411 on the rear surface 5413 of the rotation plate 541 in the lower housing 521 in order to receive the rotational force of the first drive motor 543. According to an embodiment, the first gear 542 is disposed to be engaged with a pinion gear 5431 of the first drive motor 543 so that the driving force of the first drive motor 543 is transmitted to the first gear 542 through the pinion gear 5431 to rotate the first gear 542, and as a result, the rotation plate 541 can also be rotated therewith. However, without being limited thereto, the driving force of the first drive motor 543 may be transmitted by a drive transmission structure (e.g., a belt) other than the gear combination.

According to various embodiments, the upper drive unit of the drive unit 540 may include a second drive motor 544 disposed in the top surface 5415 of the rotation plate 541, and a second gear 545 disposed to be rotated together with the gear fixing shaft 5461 of the first fixing piece 546 in order to receive the rotational force of the second drive motor 544. According to an embodiment, the gear fixing shaft 5461 of the first fixing piece 546, which includes the second gear 545, may be rotatably fixed to the first hinge arm 5414 disposed at one side of the rotation plate 541. According to an embodiment, the second fixing piece 547 may be disposed at the position of the rotation plate 541 corresponding to the first hinge arm 5414, and may be disposed to be capable of being idled on the rotation plate 541. According to an embodiment, the second gear 545 is disposed to be engaged with a pinion gear 5441 of the second drive motor 544 so that the driving force of the second drive motor 544 is transmitted to the second gear 545 through the pinion gear 5441 to rotate the second gear 545, and as a result, the movable head 530 fixed to the first fixing piece 546 can also be rotated therewith. However, without being limited thereto, the driving force of the second drive motor 544 may be transmitted by a drive transmission structure (e.g., a belt) other than the gear combination.

According to various embodiments, an upper fixing ring 535 may be disposed on the upper housing 522 of the fixed head 520 to be exposed to the outside. According to various embodiments, a lower fixing ring 536 may be disposed on the lower housing 521 of the fixed head 520 to be exposed to the outside. According to an embodiment, the upper fixing ring 535 and the lower fixing ring 536 may be used as decorative members since they are exposed to the outside.

Figure 6A:
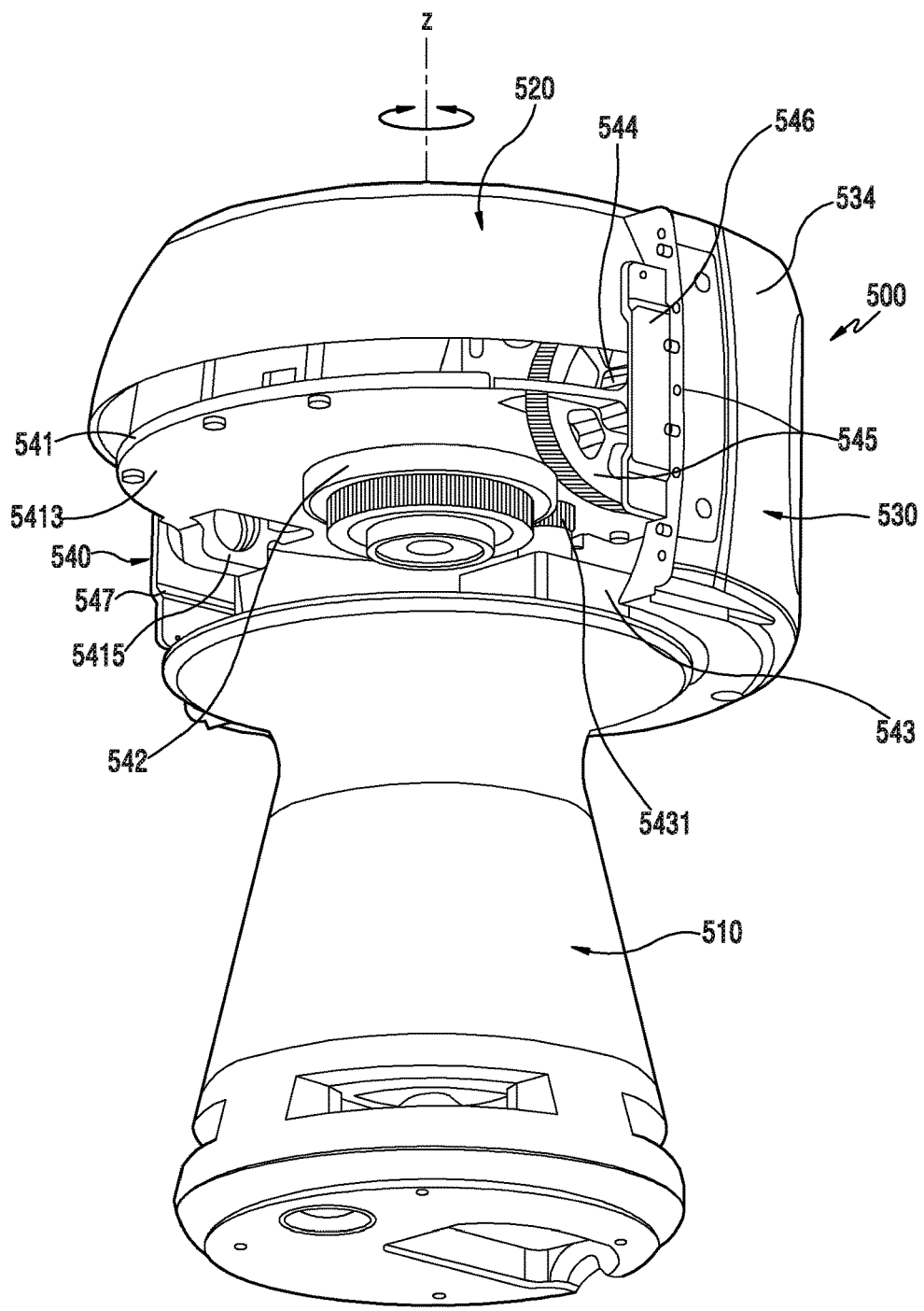
FIG. 6A is a view illustrating a configuration of a lower drive unit of an intelligent electronic device according to various embodiments of the present disclosure.

FIG. 6A is a view illustrating a configuration of a lower drive unit of an intelligent electronic device according to various embodiments of the present disclosure.

Figure 6B:
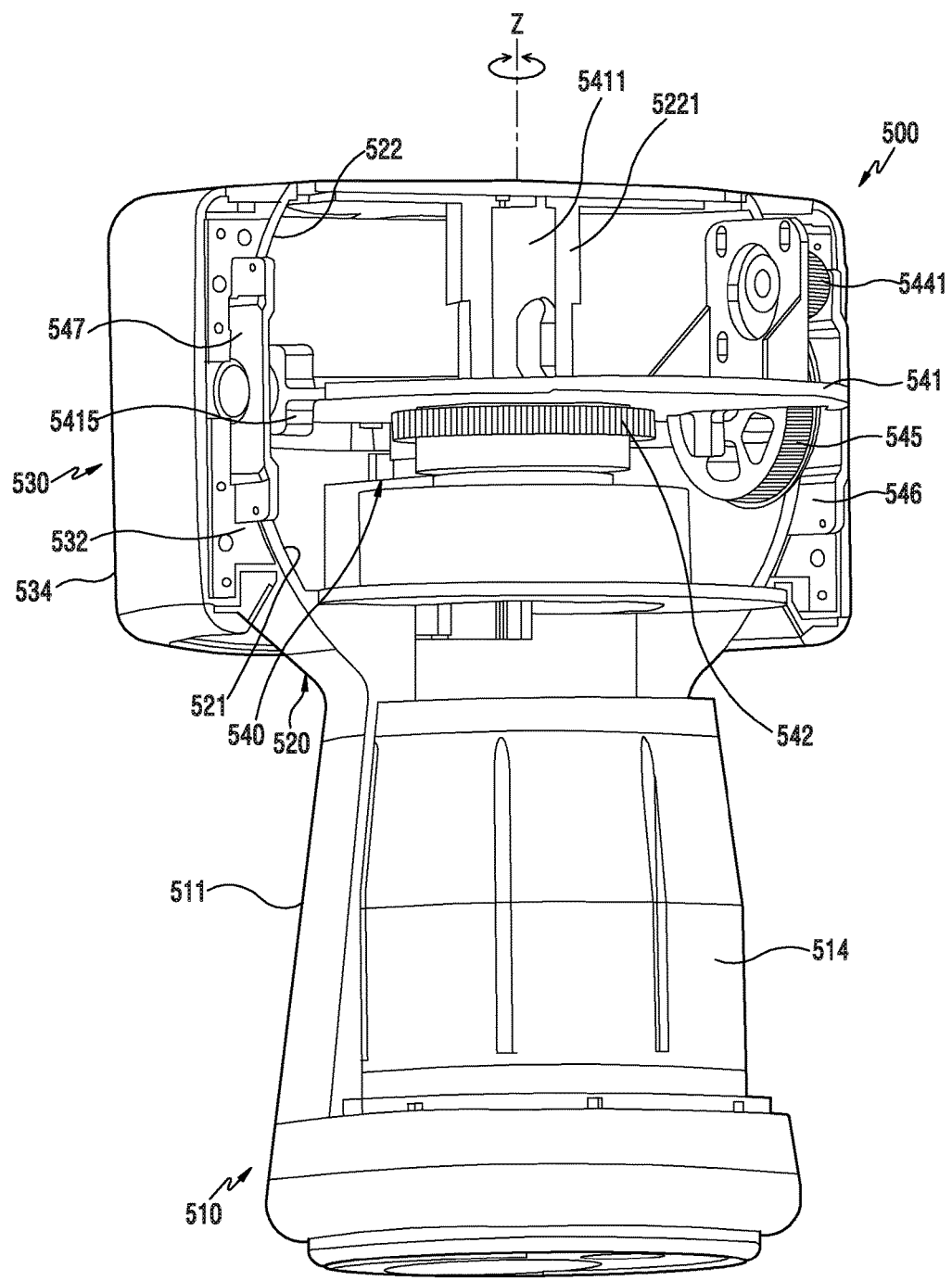
FIG. 6B is a view illustrating a lower drive unit of an intelligent electronic device according to various embodiments of the present disclosure, which is viewed from another direction.

FIG. 6B is a view illustrating a lower drive unit of an intelligent electronic device which is viewed from another direction according to various embodiments of the present disclosure.

Figure 6C:
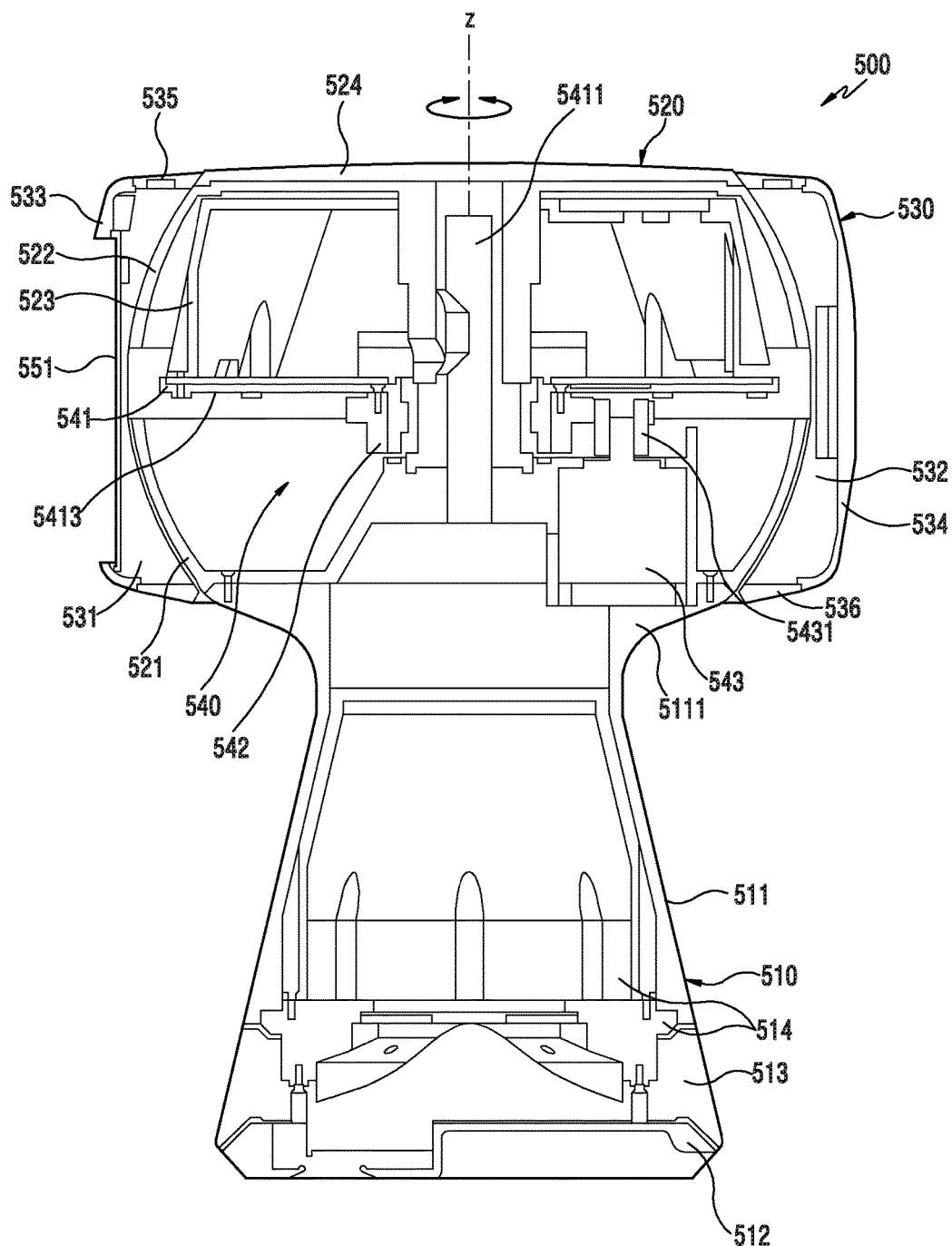
FIGS. 6C and 6D are cross-sectional views each illustrating a main portion of an intelligent electronic device according to various embodiments of the present disclosure.
Figure 6D:
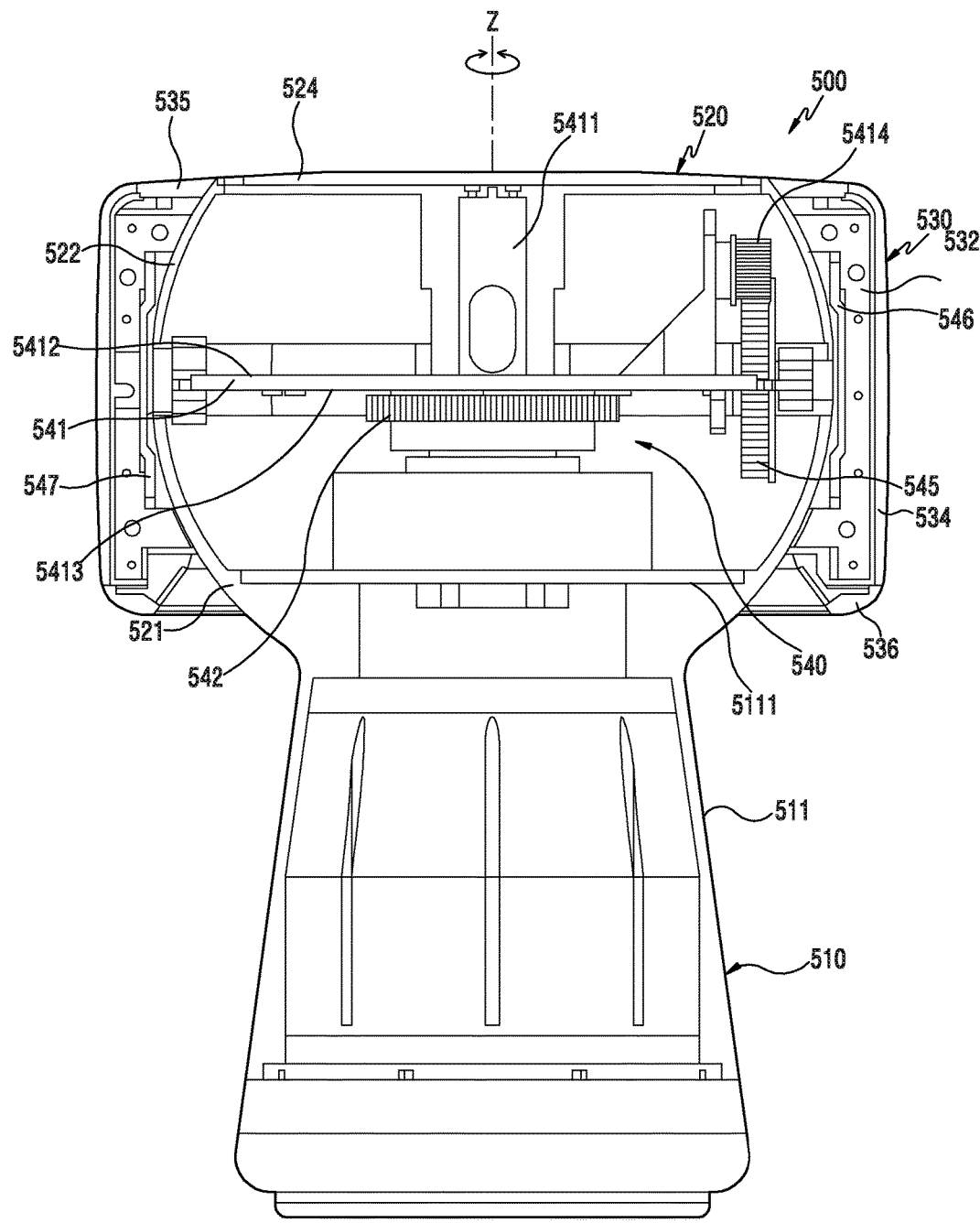

FIGS. 6C and 6D are cross-sectional views each illustrating a main portion of an intelligent electronic device according to various embodiments of the present disclosure.

Referring to FIGS. 6A to 6D, the first gear 542 of the lower drive unit of the drive unit 540 may be disposed to be rotated together with the rear surface 5413 of the rotation plate 541, and may be engaged with the pinion gear 5431 of the first drive motor 543 disposed in the fixed head 520 to be capable of receiving the rotational force. According to an embodiment, when the pinion gear 5431 of the first drive motor 543 is rotated, the first gear 542 may be rotated, and the rotation plate 541 may be rotated therewith. According to an embodiment, when the rotation plate 541 is rotated, the first fixing piece 546 fixed to the rotation plate 541 may also be rotated about the z-axis.

Figure 7A:
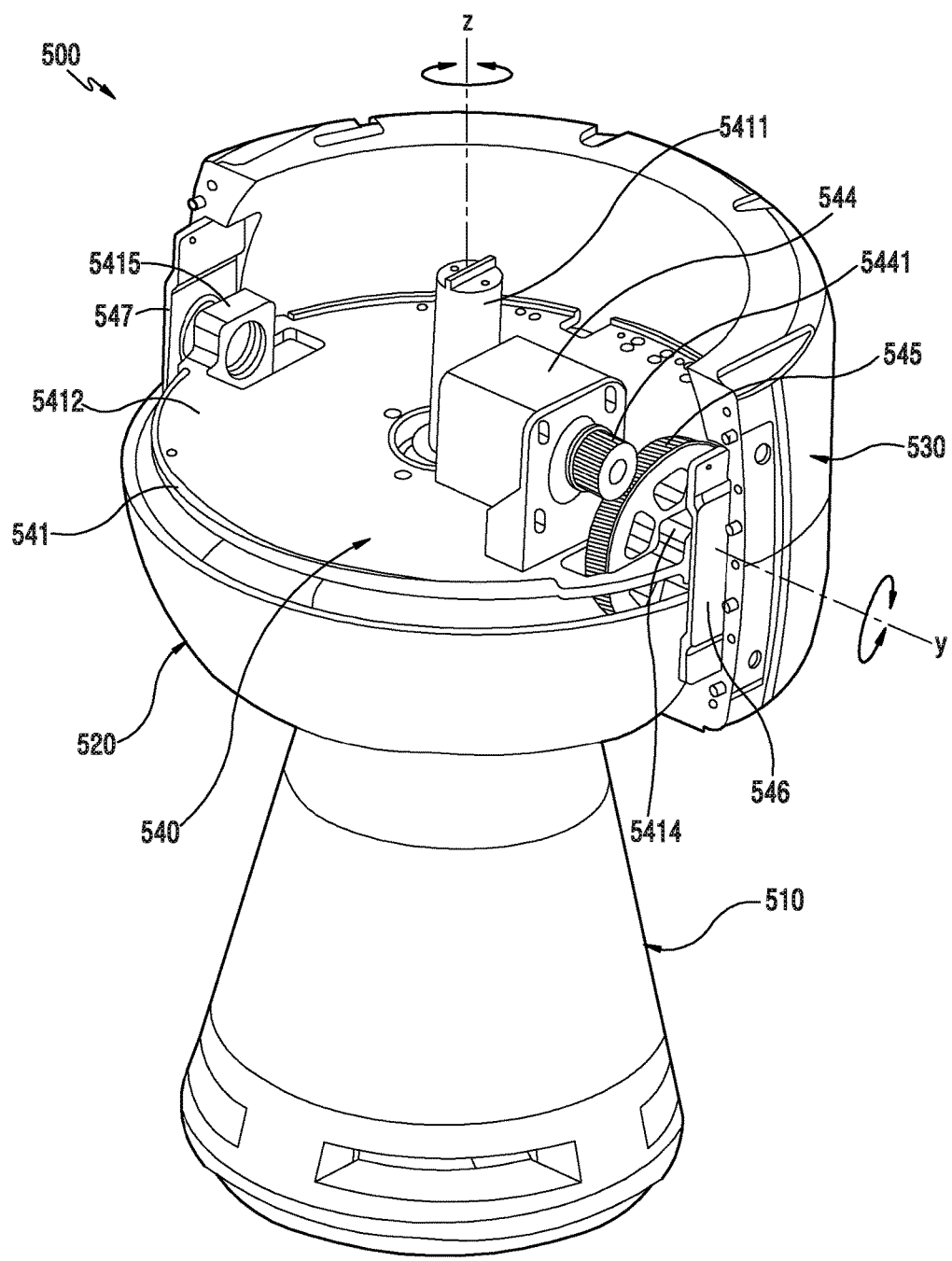
FIG. 7A is a view illustrating a configuration of an upper drive unit of an intelligent electronic device according to various embodiments of the present disclosure.

FIG. 7A is a view illustrating a configuration of an upper drive unit of an intelligent electronic device according to various embodiments of the present disclosure.

Figure 7B:
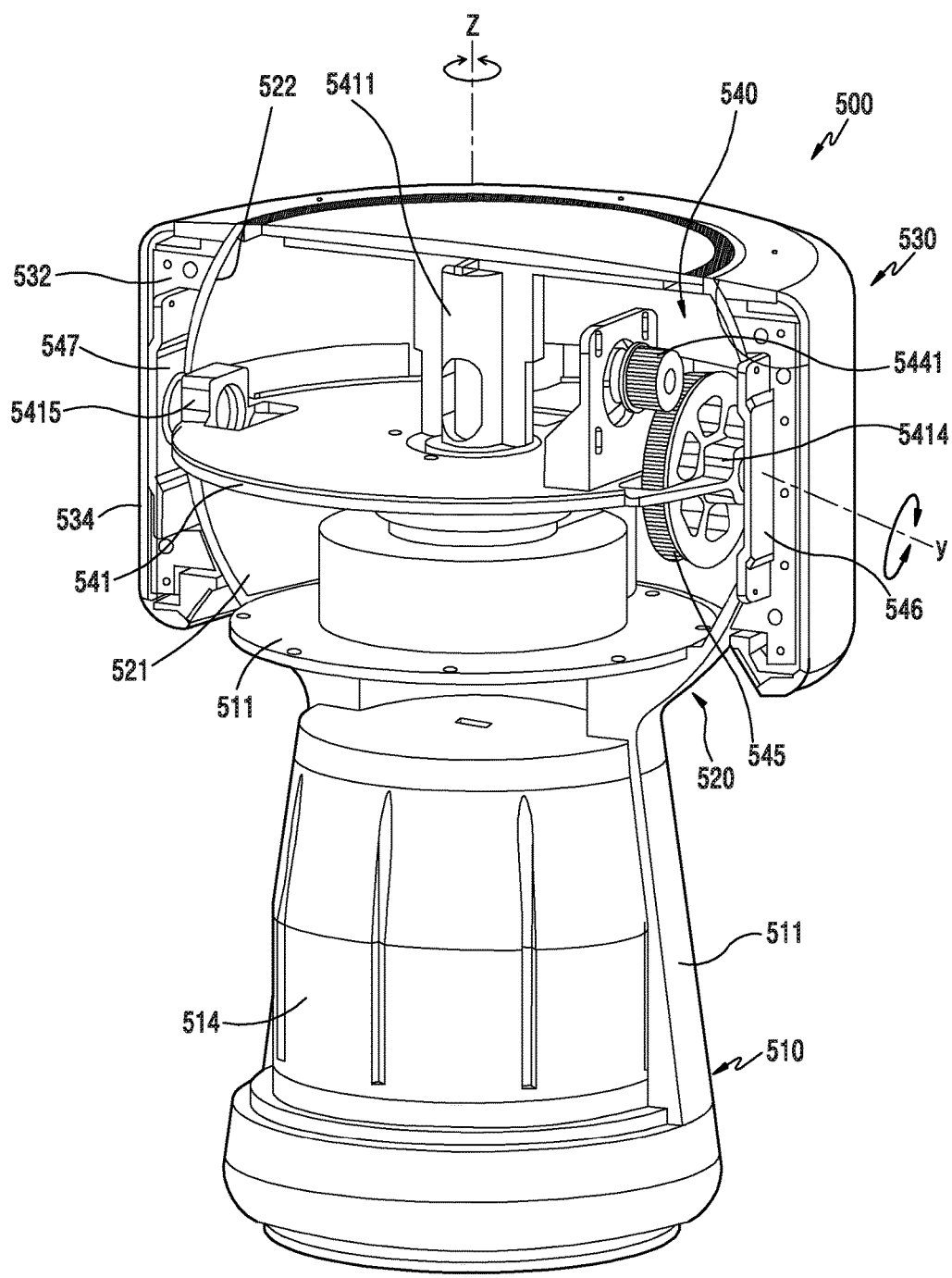
FIG. 7B is a view illustrating a lower drive unit of the intelligent electronic device according to various embodiments of the present disclosure, which is viewed from another direction.

FIG. 7B is a view illustrating the lower drive unit of an intelligent electronic device which is viewed from another direction according to various embodiments of the present disclosure.

Figure 7C:
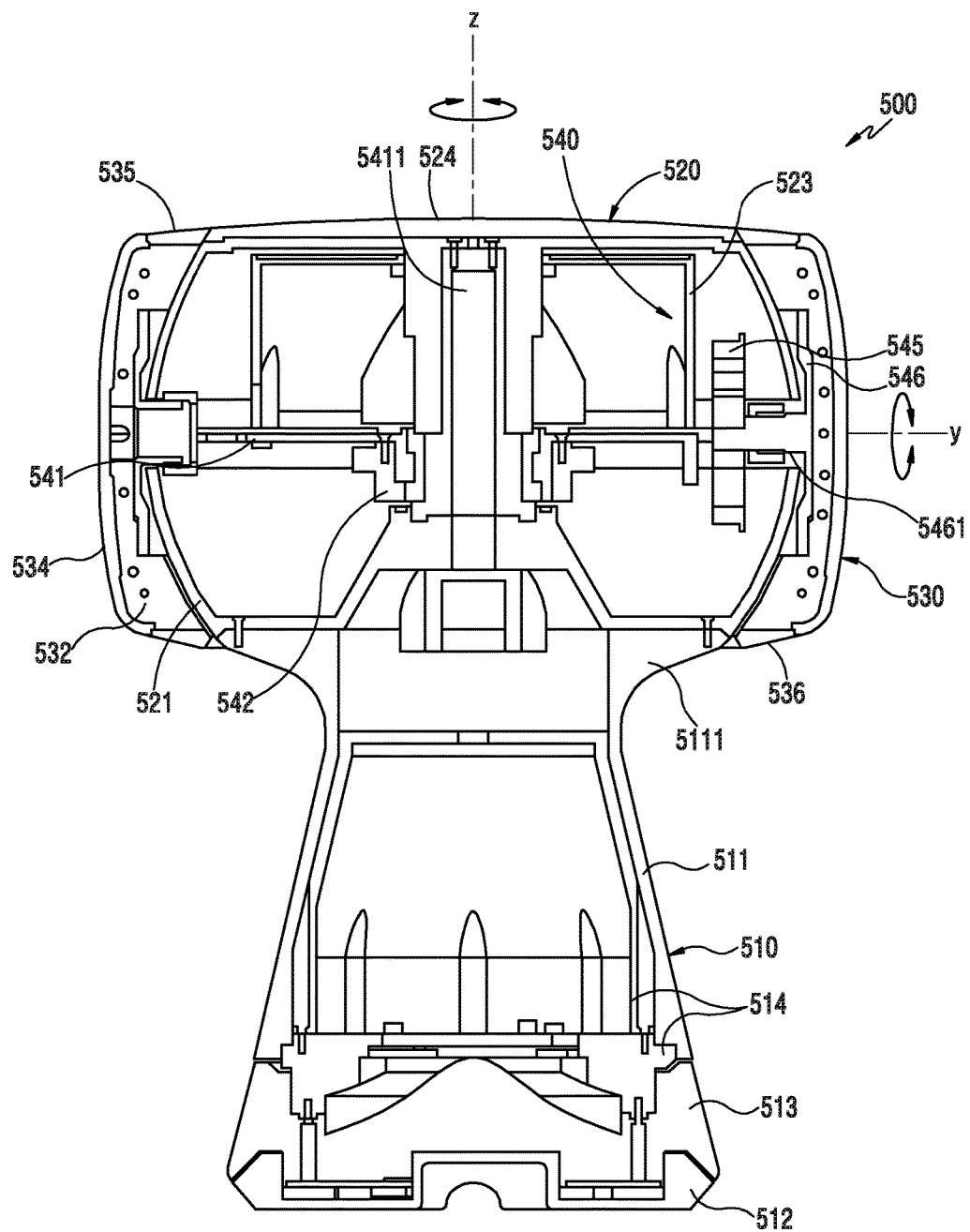
FIGS. 7C and 7D are cross-sectional views each illustrating a main portion of an intelligent electronic device according to various embodiments of the present disclosure.
Figure 7D:
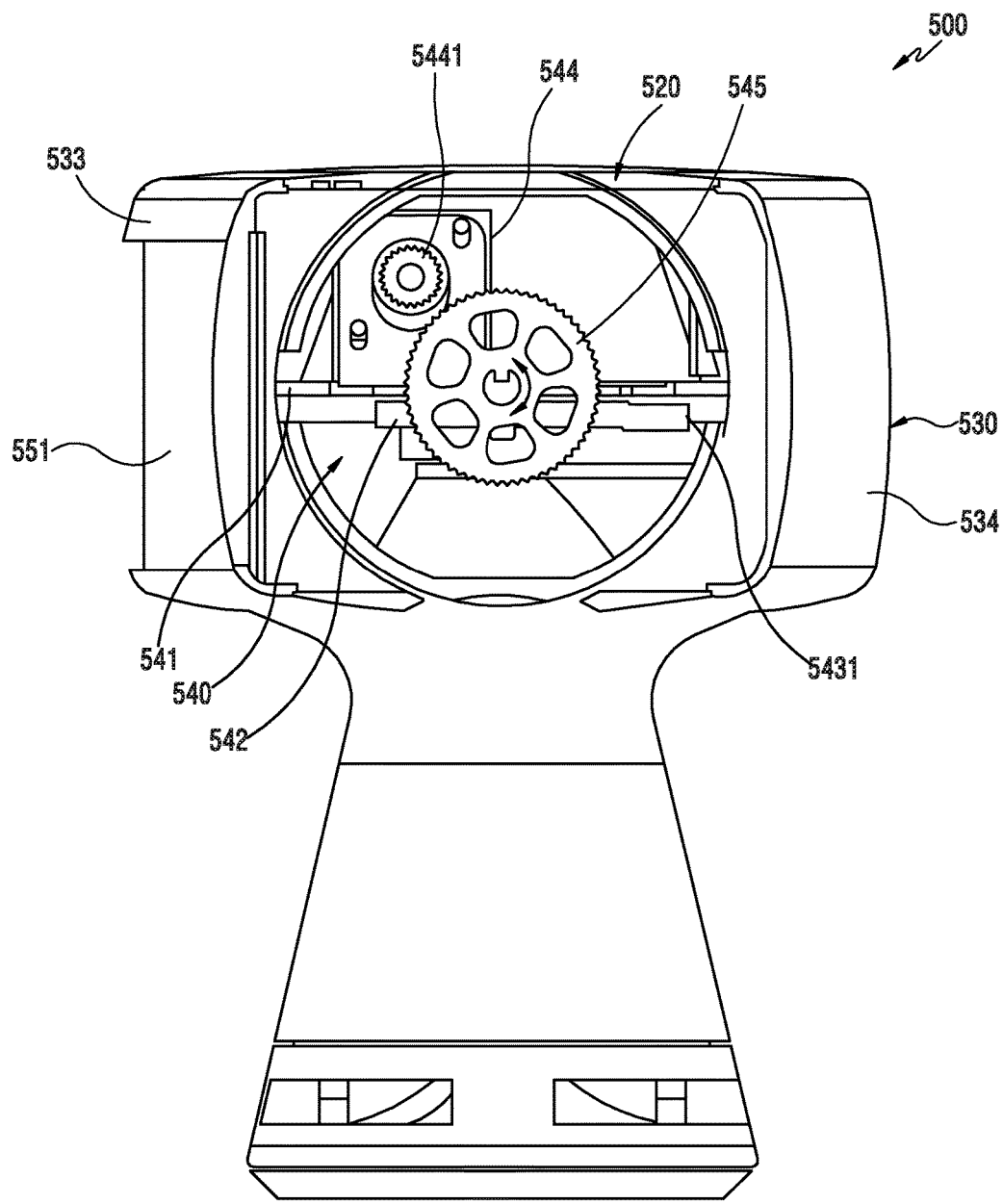

FIGS. 7C and 7D are cross-sectional views each illustrating a main portion of an intelligent electronic device according to various embodiments of the present disclosure.

Referring to FIGS. 7A to 7D, the first fixing piece 546 of the lower drive unit of the drive unit 540 may be fixed together with the first and second brackets 531 and 532 of the fixed head 520. According to an embodiment, the first fixing piece 546 may be rotatably fixed via the first hinge arm 5414 of the rotation plate 541. According to an embodiment, when the pinion gear 5441 of the second drive motor 544 is rotated, the second gear 545 may be rotated, and the movable head 530 fixed to the first fixing piece 546 may also be rotated therewith. According to an embodiment, the movable head 530 is rotatable about the y-axis.

Figure 8A:
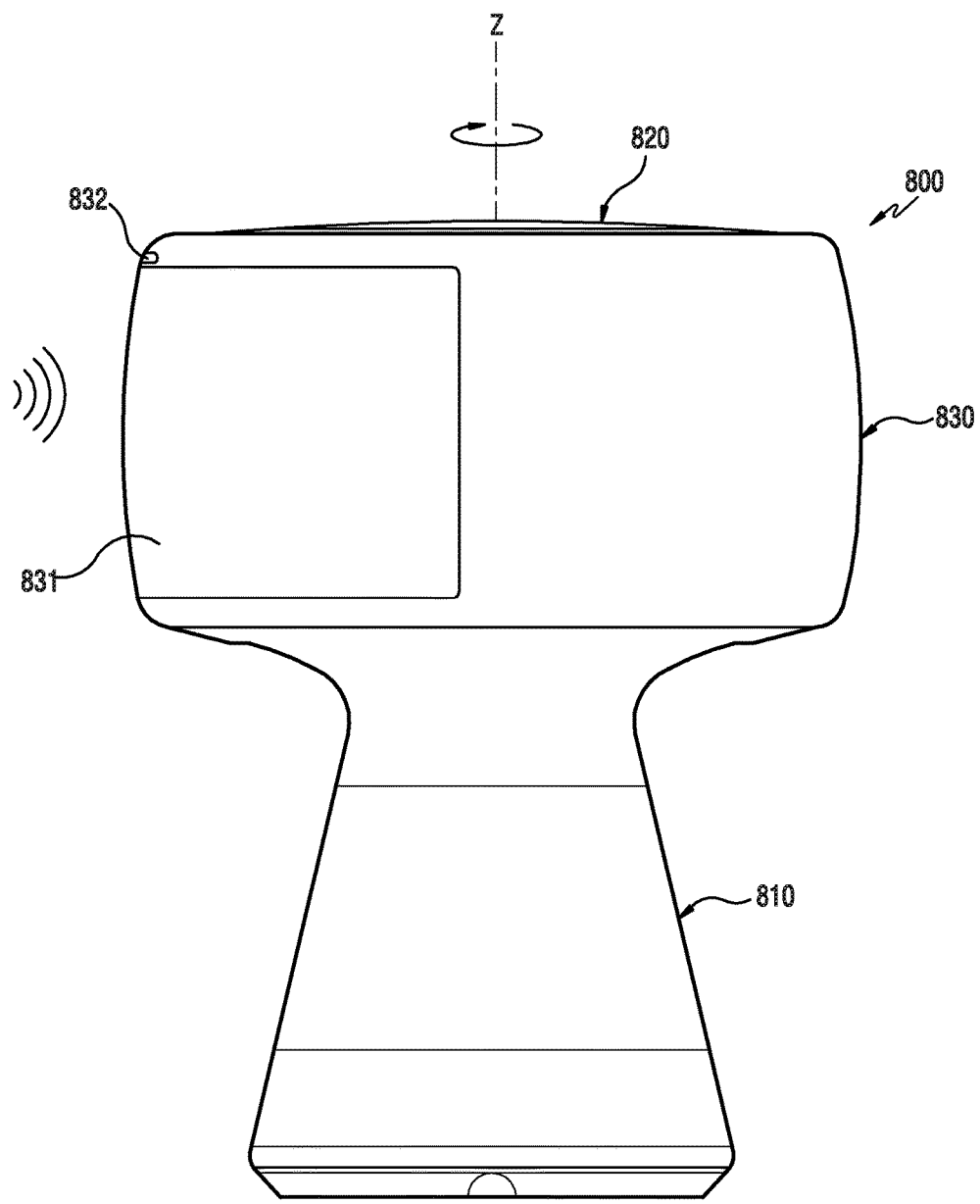
FIGS. 8A and 8B are operation diagrams each illustrating an operating relationship of a movable head by a lower drive unit of an intelligent electronic device according to various embodiments of the present disclosure.
Figure 8B:
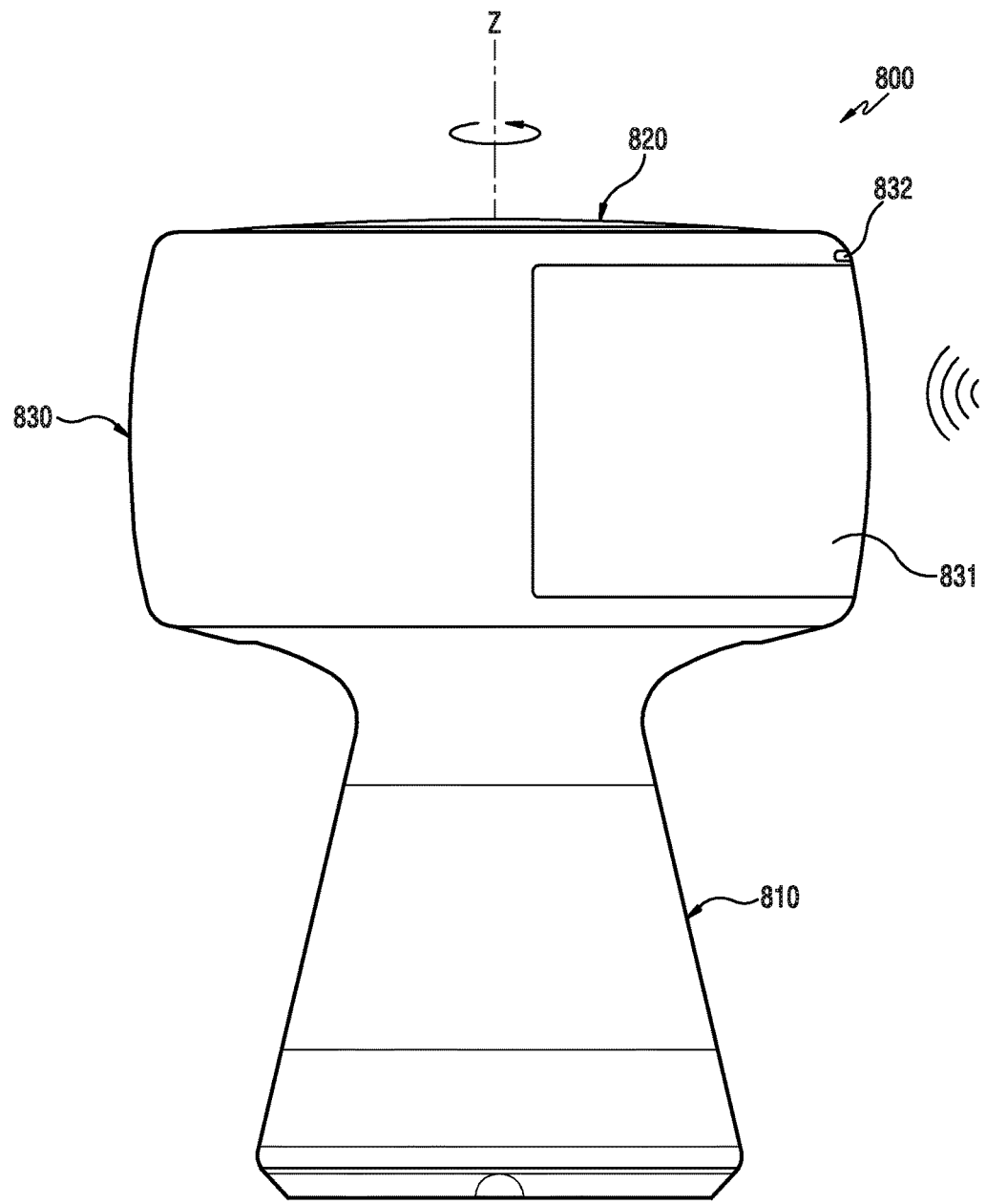

FIGS. 8A and 8B are operation diagrams each illustrating an operating relationship of a movable head by a lower drive unit of an intelligent electronic device according to various embodiments of the present disclosure.

The intelligent electronic device of FIGS. 8A and 8B may be another embodiment of an intelligent electronic device that is similar to or different from the intelligent electronic device 400 of FIG. 4A and the intelligent electronic device 500 of FIG. 5A.

Referring to FIGS. 6A to 6D and FIGS. 8A and 8B, an intelligent electronic device 800 may include a base 810, a fixed head 820 fixed to the top of the base 810, a movable head 830 disposed to be movable in such a manner that the movable head surrounds at least a portion of the fixed head 820.

According to various embodiments, as illustrated in FIG. 8A, when an external input (e.g., an external object, a user, or an acoustic speech) is received in the left direction of the intelligent electronic device 800, a sensor member 832 may sense it, the electronic device 800 may determine the direction where the external input is sensed and may determine a driving amount for driving the movable head 830 so as to cause a display 831 to face the corresponding direction, and may control the first drive motor 543 or the second drive motor 544 according to the driving amount. According to an embodiment, the intelligent electronic device 800 may rotate the movable head 830 clockwise about the z-axis by a predetermined angle by operating the first drive motor 543 of the lower drive unit of the drive unit 540 according to the determined driving amount.

According to various embodiments, as illustrated in FIG. 8B, when an external input (e.g., an external object, a user, or an acoustic speech) is received in the right direction of the intelligent electronic device 800, the sensor member 832 may sense it, the electronic device 800 may determine the direction where the external input is sensed and may determine a driving amount for driving the movable head 830 so as to cause the display 831 to face the corresponding direction, and may control the first drive motor 543 or the second drive motor 544 according to the driving amount. According to an embodiment, the intelligent electronic device 800 may rotate the movable head 830 counterclockwise about the z-axis by a predetermined angle by operating the first drive motor 543 of the lower drive unit of the drive unit 540 according to the determined driving amount.

Figure 9A:
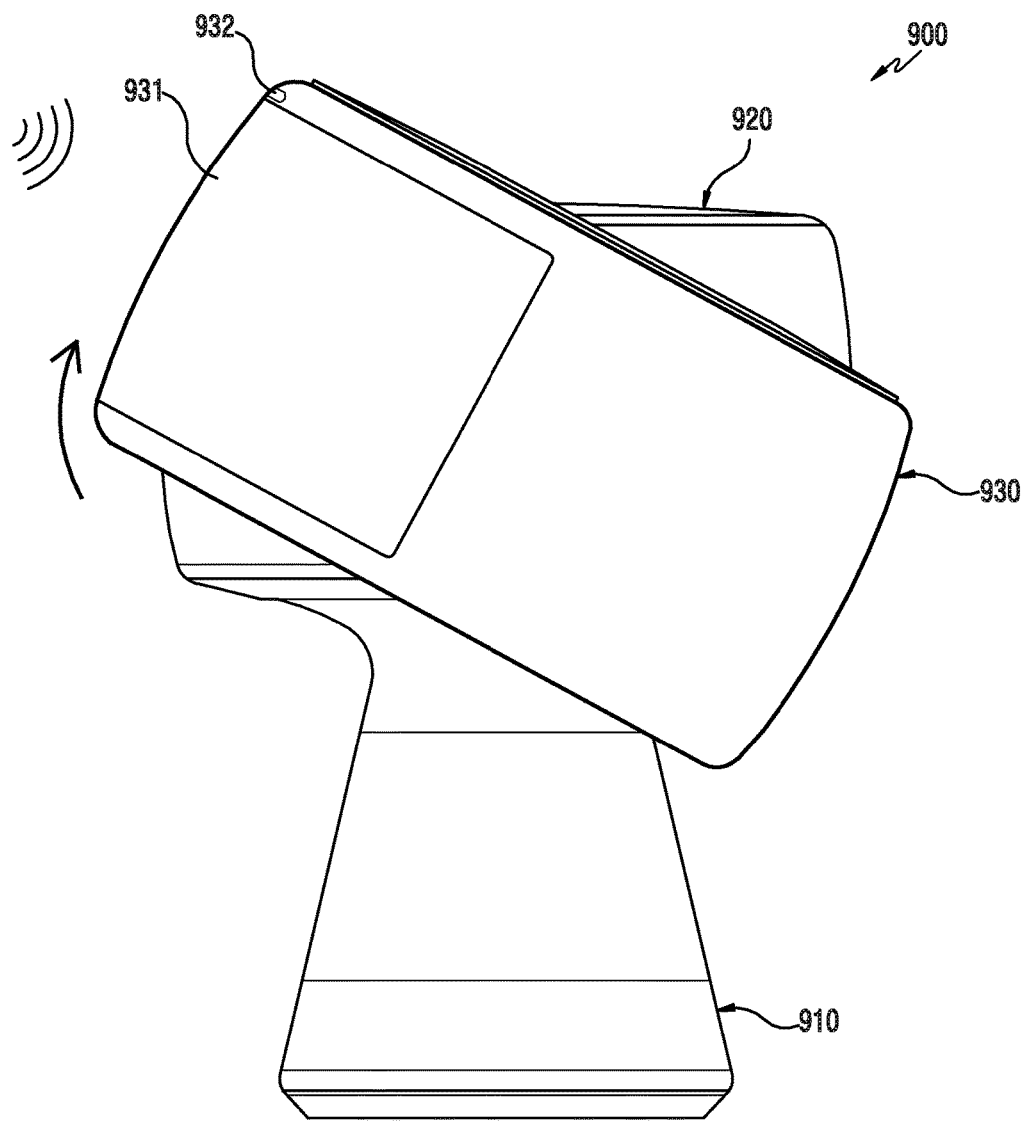
FIGS. 9A and 9B are operation diagrams each illustrating an operating relationship of a movable head by an upper drive unit of an intelligent electronic device according to various embodiments of the present disclosure.
Figure 9B:
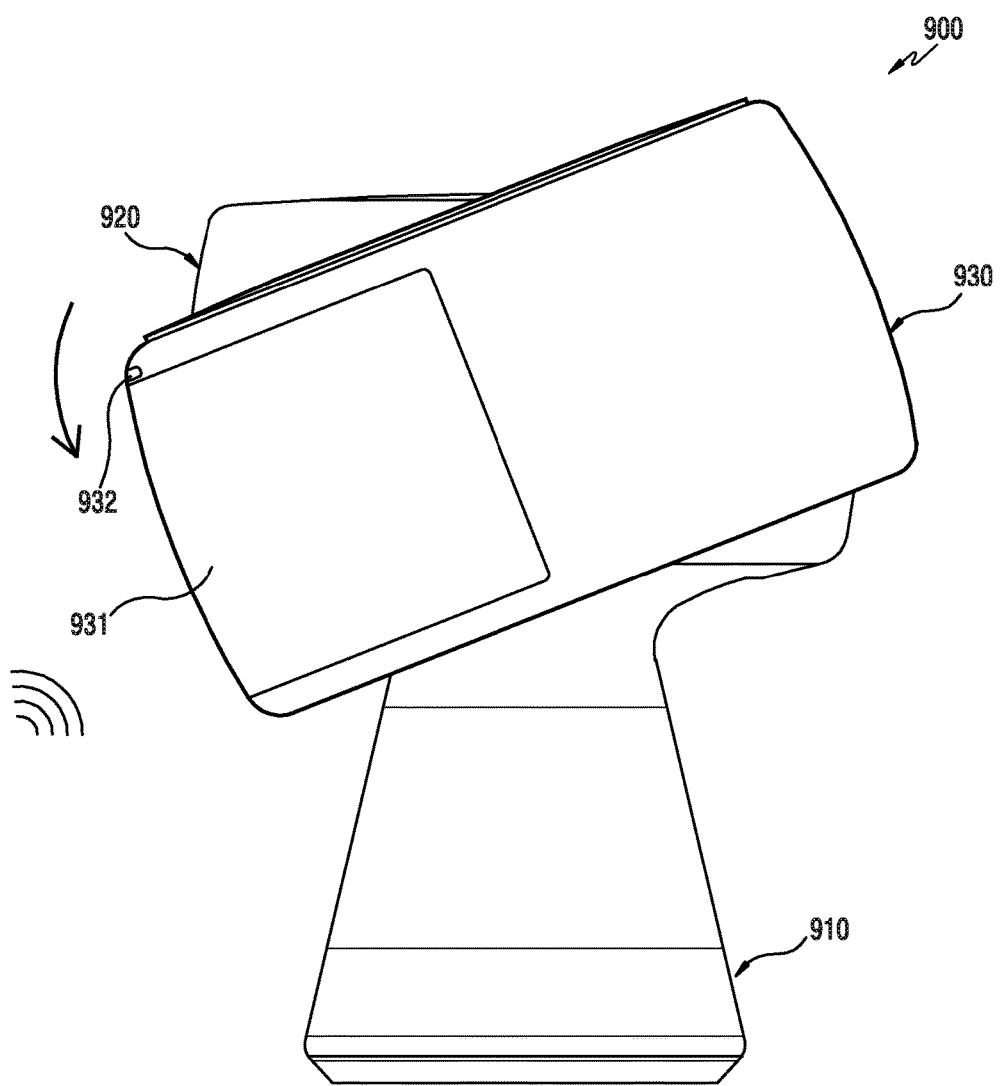

FIGS. 9A and 9B are operation diagrams each illustrating an operating relationship of the movable head by an upper drive unit of an intelligent electronic device according to various embodiments of the present disclosure.

The intelligent electronic device of FIGS. 9A and 9B may be another embodiment of an intelligent electronic device that is similar to or different from the intelligent electronic device 400 of FIG. 4A, the intelligent electronic device 500 of FIG. 5A, and the intelligent electronic device 800 of FIGS. 8A and 8B.

Referring to FIGS. 7A to 7D and FIGS. 9A and 9B, an intelligent electronic device 900 may include a base 910, a fixed head 920 fixed to the top of the base 910, a movable head 930 disposed to be movable in such a manner that the movable head surrounds at least a portion of the fixed head 920.

According to various embodiments, as illustrated in FIG. 9A, when an external input (e.g., an external object, a user, or an acoustic speech) is received in the left upper direction of the intelligent electronic device 900, a sensor member 932 may sense it, the electronic device 900 may determine the direction where the external input is sensed and may determine a driving amount for driving the movable head 930 so as to cause a display 931 to face the corresponding direction, and may control the first drive motor 543 or the second drive motor 544 according to the driving amount. According to an embodiment, the intelligent electronic device 900 may rotate the movable head 530 upward by a predetermined angle by operating the second drive motor 544 of the upper drive unit of the drive unit 540 according to the determined driving amount.

According to various embodiments, as illustrated in FIG. 9B, when an external input (e.g., an external object, a user, or an acoustic speech) is received in the left lower direction of the intelligent electronic device 900, the sensor member 932 may sense it, the electronic device 900 may determine the direction where the external input is sensed and may determine a driving amount for driving the movable head 930 so as to cause the display 931 to face the corresponding direction, and may control the first drive motor 543 or the second drive motor 544 according to the driving amount. According to an embodiment, the intelligent electronic device 900 may rotate the movable head 530 downward by a predetermined angle by operating the second drive motor 544 of the upper drive unit of the drive unit 540 according to the determined driving amount.

According to various embodiments, the movable head 830 or 930 may be rotated simultaneously in the z-axis direction and the y-axis direction (e.g., the y-axis direction in FIG. 5A) by simultaneously operating the upper drive unit and the lower drive unit of the drive unit 540 in response to the detection of an external input by the sensor member 832 or 932. The rotation of the movable head 830 or 930 is to clearly direct the display 831 or 931 placed on the movable head 830 and 930 to the user. However, without being limited thereto, the movable head 830 or 930 may be moved to direct various output means (e.g., a speaker device, a microphone device, or a visual indicator device) included in the electronic device to the user, as well as the display 831 or 931.

Figure 10:
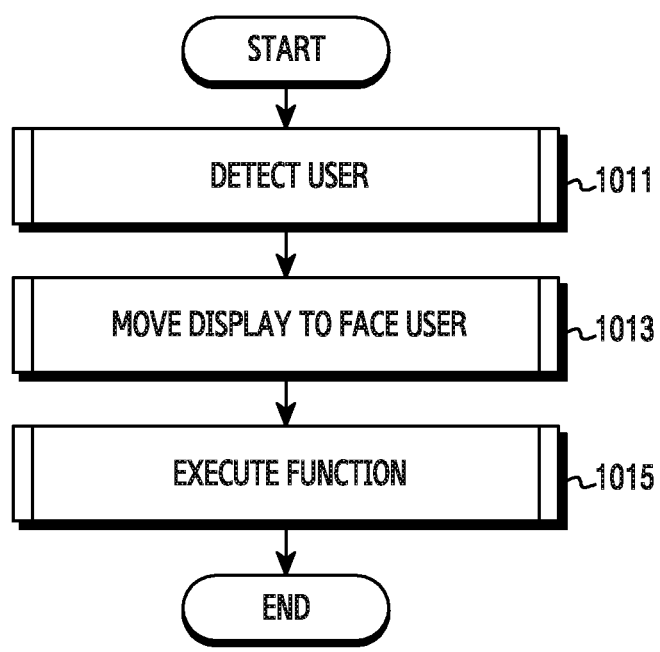
FIG. 10 illustrates a flowchart of an operating method of an electronic device according to various embodiments of the present disclosure.

FIG. 10 illustrates a flowchart of an operating method of an electronic device according to various embodiments of the present disclosure. In addition, FIGS. 18A, 18B, 18C, 18D, 19, 20A, 20B, 21A, 21B, 22, 23, 24A, 24B, 24C, 25A, 25B, 26A, 26B, 26C, 26D, 27A, 27B, 27C, 28A, 28B, 29A, 29B, 30A, 30B, 30C, 30D, 30E, 30F, 31A, 31B, 31C, 31D, 31E, and 31F illustrate views each for explaining an operating method of an electronic device according to various embodiments of the present disclosure.

Referring to FIG. 10, an operating method of an electronic device (e.g., the electronic device 201) according to various embodiments may begin with detecting a user by a processor (e.g., the processor 210) in operation 1011. The processor 210 may detect the user while a standby screen is being displayed. The processor 210 may detect the user using at least one of a sensor module (e.g., the sensor module 240), an audio module (e.g., the audio module 280), or a camera module (e.g., the camera module 291). For example, the audio module 280 may collect an audio signal via a microphone (e.g., the microphone 288), and the processor 210 may detect the user based on the audio signal. Alternatively, the camera module 291 may capture image data, and the processor 210 may detect the user based on the image data. The processor 210 may detect at least one of a user direction and a user distance. The user direction may be determined toward the user with reference to the electronic device 201, and the user distance may indicate the distance between the electronic device 201 and the user.

Figure 18A:
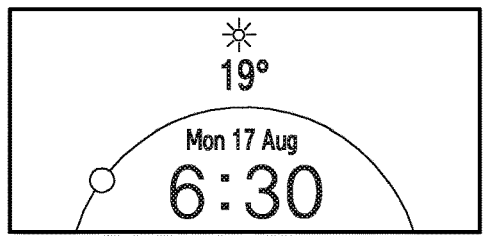
Figure 18B:
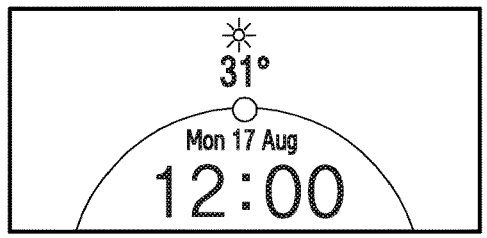
Figure 18C:
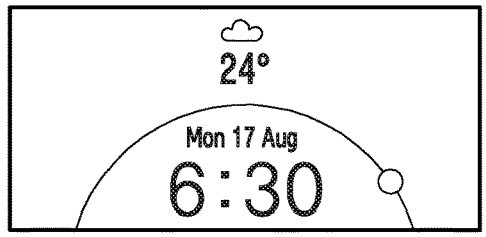
Figure 18D:

According to an embodiment, the processor 210 may display the standby screen on the display 260, as illustrated in FIGS. 18A to 18D. The standby screen may include at least one of time information, environment information, and sensing information. The time information may include at least one of time and date, and the environmental information may include at least one of weather, temperature, humidity, and illuminance. On the other hand, the processor 210 may change the standby screen according to the passage of time. For example, the processor 210 may represent the position of the sun to correspond to time through the standby screen. As illustrated in FIG. 18A, the processor 210 may represent the position of the sun on the left side of the standby screen to correspond to the time of the morning. As illustrated in FIG. 18B, the processor 210 may represent the position of the sun in the center of the standby screen to correspond to the noon time. As illustrated in FIG. 18C, the processor 210 may represent the position of the sun on the right side of the standby screen at the time of the afternoon. As illustrated in FIG. 18D, the processor 210 may remove the position of the sun from the standby screen to correspond to the time of midnight.

Figure 11:
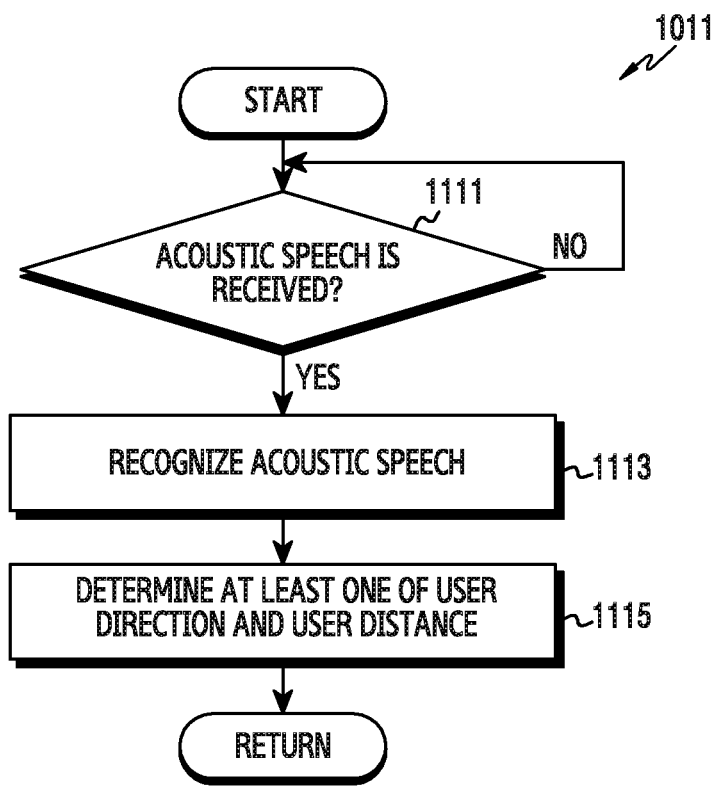
FIG. 11 illustrates a flowchart of a user detection operation in FIG. 10 according to various embodiments of the present disclosure.

FIG. 11 illustrates a flowchart of a user detection operation in FIG. 10 according to various embodiments of the present disclosure.

Referring to FIG. 11, when the user's acoustic speech is received, the processor 210 may detect the acoustic speech in operation 1111. For example, when an acoustic speech is detected in the audio module 280, the processor 210 may receive the detected acoustic speech. To this end, the audio module 280 may collect audio signals via the microphone 288. The audio module 280 may then analyze the audio signals to detect an acoustic speech. At this time, the audio module 280 may detect the acoustic speech based on the waveforms of the audio signals.

Next, the processor 210 may recognize the acoustic speech in operation 1113. At this time, the processor 210 may extract the language information from the acoustic speech. For example, the processor 210 may convert the waveforms of the acoustic speech into a text. Alternatively, the processor 210 may detect a voice print from the acoustic speech.

Next, the processor 210 may determine at least one of a user direction or a user distance in operation 1115. At this time, the processor 210 may detect the directionality of the acoustic speech, and may detect the user direction therefrom. For example, the microphone 288 may be a directional microphone, and the processor 210 may detect the directionality of the acoustic speech from the microphone 288. On the other hand, the processor 210 may measure the strength of the acoustic speech, and may detect the user distance therefrom. To this end, the processor 210 may determine whether the text meets a predetermined triggering condition. In addition, when the text meets the triggering condition, the processor 210 may determine at least one of the user direction and the user distance. Alternatively, the processor 210 may determine whether the voice print meets a preset triggering condition. Further, when the voice print meets the triggering condition, the processor 210 may determine at least one of the user direction and the user distance. Thereafter, the processor 210 may return to FIG. 10.

Figure 12:
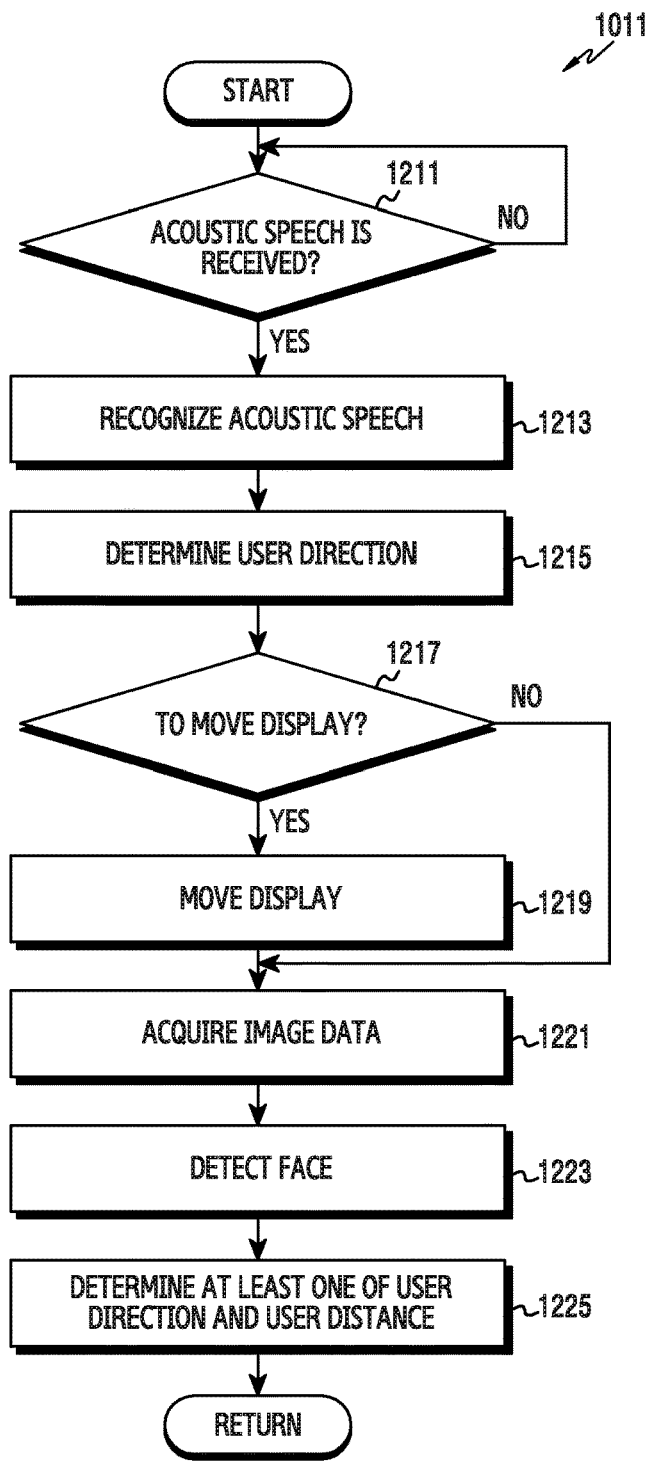
FIG. 12 illustrates a flowchart of a user detection operation in FIG. 10 according to various embodiments of the present disclosure.

FIG. 12 illustrates a flowchart of the user detection operation in FIG. 10 according to various embodiments of the present disclosure.

Referring to FIG. 12, when the user's acoustic speech is received, the processor 210 may detect the acoustic speech in operation 1211. For example, when an acoustic speech is detected in the audio module 280, the processor 210 may sense it. To this end, the audio module 280 may collect audio signals via the microphone 288. The audio module 280 may then analyze the audio signals to detect an acoustic speech. At this time, the audio module 280 may detect the acoustic speech based on the waveforms of the audio signals.

Next, the processor 210 may recognize the user's acoustic speech in operation 1213. At this time, the processor 210 may extract language information from the acoustic speech. For example, the processor 210 may convert the waveforms of the acoustic speech into a text. Alternatively, the processor 210 may detect a voice print from the acoustic speech.

Next, the processor 210 may determine the user direction in operation 1215. At this time, the processor 210 may detect the directionality of the acoustic speech, and may detect the user direction therefrom. For example, the microphone 288 may be a directional microphone, and the processor 210 may detect the directionality of the acoustic speech from the microphone 288. To this end, the processor 210 may determine whether the text is a preset triggering text. In addition, when the text is triggering data, the processor 210 may determine the user direction. Alternatively, the processor 210 may determine whether the voice print meets a preset triggering condition. Further, when the voice print meets the triggering condition, the processor 210 may determine the user direction.

Next, in operation 1217, the processor 210 may determine whether to move the display 260. To this end, the processor 210 may compare the display direction of the display 260 with the user direction. That is, the processor 210 may determine whether the display direction of the display 260 corresponds to the user direction. When it is determined that the display direction of the display 260 corresponds to the user direction, the processor 210 may determine that it is not necessary to move the display 260. On the other hand, when it is determined that the display direction of the display 260 does not correspond to the user direction, the processor 210 may determine that it is necessary to move the display 260.

Next, when it is determined that it is necessary to move the display 260 in operation 1217, the processor 210 may move the display 260 to face the user in operation 1219. At this time, the processor 210 may move the display 260 to correspond to the user direction. That is, the processor 210 may move the display 260 such that the display direction of the display 260 corresponds to the user direction. To this end, the processor 210 may rotate the display 260 about at least one of the z-axis, the y-axis, and the x-axis orthogonal to the z-axis and the y-axis. Here, the processor 210 may control the motor 298 (alternatively drive module) to rotate the display 260. Through this, at least one of the sensor module 240, the audio module 280, and the camera module 291 may be moved to face the user, along with the display 260.

Next, the processor 210 may acquire image data in operation 1221. For example, the camera module 291 may capture image data, and the processor 210 may acquire image data from the camera module 291. At this time, when the camera module 291 is turned off, the processor 210 may turn on the camera module 291.

On the other hand, when it is determined that it is not necessary to move the display 260 in operation 1217, the processor 210 may acquire the image data in operation 1221. For example, the camera module 291 may capture image data, and the processor 210 may acquire image data from the camera module 291. At this time, when the camera module 291 is turned off, the processor 210 may turn on the camera module 291.

Next, the processor 210 may detect the user's face from the image data in operation 1223. For example, the processor 210 may use at least one of a face extraction method, a face recognition method, a face directionality detection method, and an eye tracking method to detect the user's face.

According to the face extraction method, the processor 210 may distinguish a face region corresponding to the face and a background region from the image data. Through this, the processor 210 may detect at least one of a face size and a face position in the image data. According to the face recognition method, the processor 210 may detect a face by detecting feature points such as eyes, nose, and mouth from the image data. Through this, the processor 210 may identify the user based on the feature points of the face. According to the face directionality detection method, the processor 210 may identify the direction of the face, e.g., the front side or the lateral side, in the image data. According to the eye tracking method, the processor 210 may identify the eyes in the image data, and may track the gaze from the movements of the eyes. Through this, the processor 210 may detect at least one of the size of the eyes and the position of the eyes in the image data.

Next, the processor 210 may determine at least one of the user direction or the user distance in operation 1225. At this time, the processor 210 may determine the user direction based on the user's face in the image data. For example, the processor 210 may determine the user direction to correspond to the position of the face or the position of the eyes in the face in the image data. Meanwhile, the processor 210 may determine the user distance based on at least one of the user's face and acoustic speech. For example, the processor 210 may determine the user distance to correspond to the size of the face or the size of the eyes in the image data. Alternatively, the processor 210 may measure the strength of the acoustic speech, and may detect the user distance therefrom. Thereafter, the processor 210 may return to FIG. 10.

Subsequently, in operation 1013, the processor 210 may move the display 260 to face the user. The processor 210 may move the display 260 to correspond to the user direction. That is, the processor 210 may move the display 260 such that the display direction of the display 260 corresponds to the user direction. To this end, the processor 210 may rotate the display 260 about at least one of the z-axis, the y-axis, and the x-axis orthogonal to the z-axis and the y-axis.

Figure 13:
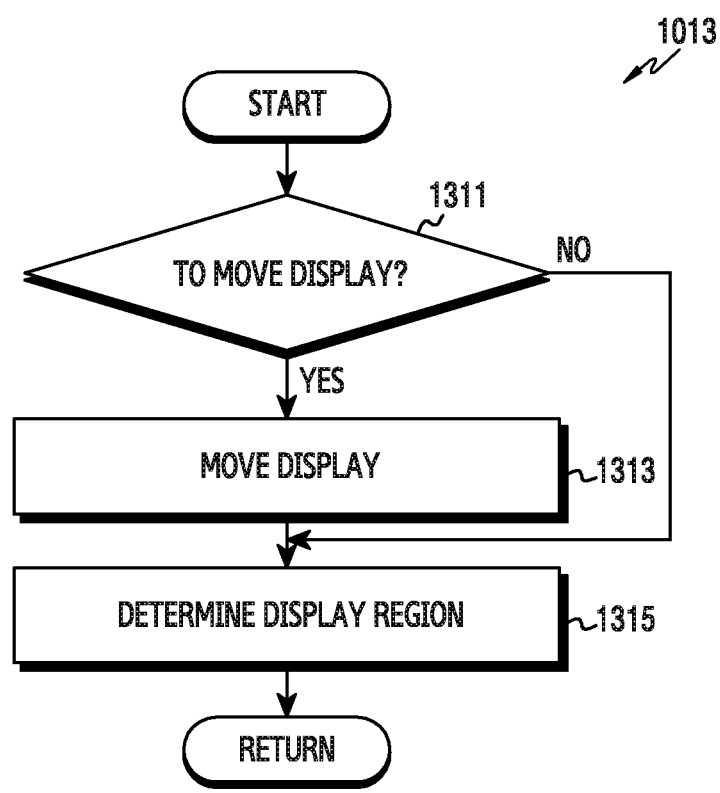
FIG. 13 illustrates a flowchart of a user facing display moving operation in FIG. 10 according to various embodiments of the present disclosure.

FIG. 13 illustrates a flowchart of a user facing display moving operation in FIG. 10 according to various embodiments of the present disclosure.

Referring to FIG. 13, in operation 1311, the processor 210 may determine whether to move the display 260. To this end, the processor 210 may compare the display direction of the display 260 with the user direction. That is, the processor 210 may determine whether the display direction of the display 260 corresponds to the user direction. When it is determined that the display direction of the display 260 corresponds to the user direction, the processor 210 may determine that it is not necessary to move the display 260. On the other hand, when it is determined that the display direction of the display 260 does not correspond to the user direction, the processor 210 may determine that it is necessary to move the display 260.

Next, when it is determined that it is necessary to move the display 260 in operation 1311, the processor 210 may move the display 260 to face the user in operation 1313. At this time, the processor 210 may move the display 260 to correspond to the user direction. That is, the processor 210 may move the display 260 such that the display direction of the display 260 corresponds to the user direction. To this end, the processor 210 may rotate the display 260 about at least one of the z-axis, the y-axis, and the x-axis orthogonal to the z-axis and the y-axis. Here, the processor 210 may control the motor 298 (alternatively drive module) to rotate the display 260. Through this, at least one of the sensor module 240, the audio module 280, and the camera module 291 may be moved to face the user, along with the display 260.

Next, in operation 1315, the processor 210 may determine the display region on the display 260. At this time, the processor 210 may determine the display region on the display 260 based on the user direction. Here, the processor 210 may determine the display region in at least a portion of the display 260. For example, the processor 210 may determine the display region in a reference region of the display 260. That is, the processor 210 may make the center of the display region correspond to the center of the display 260. Thereafter, the processor 210 may return to FIG. 10.

On the other hand, when it is determined that it is not necessary to move the display 260 in operation 1311, the processor 210 may proceed to operation 1315. That is, the processor 210 may determine the display region on the display 260 without moving the display 260. Thereafter, the processor 210 may return to FIG. 10.

Figure 14:
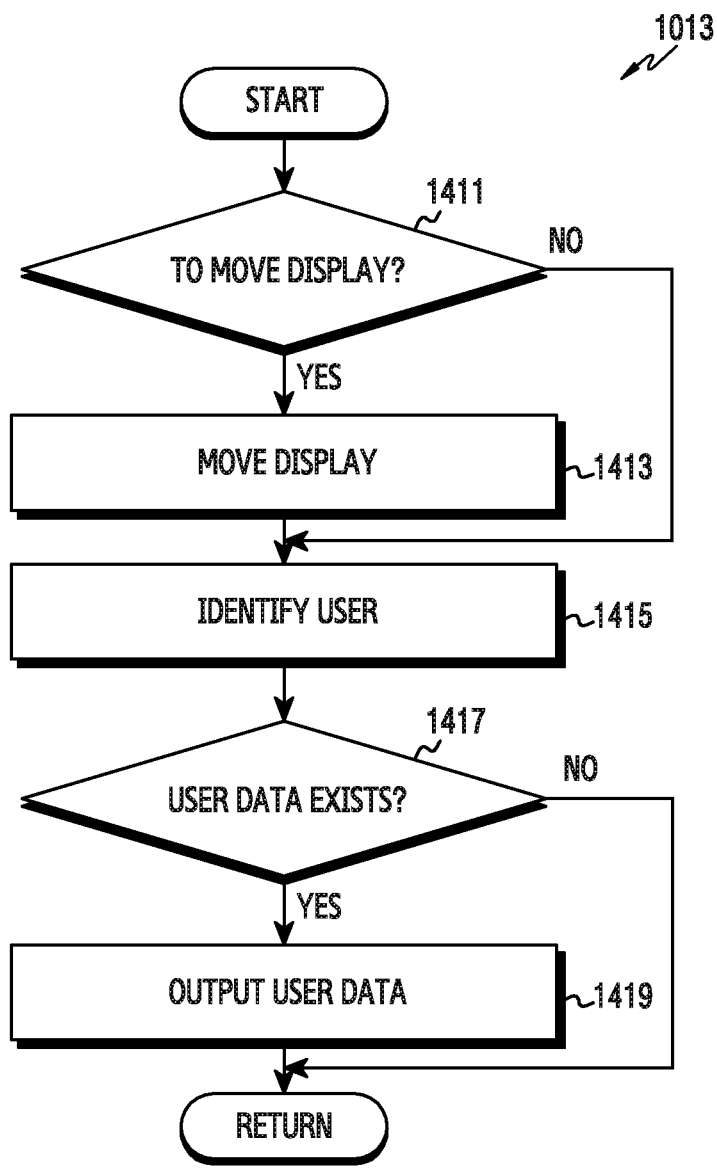
FIG. 14 illustrates a flowchart of a user facing display moving operation in FIG. 10 according to various embodiments of the present disclosure.

FIG. 14 illustrates a flowchart of a user facing display moving operation in FIG. 10 according to various embodiments of the present disclosure.

Referring to FIG. 14, in operation 1411, the processor 210 may determine whether to move the display 260. To this end, the processor 210 may compare the display direction of the display 260 with the user direction. That is, the processor 210 may determine whether the display direction of the display 260 corresponds to the user direction. When it is determined that the display direction of the display 260 corresponds to the user direction, the processor 210 may determine that it is not necessary to move the display 260. On the other hand, when it is determined that the display direction of the display 260 does not correspond to the user direction, the processor 210 may determine that it is necessary to move the display 260.

Next, when it is determined that it is necessary to move the display 260 in operation 1411, the processor 210 may move the display 260 to face the user in operation 1413. At this time, the processor 210 may move the display 260 to correspond to the user direction. That is, the processor 210 may move the display 260 such that the display direction of the display 260 corresponds to the user direction. To this end, the processor 210 may rotate the display 260 about at least one of the z-axis, the y-axis, and the x-axis orthogonal to the z-axis and the y-axis. Here, the processor 210 may control the motor 298 (alternatively drive module) to rotate the display 260. Through this, at least one of the sensor module 240, the audio module 280, and the camera module 291 may be moved to face the user, along with the display 260.

Next, the processor 210 may identify the user in operation 1415. At this time, the processor 210 may identify the current user based on at least one of the user's voice print and the user's face. Here, the processor 210 may compare the voice print of the current user with previously stored users' voice prints to identify the current user. For example, when the current user's voice print is similar to the previously stored Mike's voice print, the processor 210 may identify the current user as "Mike." Alternatively, the processor 210 may compare the current user's face with the previously stored users' faces so as to identify the current user. For example, when the current user's face is similar to a previously stored Mike's face, the processor 210 may identify the current user as "Mike."

Next, the processor 210 may determine whether user data registered in advance to correspond to the user exists in operation 1417. For example, the user data may include at least one of a text, an image, and an audio signal.

Next, when it is determined that user data exists in operation 1417, the processor 210 may output user data in operation 1419. Here, the processor 210 may output the user data through at least one of the display 260 and the audio module 280. For example, the processor 210 may output user data "Good evening Mike!" to the display 260 as illustrated in FIG. 19. Thereafter, the processor 210 may return to FIG. 10.

On the other hand, when it is determined that there is no user data in operation 1417, the processor 210 may return to FIG. 10.

Finally, the processor 210 may execute the function in operation 1015. At this time, the processor 210 may display a function execution screen. In addition, the processor 210 may control the function execution screen. Meanwhile, the processor 210 may continuously track the user while executing the function. That is, the processor 210 may continuously detect the user direction. When the user direction is changed at this time, the processor 210 may move the display 260 to face the user. The processor 210 may move the display 260 to correspond to the user direction. Through this, the operation method of the electronic device 201 may be terminated.

Figure 15:
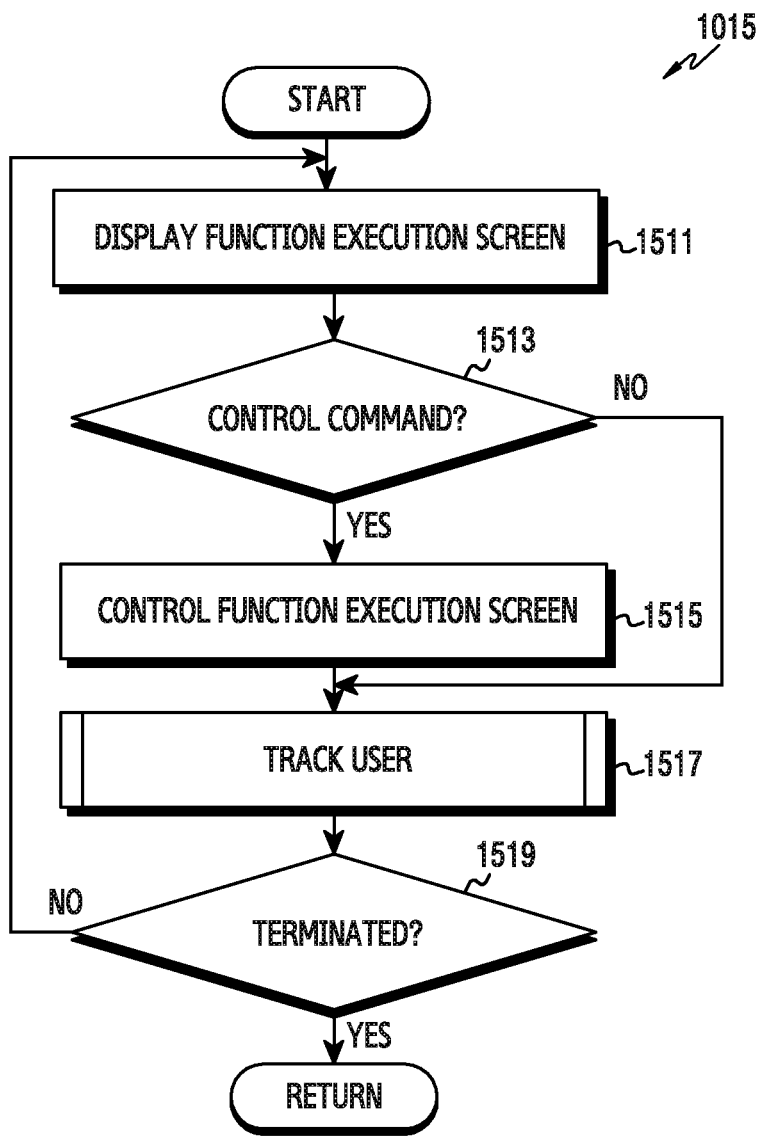
FIG. 15 illustrates a flowchart of a function execution operation in FIG. 10 according to various embodiments of the present disclosure.

FIG. 15 illustrates a flowchart of a function execution operation in FIG. 10 according to various embodiments of the present disclosure.

Referring to FIG. 15, the processor 210 may display a function execution screen in operation 1511. The processor 210 may display the function execution screen on the display 260. At this time, the processor 210 may display the function execution screen based on the user distance. That is, the processor 210 may enlarge or reduce the function execution screen to correspond to the user distance. On the other hand, the processor 210 may display the function execution screen in the display region on the display 260. For example, the function execution screen may be configured with at least one page. When the function execution screen is configured with a plurality of pages, the processor 210 may display any one of the pages. Here, the processor 210 may display the function execution screen based on an acoustic speech. For example, the processor 210 may display the function execution screen in accordance with a text corresponding to the acoustic speech.

Figure 20A:
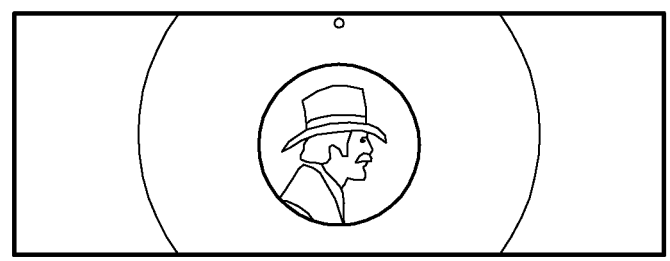
Figure 20B:

According to an embodiment, the processor 210 may execute a music file playback function as illustrated in FIGS. 20A and 20B. For example, when the user distance is equal to or longer than a predetermined threshold value, the processor 210 may enlarge the function execution screen and may display the enlarged function execution screen as illustrated in FIG. 20A. Alternatively, when the user distance is less than the threshold value, the processor 210 may reduce the function execution screen and display the reduced function execution screen as illustrated in FIG. 20B. In addition, the processor 210 may determine at least one of the size and the number of objects displayed on the function execution screen according to the user distance.

Figure 21A:
Figure 21B:

According to another embodiment, the processor 210 may execute a weather notification function as illustrated in FIGS. 21A and 21B. To this end, the processor 210 may download weather information via a communication module 220. For example, the processor 210 may download weather information from an external device. The external device may include at least one of an electronic device and a server. In addition, the processor 210 may display weather information on the function execution screen of the weather notification function as illustrated in FIGS. 21A and 21B. Here, the processor 210 may represent the weather information in at least one of an image and a text. Meanwhile, the processor 210 may display time information together with the weather information.

Figure 22:
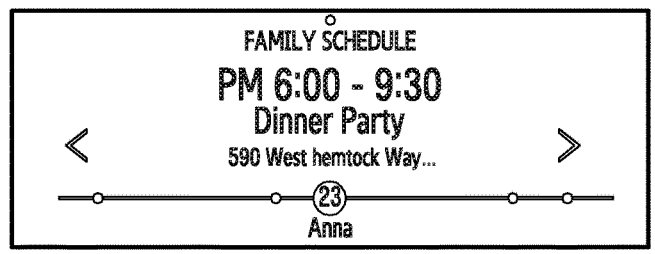

According to another embodiment, the processor 210 may execute a schedule management function as illustrated in FIG. 22. At this time, the processor 210 may detect schedule information corresponding to the user. For example, the processor 210 may detect the schedule information of the current user in previously stored users' schedule information. Alternatively, the processor 210 may download the current user's schedule information through the communication module 220. For example, the processor 210 may download the user's schedule information from an external device. The external device may include at least one of an electronic device and a server. The processor 210 may display the user's schedule information on the function execution screen of the schedule management function.

Figure 23:
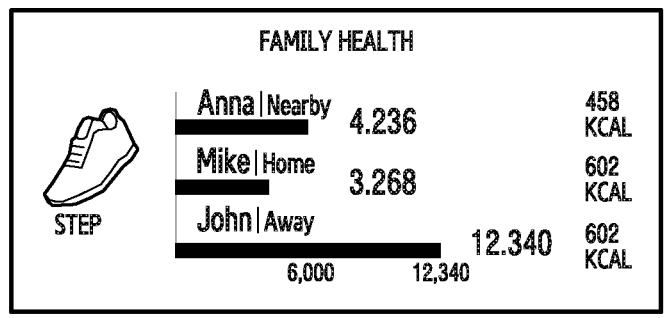

According to another embodiment, the processor 210 may execute a health care function as illustrated in FIG. 23. At this time, the processor 210 may detect previously stored users' health data. In addition, the processor 210 may collectively display the health data on the function execution screen of the health care function.

Next, when a control command is generated, the processor 210 may detect this in operation 1513. For example, the processor 210 may detect a control command using at least one of an input device (e.g., the input device 150) and an audio module 280. That is, the processor 210 may detect the control command from the acoustic speech. Alternatively, the processor 210 may detect the control command from an input signal of the input device 150.

For example, when the user's acoustic speech is received, the processor 210 may detect the acoustic speech. When the acoustic speech is detected in the audio module 280, the processor 210 may detect the acoustic speech. To this end, the audio module 280 may collect audio signals via the microphone 288. In addition, the audio module 280 may then analyze the audio signals to detect an acoustic speech. At this time, the audio module 280 may detect the acoustic speech based on the waveforms of the audio signals.

Thereafter, the processor 210 may recognize the acoustic speech. At this time, the processor 210 may extract language information from the acoustic speech. For example, the processor 210 may convert the waveforms of the acoustic speech into a text. Then, the processor 210 may determine whether the acoustic speech corresponds to a control command. For example, the processor 210 may determine whether the text corresponding to the acoustic speech represents a control command.

Next, when it is determined in operation 1513 that the acoustic speech corresponds to a control command, the processor 210 may control the function execution screen in operation 1515. The processor 210 may control the function execution screen based on the control command. For example, the processor 210 may apply at least one of change, movement, enlargement, or reduction to the function execution screen. Alternatively, for example, when the function execution screen is composed of a plurality of pages, the processor 210 may call and display another one of the pages.

Figure 24A:
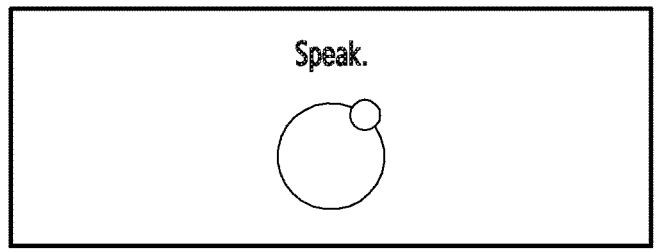
Figure 24B:
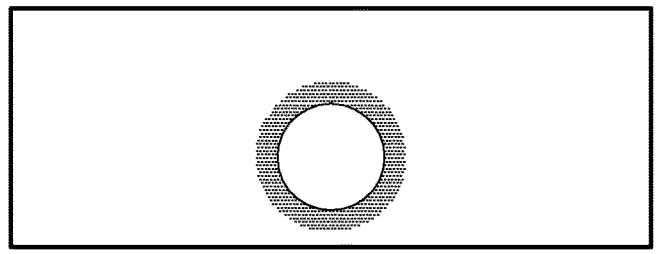
Figure 24C:
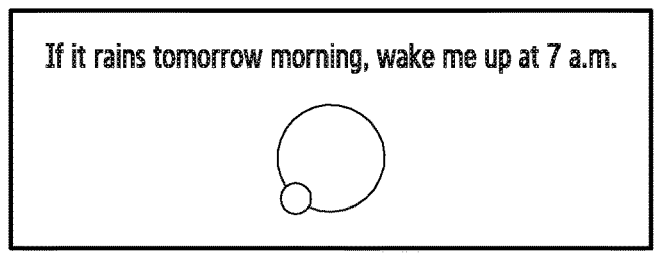

According to an embodiment, the processor 210 may execute a set function as illustrated in FIGS. 24A to 24C. For example, the processor 210 may display the function execution screen of the set function as illustrated in FIG. 24A. When the user's acoustic speech is received, the processor 210 may recognize the acoustic speech as illustrated in FIG. 24B. The processor 210 may convert the waveforms of the acoustic speech into a text. When the acoustic speech recognition is completed, the processor 210 may display the text on the function execution screen as illustrated in FIG. 24C. Through this, the processor 210 may detect a control command from the text to set an alarm. That is, the processor 210 may extract at least one of an alarm date, an alarm time, and an alarm method from the text to set an alarm.

Figure 25A:
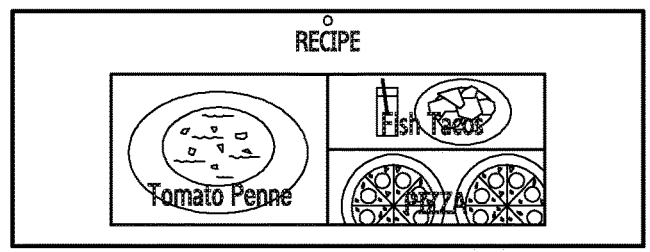
Figure 25B:
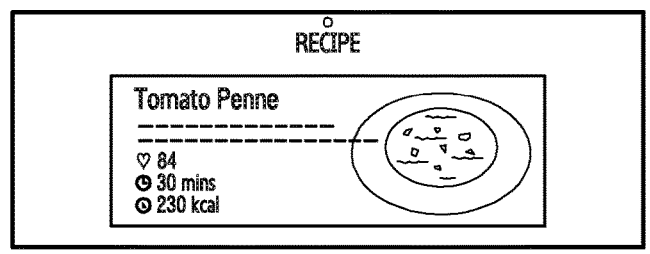
Figure 26A:
Figure 26B:
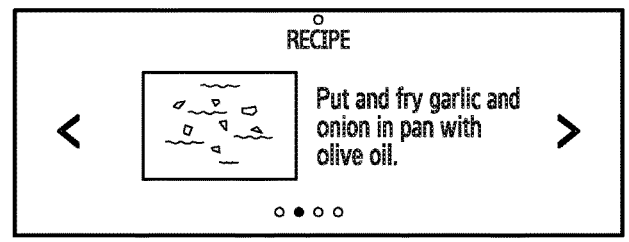
Figure 26C:
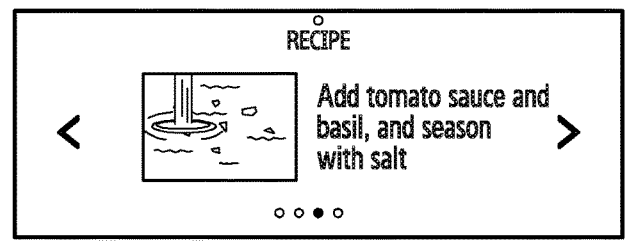
Figure 26D:
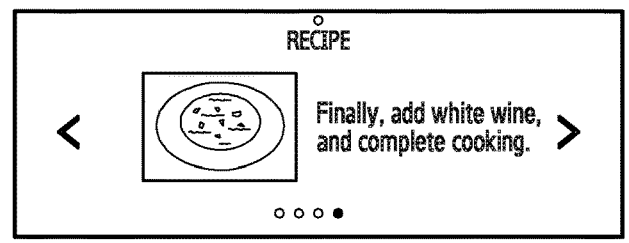

According to another embodiment, the processor 210 may execute an electronic document output function as illustrated in FIGS. 25A and 25B and FIGS. 26A to 26D. The processor 210 may display the function execution screen of the electronic document output function as illustrated in FIG. 25A. Here, the processor 210 may display a list of at least one electronic document. When a control command for selecting an electronic document is detected, the processor 210 may display the basic information of the electronic document as illustrated in FIG. 25B. For example, the electronic document may be a cooking recipe, and the basic information may include at least one of a dish name, a required time, and a preference. On the other hand, when a control command for selecting an electronic document is detected, the processor 210 may display any one of the pages of the electronic document as illustrated in FIG. 26A. When a control command for page switching is detected, the processor 210 may display another one of the pages as illustrated in FIGS. 26B to 26D.

Figure 27A:
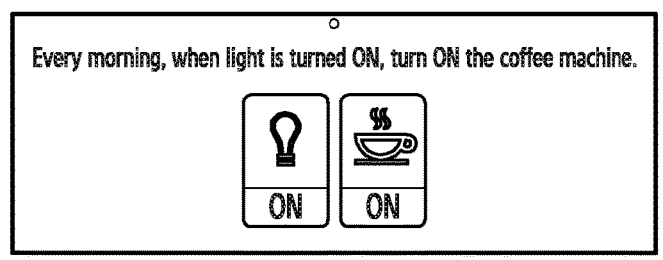
Figure 27B:
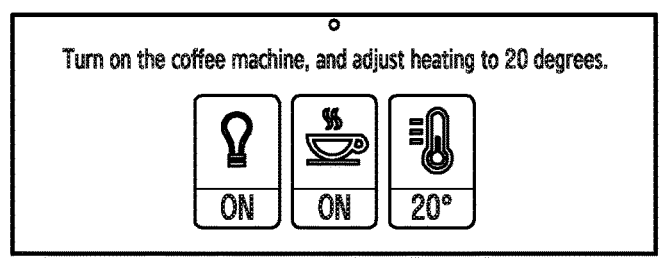
Figure 27C:

According to another embodiment, the processor 210 may execute a remote control function as illustrated in FIGS. 27A to 27C. For example, the processor 210 may display a function execution screen of the remote control function. Here, the processor 210 may display a function execution screen in a manner similar to that illustrated in FIG. 24A. When the user's acoustic speech is received, the processor 210 may recognize the acoustic speech. The processor 210 may convert the waveforms of the acoustic speech into a text. Here, the processor 210 may display a function execution screen in a manner similar to that of FIG. 24B. When the acoustic speech recognition is completed, the processor 210 may display the text on the function execution screen of FIG. 27A or 27B. In addition, the processor 210 may analyze the text to detect one or more external devices, a control condition for each of the external devices, and the like. The processor 210 may display at least one control card corresponding to each external device and a control condition thereof, along with the text on the function execution screen. In addition, when a control command for merging a plurality of control cards is detected, the processor 210 may merge the control cards as illustrated in FIG. 27C. Through this, the processor 210 may store a control condition corresponding to an external device, and may control the external device according to the control condition.

Figure 28A:
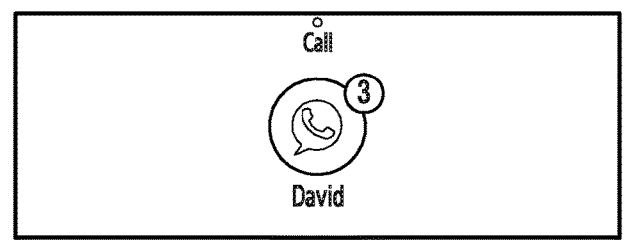
Figure 28B:
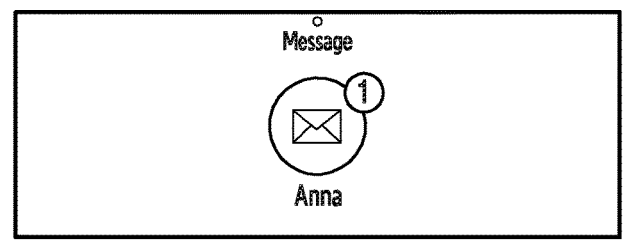
Figure 29A:
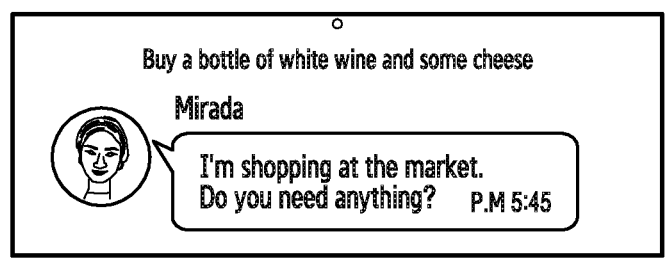
Figure 29B:

According to another embodiment, the processor 210 may execute a communication management function as illustrated in FIG. 28A and 28B and FIGS. 29A and 29B. The processor 210 may display a function execution screen of the communication management function. For example, the processor 210 may display the number of missed calls on the function execution screen as illustrated in FIG. 28A, or may display the number of unacknowledged messages on the function execution screen as illustrated in FIG. 28B. When a control command for confirming an unidentified message is detected, the processor 210 can display an unacknowledged message on the function execution screen as illustrated in FIG. 29A. When an acoustic speech is received, the processor 210 may recognize the acoustic speech. The processor 210 may convert the waveforms of the acoustic speech into a text. Then, the processor 210 generates and transmits a transmission message in the form of text, and may display the transmission message on the function execution screen as illustrated in FIG. 29B.

Next, the processor 210 may track the user in operation 1517 during the function execution. That is, the processor

210 may continuously detect the user direction. When the user direction changed at this time, the processor 210 may move the display 260 to face the user. The processor 210 may move the display 260 to correspond to the user direction. For example, the processor 210 may move the display 260 while maintaining the display direction on the display 260. That is, while moving the display 260, the processor 210 may move the display region on the display 260 in a direction opposite to the moving direction of the display 260. Then, when the movement of the display 260 is completed, the processor 210 may move the display region on the display 260 in the moving direction of the display 260. That is, the processor 210 may move the display region from the display 260 to the original position. On the other hand, when the user direction is not changed, the processor 210 may maintain the display direction of the display 260 without moving the display 260.

Figure 16:
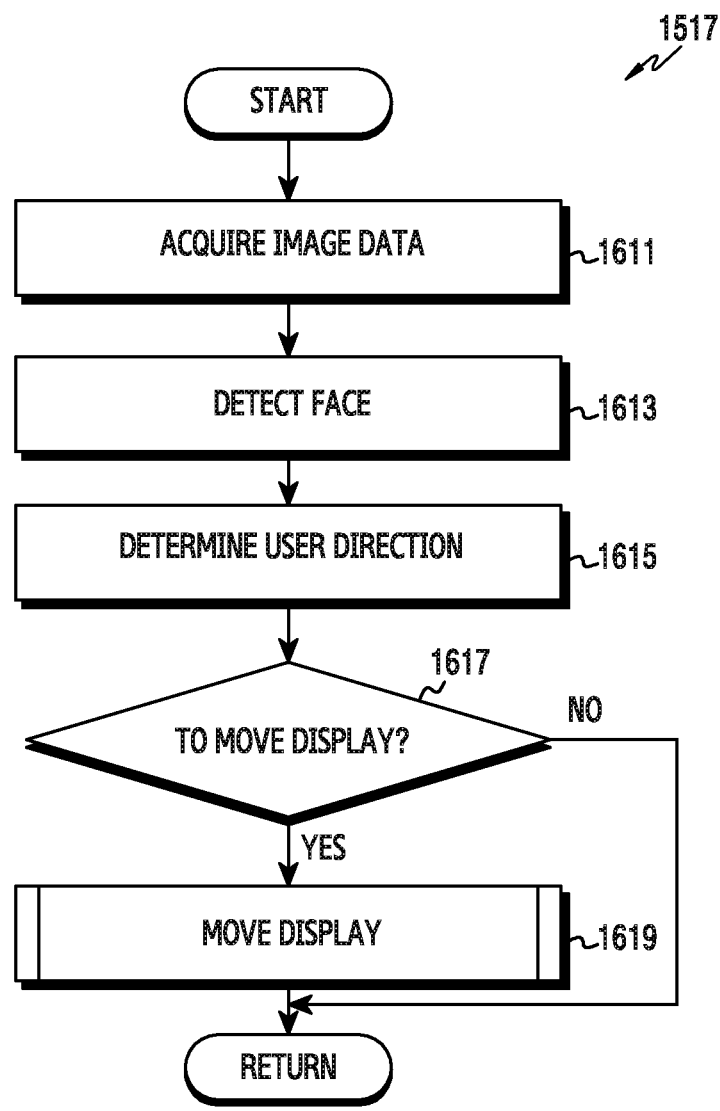
FIG. 16 illustrates a flowchart of a user tracking operation in FIG. 15 according to various embodiments of the present disclosure.

FIG. 16 illustrates a flowchart of a user tracking operation in FIG. 15 according to various embodiments of the present disclosure.

Referring to FIG. 16, the processor 210 may acquire image data in operation 1611. For example, the camera module 291 may capture image data, and the processor 210 may acquire image data from the camera module 291.

Next, the processor 210 may detect the user's face from the image data in operation 1613. For example, the processor 210 may use at least one of a face extraction method, a face recognition method, a face directionality detection method, and an eye tracking method to detect the user's face.

According to the face extraction method, the processor 210 may distinguish a face region corresponding to the face and a background region from the image data. Through this, the processor 210 may detect at least one of a face size and a face position in the image data. According to the face recognition method, the processor 210 may detect a face by detecting feature points such as eyes, nose, and mouth from the image data. Through this, the processor 210 may identify the user based on the feature points of the face. According to the face directionality detection method, the processor 210 may identify the direction of the face, e.g., the front side or the lateral side, in the image data. According to the eye tracking method, the processor 210 may identify the eyes in the image data, and may track the gaze from the movements of the eyes. Through this, the processor 210 may detect at least one of the size of the eyes and the position of the eyes in the image data.

Next, the processor 210 may determine the user direction in operation 1615. At this time, the processor 210 may determine the user direction based on the user's face in the image data. For example, the processor 210 may determine the user direction to correspond to the position of the face or the position of the eyes in the face in the image data.

Next, in operation 1617, the processor 210 may determine whether to move the display 260. To this end, the processor 210 may compare the display direction of the display 260 with the user direction. That is, the processor 210 may determine whether the display direction of the display 260 corresponds to the user direction. When it is determined that the display direction of the display 260 corresponds to the user direction, the processor 210 may determine that it is not necessary to move the display 260. On the other hand, when it is determined that the display direction of the display 260 does not correspond to the user direction, the processor 210 may determine that it is necessary to move the display 260.

Next, when it is determined that it is necessary to move the display 260 in operation 1617, the processor 210 may move the display 260 to face the user in operation 1619. At this time, the processor 210 may move the display 260 to correspond to the user direction. Through this, at least one of the sensor module 240, the audio module 280, and the camera module 291 may be moved to face the user, along with the display 260.

Figure 17:
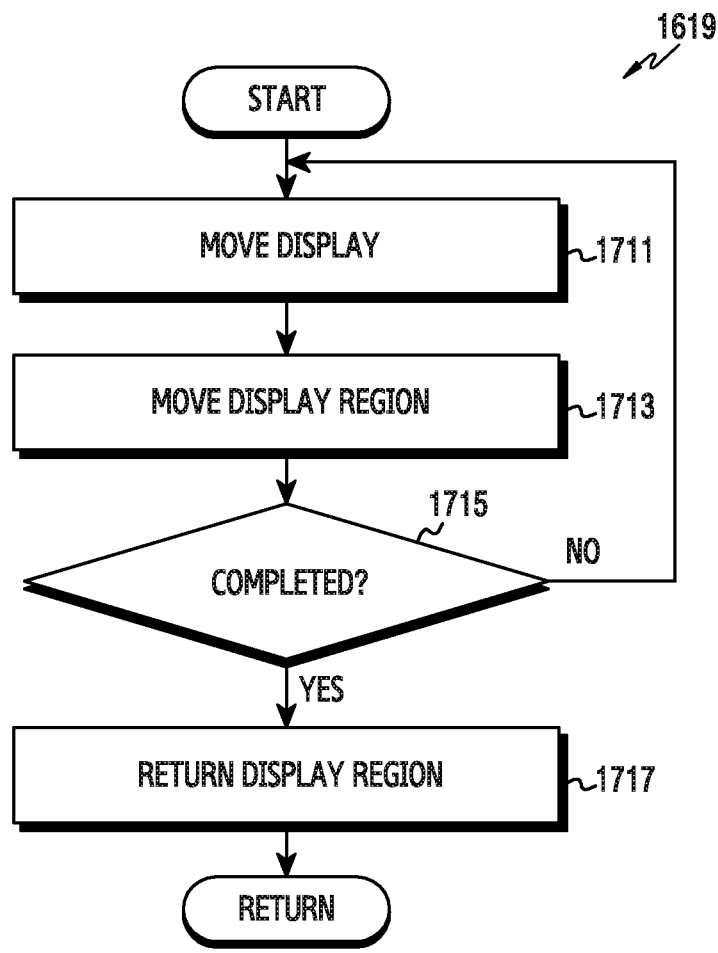
FIG. 17 illustrates a flowchart of a display moving operation in FIG. 16 according to various embodiments of the present disclosure.

FIG. 17 illustrates a flowchart of a display moving operation in FIG. 16 according to various embodiments of the present disclosure.

Referring to FIG. 17, the processor 210 may move the display 260 to correspond to the user direction in operation 1711. To this end, the processor 210 may determine movement control parameters for the display 260 such that the display direction of the display 260 corresponds to the user direction. For example, the processor 210 may calculates the rotational angle of the display 260 between at least one of the z-axis, the y-axis, and the x-axis orthogonal to the z-axis and the y-axis and the user direction. In addition, the processor 210 may determine the movement control parameters based on the rotational angle of the display 260. Through this, the processor 210 may move the display 260 based on the motion control parameters. That is, the processor 210 may control the motor 298 (alternatively drive module) so as to rotate the display 260 about at least one of the z-axis, the y-axis, and the x-axis orthogonal to the z-axis and the y-axis.

Next, the processor 210 may move the display region on the display 260 in operation 1713. At this time, the processor 210 may move the display region on the display 260 in response to the movement of the display 260. To this end, the processor 210 may determine display control parameters for the display region based on the motion control parameters. For example, the processor 210 may apply a predetermined threshold angle to the rotational angle of the display 260 to determine the moving direction and the moving distance of the display area. Through this, the processor 210 may move the display region on the display 260 based on the moving direction and the moving distance. That is, the processor 210 may rotate the display region on the display 260 about at least one of the z-axis, the y-axis, and the x-axis orthogonal to the z-axis and the y-axis. Here, the moving distance of the display region is determined according to the magnitude of the rotational angle of the display 260, and the moving direction of the display region may be opposite to the directionality of the rotational angle of the display 260. For example, the processor 210 may move the display region from the reference region on the display 260. That is, the processor 210 may move from the center of the display 260 to the center of the display region.

Next, when the movement of the display 260 is completed, the processor 210 may detect this in operation 1715. In addition, the processor 210 may return the display region on the display 260 in operation 1717. For example, the processor 210 may return the display region to the reference region of the display 260. That is, the processor 210 may make the center of the display region correspond to the center of the display 260. Thereafter, the processor 210 may return to FIG. 15.

On the other hand, when the movement of the display 260 is not completed in operation 1715, the processor 210 may return to operation 1711. Then, the processor 210 may perform operations 1711 to 1715 repeatedly.

According to an embodiment, the processor 210 may rotate the display 260 in a first rotational direction about the z-axis.

For example, the processor 210 may place the display region in the reference region of the display 260 as illustrated in FIG. 30A(a). In addition, the processor 210 may move the display 260 counterclockwise about the z-axis as illustrated in FIG. 30A(b). Correspondingly, the processor 210 may move the display region on the display 260 clockwise about the z-axis, as illustrated in FIG. 30A(b). That is, the processor 210 may move the display region on the display 260 clockwise about the z-axis from the reference region. In addition, when the movement of the display 260 is completed, the processor 210 may return the display region on the display 260 counterclockwise about the z-axis, as illustrated in FIG. 30A(c). That is, the processor 210 may return the display region to the reference region of the display 260.

Alternatively, the processor 210 may place the display region in the reference region of the display 260 as illustrated in FIG. 31A(a). In addition, the processor 210 may move the display 260 counterclockwise about the z-axis as illustrated in FIG. 31A(b). In addition, when the movement of the display 260 is completed, the processor 210 may continuously move the display region on the display 260 counterclockwise about the z-axis, as illustrated in FIG. 31A(c). That is, the processor 210 may move the display region on the display 260 counterclockwise about the z-axis by a preset moving distance from the reference region. Thereafter, the processor 210 may return the display region on the display 260 clockwise about the z-axis, as illustrated in FIG. 31A(d). That is, the processor 210 may move the display region on the display 260 clockwise about the z-axis by a preset moving distance from the reference region. Through this, the processor 210 may return the display region to the reference region of the display 260.

According to another embodiment, the processor 210 may rotate the display 260 in a second rotational direction about the z-axis.

For example, the processor 210 may place the display region in the reference region of the display 260 as illustrated in FIG. 30B(a). In addition, the processor 210 may move the display 260 clockwise about the z-axis as illustrated in FIG. 30B(b). Correspondingly, the processor 210 may move the display region on the display 260 counterclockwise about the z-axis, as illustrated in FIG. 30B(b). That is, the processor 210 may move the display region on the display 260 counterclockwise about the z-axis from the reference region. In addition, when the movement of the display 260 is completed, the processor 210 may return the display region on the display 260 clockwise about the z-axis, as illustrated in FIG. 30B(c). That is, the processor 210 may return the display region to the reference region of the display 260.

Alternatively, the processor 210 may place the display region in the reference region of the display 260 as illustrated in FIG. 31B(a). In addition, the processor 210 may move the display 260 clockwise about the z-axis as illustrated in FIG. 31B(b). In addition, when the movement of the display 260 is completed, the processor 210 may continuously move the display region on the display 260 clockwise about the z-axis, as illustrated in FIG. 31B(c). That is, the processor 210 may move the display region on the display 260 clockwise about the z-axis by a preset moving distance from the reference region. Thereafter, the processor 210 may return the display region on the display 260 counterclockwise about the z-axis, as illustrated in FIG. 31B(d). That is, the processor 210 may move the display region on the display 260 counterclockwise about the z-axis by a preset moving distance from the reference region. Through this, the processor 210 may return the display region to the reference region of the display 260.

According to another embodiment, the processor 210 may rotate the display 260 in a third rotational direction about the y-axis.

Figure 30C:
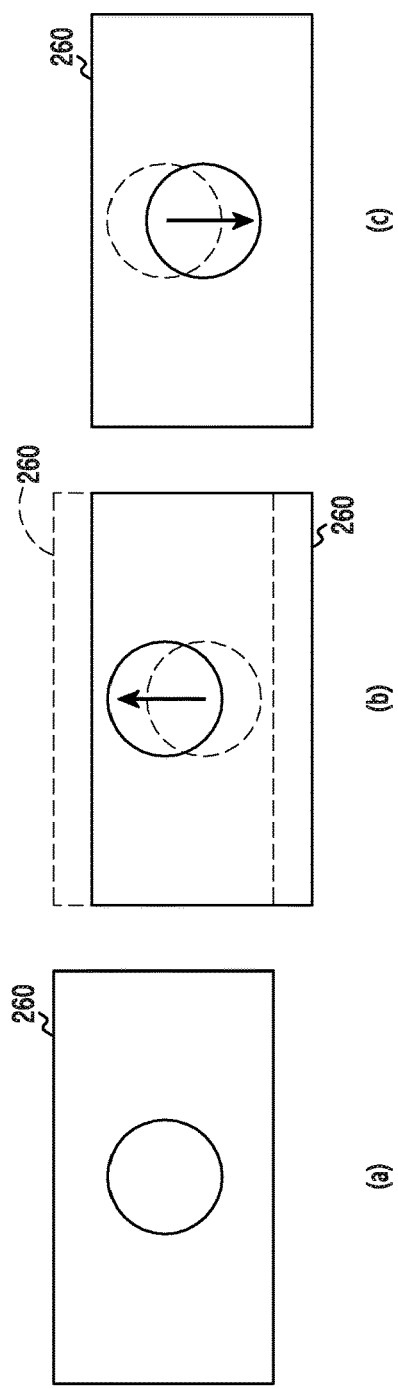

For example, the processor 210 may place the display region in the reference region of the display 260 as illustrated in FIG. 30C(a). In addition, the processor 210 may move the display 260 clockwise about the y-axis as illustrated in FIG. 30C(b). Correspondingly, the processor 210 may move the display region on the display 260 counterclockwise about the y-axis, as illustrated in FIG. 30C(b). That is, the processor 210 may move the display region on the display 260 counterclockwise about the y-axis from the reference region. In addition, when the movement of the display 260 is completed, the processor 210 may return the display region on the display 260 clockwise about the y-axis, as illustrated in FIG. 30C(c). That is, the processor 210 may return the display region to the reference region of the display 260.

Figure 31C:
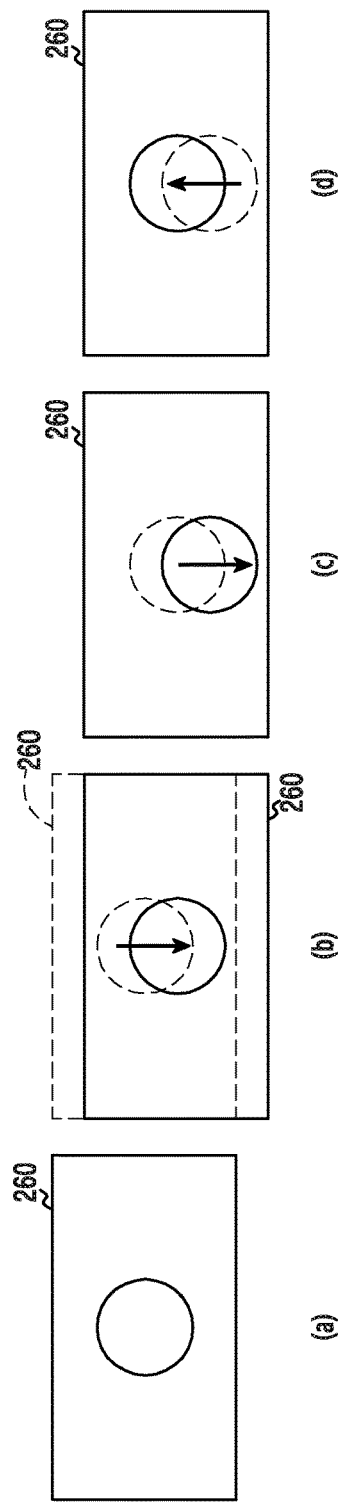

Alternatively, the processor 210 may place the display region in the reference region of the display 260 as illustrated in FIG. 31C(a). In addition, the processor 210 may move the display 260 clockwise about the y-axis as illustrated in FIG. 31C(b). In addition, when the movement of the display 260 is completed, the processor 210 may continuously move the display region on the display 260 clockwise about the y-axis, as illustrated in FIG. 31C(c). That is, the processor 210 may move the display region on the display 260 clockwise about the y-axis by a preset moving distance from the reference region. Thereafter, the processor 210 may return the display region on the display 260 counterclockwise about the y-axis, as illustrated in FIG. 31C(d). That is, the processor 210 may move the display region on the display 260 counterclockwise about the y-axis by a preset moving distance from the reference region. Through this, the processor 210 may return the display region to the reference region of the display 260.

According to another embodiment, the processor 210 may rotate the display 260 in a fourth rotational direction about the y-axis.

Figure 30D:
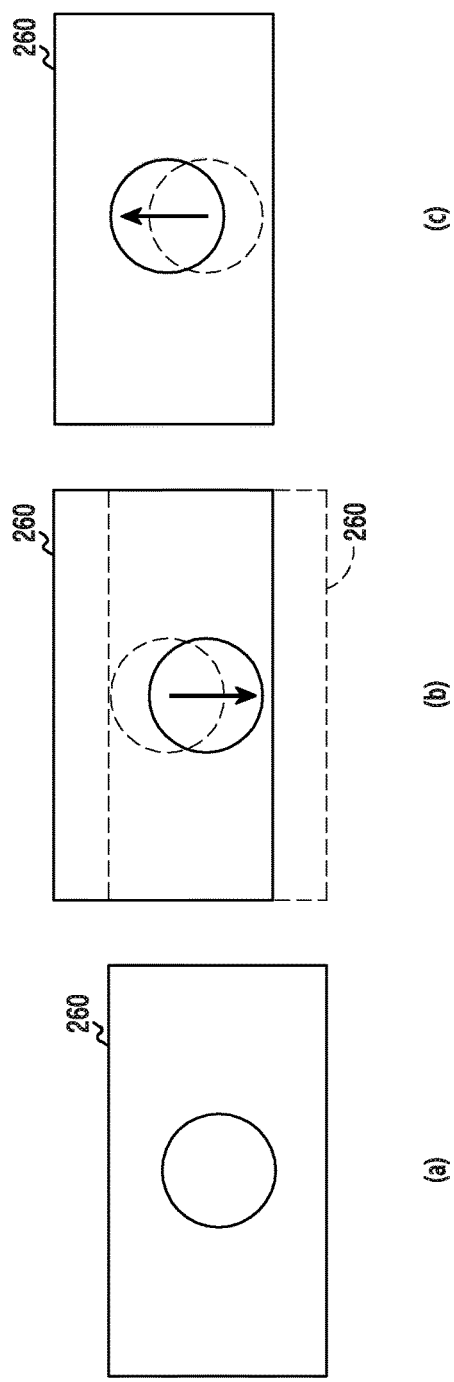

For example, the processor 210 may place the display region in the reference region of the display 260 as illustrated in FIG. 30D(a). In addition, the processor 210 may move the display 260 counterclockwise about the y-axis as illustrated in FIG. 30D(b). Correspondingly, the processor 210 may move the display region on the display 260 clockwise about the y-axis, as illustrated in FIG. 30D(b). That is, the processor 210 may move the display region on the display 260 clockwise about the y-axis from the reference region. In addition, when the movement of the display 260 is completed, the processor 210 may return the display region on the display 260 counterclockwise about the y-axis, as illustrated in FIG. 30D(c). That is, the processor 210 may return the display region to the reference region of the display 260.

Figure 31D:
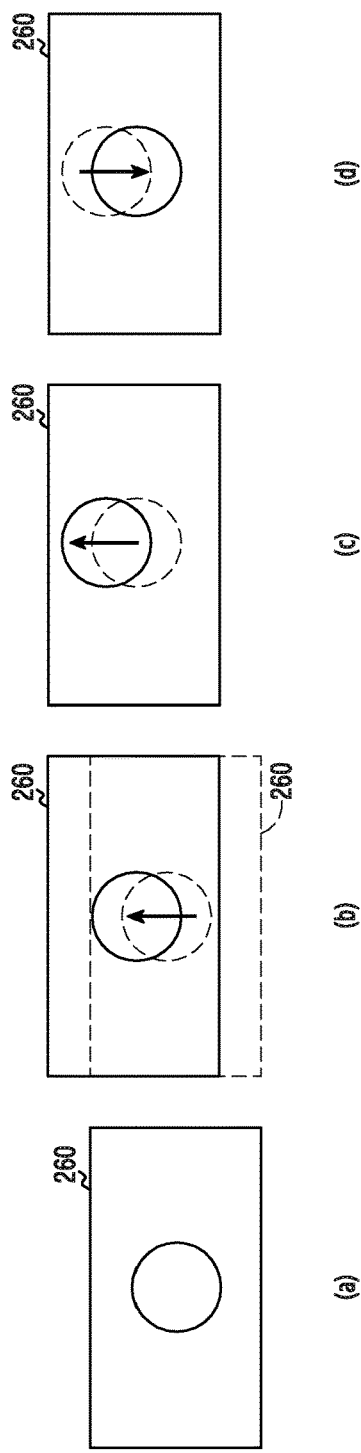

Alternatively, the processor 210 may place the display region in the reference region of the display 260 as illustrated in FIG. 31D(a). In addition, the processor 210 may move the display 260 counterclockwise about the y-axis as illustrated in FIG. 31D(b). In addition, when the movement of the display 260 is completed, the processor 210 may continuously move the display region on the display 260 counterclockwise about the y-axis, as illustrated in FIG. 31D(c). That is, the processor 210 may move the display region on the display 260 counterclockwise about the y-axis by a preset moving distance from the reference region. Thereafter, the processor 210 may return the display region on the display 260 clockwise about the y-axis, as illustrated in FIG. 31D(d). That is, the processor 210 may move the display region on the display 260 clockwise about the y-axis by a preset moving distance from the reference region. Through this, the processor 210 may return the display region to the reference region of the display 260.

According to another embodiment, the processor 210 may rotate the display 260 about the z-axis and the y-axis.

Figure 30E:
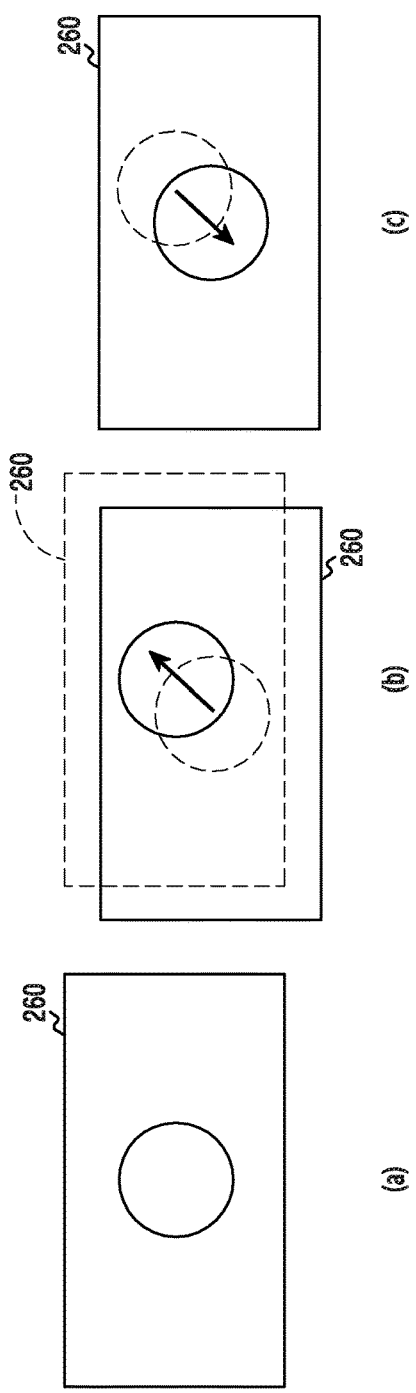

For example, the processor 210 may place the display region in the reference region of the display 260 as illustrated in FIG. 30E(a). In addition, the processor 210 may move the display 260 counterclockwise about a diagonal line between the z-axis and the y-axis, as illustrated in FIG. 30E(b). Correspondingly, the processor 210 may move the display region on the display 260 clockwise about the diagonal line between the z-axis and the y-axis, as illustrated in FIG. 30E(b). That is, the processor 210 may move the display region on the display 260 clockwise about the diagonal line between the z-axis and the y-axis from the reference region. In addition, when the movement of the display 260 is completed, the processor 210 may return the display region on the display 260 counterclockwise about the diagonal line between the z-axis and the y-axis, as illustrated in FIG. 30E(c). That is, the processor 210 may return the display region to the reference region of the display 260.

Figure 31E:
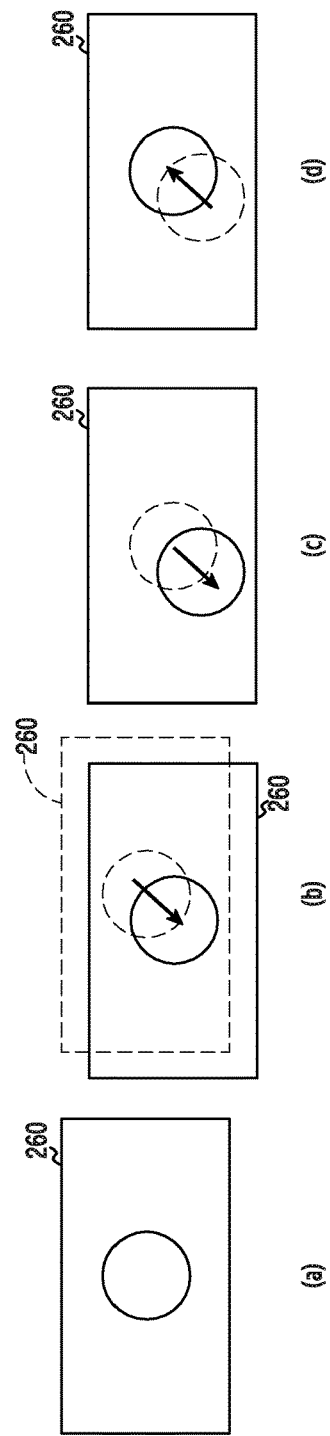

Alternatively, the processor 210 may place the display region in the reference region of the display 260 as illustrated in FIG. 31E(a). In addition, the processor 210 may move the display 260 counterclockwise about the diagonal line between the z-axis and the y-axis, as illustrated in FIG. 31E(b). In addition, when the movement of the display 260 is completed, the processor 210 may continuously move the display region on the display 260 counterclockwise about the diagonal line between the z-axis and the y-axis, as illustrated in FIG. 31E(c). That is, the processor 210 may move the display region on the display 260 counterclockwise about the diagonal line between the z-axis and the y-axis by a preset moving distance from the reference region. Thereafter, the processor 210 may return the display region on the display 260 clockwise about the diagonal line between the z-axis and the y-axis, as illustrated in FIG. 31E(d). That is, the processor 210 may move the display region on the display 260 clockwise about the diagonal line between the z-axis and the y-axis by a preset distance from the reference region. Through this, the processor 210 may return the display region to the reference region of the display 260.

According to another embodiment, the processor 210 may rotate the display 260 about the x-axis orthogonal to the z-axis and the y-axis.

Figure 30F:
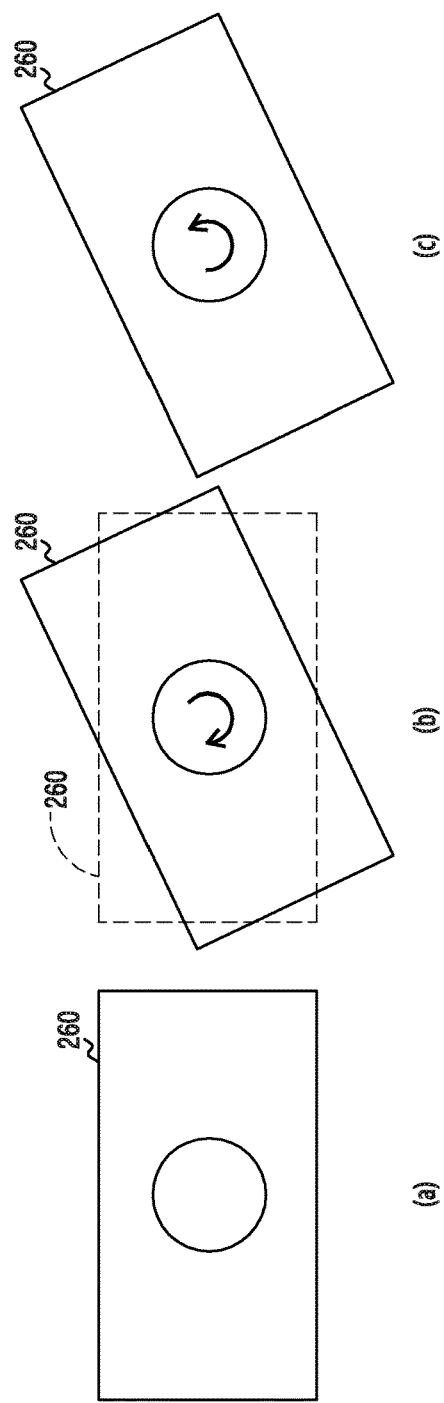

For example, the processor 210 may place the display region in the reference region of the display 260 as illustrated in FIG. 30F(a). In addition, the processor 210 may move the display 260 counterclockwise about the x-axis as illustrated in FIG. 30F(b). Correspondingly, the processor 210 may rotate the display region on the display 260 clockwise about the x-axis, as illustrated in FIG. 30F(b). That is, the processor 210 may rotate the display region on the display 260 clockwise about the x-axis from the reference region. In addition, when the movement of the display 260 is completed, the processor 210 may return the display region on the display 260 counterclockwise about the x-axis. That is, the processor 210 may return the display region from the reference region of the display 260.

Figure 31F:
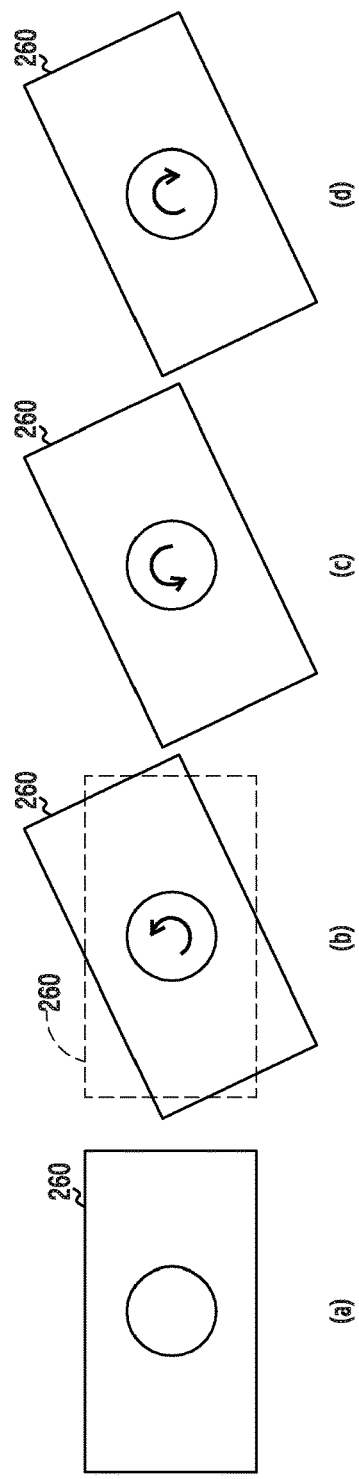

Alternatively, the processor 210 may place the display region in the reference region of the display 260 as illustrated in FIG. 31F(a). In addition, the processor 210 may move the display 260 counterclockwise about the x-axis as illustrated in FIG. 31F(b). In addition, when the movement of the display 260 is completed, the processor 210 may continuously move the display region on the display 260 counterclockwise about the x-axis, as illustrated in FIG. 31F(c). That is, the processor 210 may move the display region on the display 260 counterclockwise about the x-axis by a preset moving distance from the reference region. Thereafter, the processor 210 may return the display region on the display 260 clockwise about the x-axis, as illustrated in FIG. 31F(d). That is, the processor 210 may move the display region on the display 260 clockwise about the x-axis by a preset moving distance from the reference region. Through this, the processor 210 may return the display region to the reference region of the display 260.

Next, when an executed function is terminated, the processor 210 may detect this in operation 1519. Thereafter, the processor 210 may return to FIG. 10.

On the other hand, when the function is not terminated in operation 1519, the processor 210 may return to operation 1511. Then, the processor 210 may perform at least one of operations 1511 to 1519 repeatedly.

Through this, the operation method of the electronic device 201 may be terminated.

According to various embodiments, personalized interactions may be provided through various types of electronic devices, and a feeling of personality may be provided to the user through the interactions.

According to various embodiments, a method of operating the intelligent electronic device 201 may include detecting a user based on a received acoustic speech, moving the display 260 to face the user, and executing a function through the display 260.

According to various embodiments, the method of operating the intelligent electronic device 201 may further include detecting a face in image data to be photographed, and moving the display 260 in response to the face.

According to various embodiments, the method of operating the intelligent electronic device 201 may further include tracking the face during the executing of the function and moving the display to correspond to the face.

According to various embodiments, the method of operating the intelligent electronic device 201 may further include detecting a distance from the electronic device 201 to the user.

According to various embodiments, the executing of the function may include determining a screen for display and displaying the screen based on the distance.

According to various embodiments, the moving of the display 260 may rotate the display 260 about at least one of three mutually orthogonal axes that pass through the electronic device 201.

According to various embodiments, the executing of the function may include displaying a screen that displays the function to be executed, detecting a control command based on a received acoustic speech, and controlling the function based on the control command.

According to various embodiments, the display 260 may be implemented as a touch screen.

According to various embodiments, the performing of the function may further include detecting the control command based on a signal input to the touch screen.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a base;
   a fixed head disposed on an upper portion of the base;
   a drive unit that is disposed in an inner space of the fixed head;
   a movable head that surrounds at least a portion of the fixed head and is arranged to be movable by being fixed to at least a portion of the drive unit;
   at least one sensor module that is disposed in at least a portion of the movable head or the base;
   at least one processor; and
   at least one or more computer programs configured to be executed by the at least one processor, wherein the one or more computer programs include instructions to at least:
   detect, via the sensor module, an input, and
   control, via the drive unit, to cause the movable head to move in a determined direction according to a parameter corresponding to the detected input,
   wherein the drive unit comprises:
   a rotation plate,
   a first drive unit configured to move the movable head such that the movable head is rotatable about a first axis, and
   a second drive unit configured to move the movable head such that the movable head is rotatable about a second axis orthogonal to the first axis, wherein the first drive unit comprises:
   the rotation plate disposed to be capable of self-rotating within the fixed head,
   a first fixing piece fixed to the rotation plate,
   a first gear disposed to be rotated coaxially with the rotation plate, and
   a first drive motor disposed within the fixed head and including a pinion gear engaged with the first gear, and
   wherein a portion of the movable head is fixed to the first fixing piece such that the movable head fixed to the first fixing piece is moved when the first gear is rotated according to driving of the first drive motor is driven.

2. The electronic device of claim 1,
   wherein the movable head comprises a display, and
   wherein the at least one processor is further configured to move the movable head such that the movable head is directed toward a direction of the input with reference to the display.

3. The electronic device of claim 2, wherein the first drive unit and the second drive unit operate alone or together under a control of the at least one processor.

4. The electronic device of claim 1, wherein the at least one sensor module comprises at least one of:
   an image sensor configured to detect a movement of an external object,
   a sound detecting sensor configured to detect an external sound,
   a temperature sensing sensor configured to detect an external temperature,
   an odor sensor configured to detect an external odor, or
   an atmospheric pressure sensor configured to detect an atmospheric pressure.

5. The electronic device of claim 1, wherein the input comprises at least one of a gesture of an external object, an external sound, an external temperature, or an external atmospheric pressure.

6. The electronic device of claim 1,
   wherein the movable head further comprises an output device, and
   wherein the output device comprises at least one of a speaker device, a microphone device, a vibration device, or a visual indicator device.

7. The electronic device of claim 1,
   wherein the second drive unit comprises:
   a second gear disposed on a gear fixing shaft extending from the first fixing plate to be rotated with the first fixing piece, and
   a second drive motor disposed on the rotation plate and including a pinion gear engaged with the second gear, and
   wherein the movable head fixed to the first fixing piece is moved when the second gear is rotated according to the driving of the second drive motor.

8. A method of operating an intelligent electronic device, the method comprising:

detecting, by an electronic device, a user based on a received acoustic speech;

moving, by the electronic device, a display of the intelligent electronic device to face the user; and executing, by the electronic device, a function through the display, wherein the electronic device comprises:
- a base,
- a fixed head disposed on an upper portion of the base,
- a drive unit that is disposed in an inner space of the fixed head,
- a movable head that surrounds at least a portion of the fixed head and is arranged to be movable by being fixed to at least a portion of the drive unit, and
- at least one sensor that is disposed in at least a portion of the movable head or the base, and wherein the drive unit comprises:
- a rotation plate,
- a first drive unit configured to move the movable head such that the movable head is rotatable about a first axis, and
- a second drive unit configured to move the movable head such that the movable head is rotatable about a second axis orthogonal to the first axis, wherein the first drive unit comprises:
- the rotation plate disposed to be capable of self-rotating within the fixed head,
- a first fixing piece fixed to the rotation plate,
- a first gear disposed to be rotated coaxially with the rotation plate, and
- first drive motor disposed within the fixed head and including a pinion gear engaged with the first gear, and wherein a portion of the movable head is fixed to the first fixing piece such that the movable head fixed to the first fixing piece is moved when the first gear is rotated according to driving of the first drive motor is driven.

9. The method of claim 8, further comprising:

detecting, by the electronic device, a face from captured image data; and moving, by the electronic device, the display to correspond to the face.

10. The method of claim 9, further comprising:

tracking, by the electronic device, the face during execution of the function; and moving, by the electronic device, in response to the tracking of the face, the display to correspond to the face.

11. The method of claim 8, further comprising:

detecting, by the electronic device, a distance from the intelligent electronic device to the user, wherein the executing of the function comprises:
- determining a screen to be displayed based on the distance, and
- displaying the screen.

12. The method of claim 8, wherein the moving of the display comprises rotating the display about at least one of three mutually orthogonal axes that pass through the intelligent electronic device.

13. The method of claim 8, wherein the executing of the function comprises:

displaying a screen that displays the function to be executed;

detecting a control command based on the received acoustic speech; and controlling the function based on the control command.

14. The method of claim 13, wherein the display is implemented as a touch screen, and wherein the executing of the function further comprises detecting the control command based on a signal input to the touch screen.

15. An electronic device comprising:
- a base;
- a fixed head disposed on an upper portion of the base;
- a drive unit that is disposed in an inner space of the fixed head;
- a movable head that surrounds at least a portion of the fixed head and is arranged to be movable by being fixed to at least a portion of the drive unit and includes display disposed on the movable head;
- at least one sensor that is disposed in at least a portion of the movable head or the base; and
- at least one processor functionally connected to the display and the drive unit,
- at least one memory storing one or more computer programs configured to be executed by the at least one processor, wherein the one or more computer programs include instructions to at least:
  - detect a user based on a received acoustic speech,
  - move the display to face the user, and
  - execute a function through the display, wherein the drive unit comprises:
- a rotation plate,
- a first drive unit configured to move the movable head such that the movable head is rotatable about a first axis, and
- a second drive unit configured to move the movable head such that the movable head is rotatable about a second axis orthogonal to the first axis, wherein the first drive unit comprises:
- the rotation plate disposed to be capable of self-rotating within the fixed head,
- a first fixing piece fixed to the rotation plate,
- a first gear disposed to be rotated coaxially with the rotation plate, and
- a first drive motor disposed within the fixed head and including a pinion gear engaged with the first gear, and wherein a portion of the movable head is fixed to the first fixing piece such that the movable head fixed to the first fixing piece is moved when the first gear is rotated according to driving of the first drive motor is driven.

16. The electronic device of claim 15, further comprising:

a camera configured to capture image data, wherein the at least one processor is further configured to:
- detect a face in the image data, and
- move the display to correspond to the face.

17. The electronic device of claim 15, wherein the at least one processor is further configured to control the drive unit to rotate the display about at least one of three mutually orthogonal axes that pass through the electronic device.

18. The electronic device of claim 16, wherein the at least one processor is further configured to:
- display a first screen in response to the movement of the display, and
- display a second screen in response to processing of the acoustic speech.

* * * * *